United States Patent
Heiferman et al.

(10) Patent No.: US 9,947,053 B2
(45) Date of Patent: Apr. 17, 2018

(54) SYSTEM AND METHOD FOR CONDITIONAL GROUP MEMBERSHIP FEES

(71) Applicant: MEETUP, INC., New York, NY (US)

(72) Inventors: Scott Heiferman, New York, NY (US); Emilio Andres Glusman, Edgewater, NJ (US); Gary Burns, Brooklyn, NY (US); Mathew J. Trush, Brooklyn, NY (US)

(73) Assignee: Meetup, Inc., New York, NY (US)

( * ) Notice: Subject to any disclaimer, the term of this patent is extended or adjusted under 35 U.S.C. 154(b) by 532 days.

(21) Appl. No.: 13/838,455

(22) Filed: Mar. 15, 2013

(65) Prior Publication Data
US 2013/0211980 A1    Aug. 15, 2013

(51) Int. Cl.
| | |
|---|---|
| G06F 3/01 | (2006.01) |
| G06Q 40/00 | (2012.01) |
| H04L 12/58 | (2006.01) |
| G06Q 10/10 | (2012.01) |
| G06Q 30/02 | (2012.01) |
| H04L 12/18 | (2006.01) |
| G06Q 50/00 | (2012.01) |
| G06Q 20/22 | (2012.01) |

(52) U.S. Cl.
CPC ............ *G06Q 40/12* (2013.12); *G06Q 10/10* (2013.01); *G06Q 20/22* (2013.01); *G06Q 30/02* (2013.01); *G06Q 50/01* (2013.01); *H04L 12/1818* (2013.01); *H04L 51/32* (2013.01)

(58) Field of Classification Search
CPC ........ G06F 17/30598; G06F 17/30867; G06Q 30/02; G06Q 20/102; G06Q 30/06; G06Q 30/0226

USPC ........................................................ 715/753
See application file for complete search history.

(56) References Cited

U.S. PATENT DOCUMENTS

| | | |
|---|---|---|
| 5,842,009 A | 11/1998 | Borovoy et al. |
| 5,963,913 A | 10/1999 | Henneuse et al. |
| (Continued) | | |

FOREIGN PATENT DOCUMENTS

| | | |
|---|---|---|
| KR | 20020045929 A | 6/2002 |
| KR | 1020060114986 A | 11/2006 |

OTHER PUBLICATIONS

Willison, "Meetup Launches", Simon Willison's Weblog, http://simonwillison.net, Jun. 15, 2002, 1 page.
www.glish.com, Online Weblog Archive, Jun. 15, 2002, 3 pages.

*Primary Examiner* — Nicholas Augustine
(74) *Attorney, Agent, or Firm* — The Webb Law Firm

(57) ABSTRACT

A system and method for facilitating fee-based group membership is provided. The method includes the steps of receiving, from at least one designated organizer for at least one group of a plurality of groups, data representing a monetary value of a membership fee; receiving, from a first plurality of user terminals associated with a first plurality of users, a first plurality of requests to join the at least one group; registering the first plurality of users with the at least one group; receiving, from a second plurality of user terminals associated with a second plurality of users, a second plurality of requests to join the at least one group; transmitting, to the second plurality of user terminals, data configured to display payment options; and registering at least a portion of the second plurality of users with the at least one group upon payment of the fee.

12 Claims, 40 Drawing Sheets

(56) References Cited

U.S. PATENT DOCUMENTS

| | | |
|---|---|---|
| 6,519,629 B2 | 2/2003 | Harvey et al. |
| 6,553,218 B1* | 4/2003 | Boesjes .............. H04L 12/2856 |
| | | 379/114.03 |
| 6,738,065 B1 | 5/2004 | Even-Zohar |
| 6,819,919 B1 | 11/2004 | Tanaka |
| 7,082,402 B2 | 7/2006 | Conmy et al. |
| 7,113,797 B2 | 9/2006 | Kelley et al. |
| 7,162,433 B1 | 1/2007 | Foroutan |
| 7,236,976 B2 | 6/2007 | Breitenbach et al. |
| 7,532,900 B2 | 5/2009 | Wilson et al. |
| 7,640,312 B2 | 12/2009 | DelGaudio et al. |
| 2001/0014868 A1 | 8/2001 | Herz et al. |
| 2001/0020253 A1* | 9/2001 | Arao ..................... G09B 19/06 |
| | | 709/228 |
| 2002/0032592 A1 | 3/2002 | Krasnick et al. |
| 2002/0049742 A1 | 4/2002 | Chan et al. |
| 2002/0107859 A1 | 8/2002 | Tsuyuki |
| 2002/0184321 A1 | 12/2002 | Fishman et al. |
| 2003/0028451 A1 | 2/2003 | Ananian |
| 2003/0046296 A1 | 3/2003 | Doss et al. |
| 2003/0061183 A1 | 3/2003 | Schaffer et al. |
| 2003/0115203 A1 | 6/2003 | Brown et al. |
| 2003/0189592 A1 | 10/2003 | Boresjo |
| 2003/0191772 A1 | 10/2003 | Schaumann et al. |
| 2003/0236726 A1* | 12/2003 | Almonte ............... G06Q 20/02 |
| | | 705/35 |
| 2004/0044673 A1* | 3/2004 | Brady ................... G06Q 10/10 |
| 2004/0078256 A1 | 4/2004 | Glitho et al. |
| 2004/0098275 A1 | 5/2004 | Hubert |
| 2004/0192299 A1 | 9/2004 | Wilson et al. |
| 2006/0036457 A1* | 2/2006 | McNamara ........... G06Q 50/01 |
| | | 705/319 |
| 2006/0095376 A1 | 5/2006 | Mitchell et al. |
| 2006/0190343 A1* | 8/2006 | Cooper .................. G06Q 30/02 |
| | | 705/80 |
| 2006/0259359 A1* | 11/2006 | Gogel .................... G06Q 30/02 |
| | | 705/14.16 |
| 2007/0162547 A1 | 7/2007 | Ross |
| 2007/0253424 A1 | 11/2007 | Herot et al. |
| 2007/0282661 A1 | 12/2007 | Franco |
| 2008/0040176 A1* | 2/2008 | Ehling .................. G06Q 30/00 |
| | | 705/302 |
| 2008/0071874 A1 | 3/2008 | Roodman et al. |
| 2008/0086512 A1 | 4/2008 | Fahys |
| 2008/0098313 A1 | 4/2008 | Pollack |
| 2008/0294999 A1 | 11/2008 | Bank et al. |
| 2008/0301568 A1 | 12/2008 | Im et al. |
| 2009/0137298 A1 | 5/2009 | Bedingfield, Sr. et al. |
| 2009/0222522 A1 | 9/2009 | Heaney |
| 2010/0017371 A1 | 1/2010 | Whalin et al. |
| 2010/0095225 A1 | 4/2010 | Langlois et al. |
| 2010/0235215 A1 | 9/2010 | Hardy et al. |
| 2010/0280904 A1* | 11/2010 | Ahuja .................... G06Q 30/02 |
| | | 705/14.58 |
| 2011/0078026 A1 | 3/2011 | Durham |
| 2011/0078716 A1 | 3/2011 | MacWan |
| 2011/0191222 A1* | 8/2011 | Mashiach .............. G06Q 30/04 |
| | | 705/34 |
| 2012/0008526 A1* | 1/2012 | Borghei ................ H04W 4/021 |
| | | 370/254 |
| 2012/0069131 A1* | 3/2012 | Abelow ................ G06Q 10/067 |
| | | 348/14.01 |
| 2013/0226676 A1* | 8/2013 | Bongiovanni ..... G06Q 30/0279 |
| | | 705/12 |
| 2013/0332395 A1* | 12/2013 | Kim .................... G06Q 30/0206 |
| | | 705/400 |
| 2014/0164094 A1* | 6/2014 | Bhatia ................ G06Q 30/0251 |
| | | 705/14.41 |
| 2015/0208140 A1* | 7/2015 | Choi .................. H04N 21/4788 |
| | | 725/32 |
| 2016/0353244 A1* | 12/2016 | Holden ................. H04W 4/028 |

* cited by examiner

Topics
☐ Automotive
☐ Books
☐ Cultures & Community
☐ Education
☐ Film/TV
☐ Financial
☐ Games
☐ Health
☐ Hobbies
☐ In The Market For...
☐ Internet & Technology
☐ Languages
☐ Music
☐ Pets
☐ Politics & Activism
☐ Religion
☐ Science
☐ Sports
☐ Work & Career

FIG. 1

Topics> Languages

Americn Sign Language
Next Gathering: Wednesday, June 16 @ 7:00PM
Amharic Language
Next Gathering: Wednesday, June 9 @ 6:00PM
Arabic Language
Next Gathering: Wednesday, June 9 @ 7:00PM
British Sign Language
Next Gathering: Monday, July 5 @ 7:00PM
Bulgarian Language
Next Gathering: Thursday, July 1 @ 8:00PM
Cantonese Language
Next Gathering: Saturday, June 12 @ 1:00PM Slovak Language
Next Gathering: Monday, July 5 @ 6:00PM
Spanish Language
Next Gathering: Tuesday, June 15 @ 7:00PM
Swahili
Next Gathering: Saturday, July 10 @ 3:00PM
Tagalog Language
Next Gathering: Thursday, June 24 @ 7:00PM
Thai Language
Next Gathering: Saturday, June 19 @ 1:00PM
Translator
Next Gathering: Thursday, July 1 @ 7:00PM
Turkish
Next Gathering: Thursday, July 1 @ 8:00PM
Urdu Language
Next Gathering: Monday, June 21 @ 7:00PM
Vietnamese Language
Next Gathering: Tuesday, July 13 @ 8:00PM
Visaya Language
Next Gathering: Tuesday, July 13 @ 6:00PM
Volapuk Language
Next Gathering: Wednesday, July 7 @ 7:00PM
Yiddish Language
Next Gathering: Monday, June 21 @ 7:00PM
Yoruba Language
Next Gathering: Thursday, June 17 @ 8:00PM

FIG. 2

| USERNAME | | | |
|---|---|---|---|
| FIND A TOPIC | CUSTOMIZE | CHOOSE A PLAN | START PLANNING MEETINGS |

1100

START YOUR 'MEETING GROUP' TODAY!

YOUR MEETING GROUP'S IN: 'LOCATION'

NAME YOUR MEETING GROUP: 'NAME'

WHAT'S YOUR MEETING GROUP ABOUT:

'MEETING GROUP DESCRIPTION'

WHEN ARE YOUR MEETINGS:
'TIME/DATE/FREQUENCY'

IS YOUR MEETING GROUP:
☐ PUBLIC
☐ PRIVATE

HOW SHOULD YOUR GROUP COMMUNICATE:
☐ MAILING LIST
☐ MESSAGE BOARD

WANT TO RUN A REAL OFFLINE AND LOCAL GROUP? MEETING FACILITY IS THE BEST WAY TO GO!

MORE MEMBERS!
- WE'LL PROMOTE YOUR GROUP TO THE MILLIONS OF USERS ALREADY ON.
- WE'LL ACTIVELY WORK TO MAKE YOUR GROUP HIGHLY RANKED ON POPULAR SEARCH ENGINES.

MORE TOOLS!
- HIGHLY CUSTOMIZABLE
- EVENT SCHEDULING
- MANAGEMENT TOOLS
- FINANCIAL MANAGEMENT
- PROMOTION TOOLS
- HOST PHOTOS

MORE HELP!
- HELP TOOS
- ORGANIZER HELP GROUPS

FIG. 11

| | | |
|---|---|---|
| ORGANIZER HELP AND TOOLS | CONGRATULATIONS! YOU'RE NOW AN ORGANIZER! | |
| EMAIL THE GROUP | | |
| ORGANIZER'S CHECKLIST | EDIT YOUR MEETING | |
| | CUSTOMIZE THE INFORMATION | |
| WELCOME | TITLE: 'DESCRIPTIVE TITLE' | MEETING PHOTO / UPLOAD PHOTO / BROWSE |
| ABOUT US | DATE: 'DATE/TIME' | |
| CALANDAR | LOCATION: | |
| MEMBERS | ☐ A LOCATION USED BEFORE | RSVP SETTINGS |
| PHOTOS | ☐ A NEW LOCATION | ☐ UP TO ___ PEOPLE CAN ATTEND |
| MESSAGES | ☐ I'LL PICK A LOCATION LATER | ☐ A NEW LOCATION |
| POLES | ☐ SHOW LOCATION TO MEETING GROUP USERS ONLY | ☐ I'LL PICK A LOCATION LATER |
| FILES | | ☐ CLOSE FROM NOW ON |
| PROMOTE | HOW WILL USERS FIND YOU AT THE VENUE? | ☐ ALLOW MAYBE RSVPS |
| | 'HOW TO FIND YOU' | ☐ ALLOW ___ GUESTS / USER |
| ORGANIZER PHOTO AND NAME | | ☐ EMAIL ORGANIZER WHEN USERS RSVP |
| | MEETING DESCRIPTION | ☐ SEND AUTOMATIC ANNOUNCMENTS / REMINDERS |
| | WHO SHOULD COME | |
| | WHY JOIN US | ☐ FEE: _____ |
| | DETAILS | |

ORGANIZER'S CHECKLIST
TIPS TO HELP YOU BECOME A SUCCESSFUL ORGANIZER — 1300

LAUNCH YOUR GROUP
- WRITE A MEETING NAME
- WRITE A DESCRIPTION
- ADD TOPICS
- ADD PROFILE INFORMATION
- UPLOAD A PHOTO
- ADD WECOME NOTE
- START FIRST MEETING

SELECT A VENUE
- PICK A PART OF TOWN
- ASK FOR SUGGESTIONS
- POLL MEMBERS
- CONTACT BUSINESSES
- CONTACT OR VISIT VENUE

KEEP MOMENTUM
- SCHEDULE NEXT MEETING
- EMAIL RECAP
- ENCOURAGE RSVP
- POST PHOTOS
- GET MEMBERS TO POST
- SOLICIT SURVEY RESPONSE
- DON'T GET DISCOURAGED

CONTACT MEMEBERS
- EMAIL NEW MEMBERS
- ENCOURAGE PROFILE DEV.
- MAILING LISTS & MESS. BD
- PROFILE QUESTIONS
- ASK MEMBERS TO HELP
- GET MEMBER FEEDBACK

SET UP MEETING
- CREATE INTEREST
- WRITE DISCRIPTION
- PICK DATE AND TIME
- RSVP FOR THE MEETING
- SELECT A VENUE

MEETING PURPOSE
- PRINT SIGN UP
- SEND REMINDER
- PRINT NAMES AND PHOTOS
- BRING A CAMERA
- PRINT CHECKLIST

HOST YOUR MEETING
- GET THERE EARLY
- PUT UP A SIGN
- WELCOME EVERY MEMBER
- ENCOURAGE WELCOMING

PROMOTE GROUP
- INVITE FROM ALERT LIST
- PROMOTE GROUP ONLINE
- ADD 'ABOUT US' PAGE
- CREATE BUSINESS CARDS
- RECRUIT MEMBERS

NEED MORE HELP?
- WATCH THIS VIDEO
- BROWSE OTHER GROUPS
- GET IDEAS FROM MESS. BD
- ATTEND ORG SEMINAR
- PICK AN ASSISTANT
- VISIT RESOURCE CENTER

FIG. 13

| | |
|---|---|
| SCHEDULE A MEETING | WELCOME, BROOKLYN VEGETARIAN FOODIES! |
| EMAIL THE GROUP | |
| ORGANIZER'S CHECKLIST | LOVE GREAT FOOD, ESPECIALLY ETHNIC FOOD? LOVE FINDING RESTAURANTS THAT HAVE VEGETARIAN SELECTIONS OTHER THAN THE DREADED 'STEAMED VEGGIE' PLATE? THEN THIS IS THE MEETING GROUP FOR YOU! |
| WELCOME | |
| ABOUT US | WE'LL BE GOING TO ALL SORTS OF RESTAURANTS – NOT JUST EXCLUSIVELY VEGETARIAN RESTAURANTS – AND TRYING OUT THEIR VEGETARIAN FARE. |
| CALANDAR | |
| MEMBERS | [EDIT DISCRIPTION] |
| PHOTOS | |
| MESSAGES | MEETING GROUP TOPICS: VEGETARIAN, DINING OUT |
| POLES | [MANAGE TOPICS] |
| FILES | LOCATION: BROOKLYN, NY |
| PROMOTE | MEETINGS: 16 SO FAR |
| ORGANIZER PHOTO AND NAME | MEMBERS: 54 VEGETARIAN FOODIES |
| | FOUNDED: NOVEMBER 8, 200x |
| | MEMBER FEE: NONE – IT'S FREE! |
| | RATING: ★★★★☆ |

WHAT'S NEW?

MAY 19: NEW MEMBER, JUSTIN
[MEMBER PHOTO]

MAY 8: NEW MEETING

APRIL 15: NEW MEETING

| | ORGANIZER RESOURCES |
|---|---|
| SCHEDULE A MEETING | |
| EMAIL MEMBERS | THE ORGANIZER'S CHECKLIST / FREQUENTLY ASKED QUESTIONS |
| ORGANIZER RESOURCES | WHAT SHOULD YOU DO NEXT? CHECK OFF EACH COMPLETED. / NEED BASIC INFORMATION? |
| GROUP SETTINGS | |
| OUR HOME | ORGANIZER RESOUCE CENTER / CONTACT SUPPORT |
| ABOUT US | CHECK OUT THE EVER-GROWING COLLECTION OF ARTICLES ABOUT MAKING YOUR GROUP A SUCCESS. / EMAIL US YOU QUESTIONS, AND CONCERNS. WE'RE HERE TO HELP! |
| CALENDAR | |
| MEMBERS | |
| PHOTOS | ORGANIZER MESSAGE BOARDS / FIND GROUP NEAR YOU |
| MAILING LIST | DISCUSS THE INS AND OUTS OF RUNNING A GROUP WITH OUR SAVIEST MEMBERS / MEET OTHER ORGANIZERS IN YOUR AREA AND SWAP IDEAS. |
| MESSAGE BOARD | |
| POLLS | |
| FILES | PROMOTE YOU GROUP / PAYMENTS YOU'VE COLLECTED |
| PROMOTE | NEED HELP GETTING THE WORK OUT? FIND OUT HOW TO PROMOTE YOU GROUP BOTH ONLINE AND OFLINE. / WE'VE MADE IT EASIER FOR YOU TO COLLECT PAYMENTS FROM YOUR MEMBERS. VIEW AND EDIT DETAILED TRANSATION INFORMATION, ISSUE REFUNDS, AND MORE! |

1600

1700

NEW YORK, NY
5,262 MEETING GROUPS WITHIN [100 MILES]

WHAT'S HAPPENING THIS WEEK?

| IMAGE | IMAGE | IMAGE | IMAGE | IMAGE | IMAGE | IMAGE |
|---|---|---|---|---|---|---|
| TUE 95 MEETINGS | WED 100 MEETINGS | THU 73 MEETINGS | FRI 39 MEETINGS | SAT 53 MEETINGS | SUN 76 MEETINGS | MON 130 MEETINGS |

TUESDAY, [DATE]

2:00 PM — THE MAMARONECK MAH JONG MEETING
THE MAMARONECK MAH JONG MEETING GROUP

6:00 PM — THE NEW YORK GUILDED MEDITATION MEETING
THE NEW YORK GUILDED MEDITATION MEETING GROUP

INDEPENDENT CREATIVE CLUB OF GREATER HARTFORD MAY MEETING
INDEPENDENT CREATIVE CLUB OF GREATER HARTFORD

SPIN RADIO NYC: THE NIGHT LIFE & SOCIAL NETWORKING GROUP MEETING
SPIN RADIO NYC: THE NIGHT LIFE & SOCIAL NETWORKING GROUP

TEST OLD TIME RADIO MEETING GROUP II HAS A PHOTO. MAY MEETING
TEST OLD TIME RADIO MEETING GROUP II HAS A PHOTO

CHARGE MEMBERS TO ATTEND THIS MEETUP?
COVER YOUR COSTS, RESERVE A VENUE, OR EVEN PAY YOURSELF!

☐ YES, USING [AMAZON PAYMENTS]

ATTENDEES PAY A PRICE OF [$ 20.00]

YOU PAY AMAZON FEE          - $ 0.88

MEETING FEE WAIVED          ~~$ 0.50~~

YOU WILL RECEIVE            [$ 19.12]

☐ REQUIRE PAYMENT TO RSVP (REDUCES NO-SHOWS)

REFUND POLICY
MEMBERS WILL READ AND ACCEPT THIS POLICY WHEN THEY RSVP 'YES'

○ NO REFUNDS ARE OFFERED
○ I WILL REFUND MEMBERS IF...
  ☐ THE MEETING IS CANCELLED
  ☐ THE MEETING IS RESCHEDULED
  ☐ THE MEMBER CANCELS ____ DAY(S) IN ADVANCE OF THE MEETING

FIG. 19

JUNE RUSSIAN MEETUP
THURSDAY, [DATE] [TIME] – THE BROOKLYN RUSSIAN LANGUAGE MEETING GROUP

| NAME | QUANTITY | PINGPONG | TOTAL | CONF. # |
|---|---|---|---|---|
| OLIVER | 1 | $10.00 | $10.00 | A263 |

MEETING VENUE ADDRESS

MEETING AGENDA

MAP – WITH MEETING LOCATION SHOWN

ORGANIZED BY: _____

ORGANIZER'A REFUND POLICY: _____

BAR CODE

PAYMENTS YOU'VE RECEIVED
FOR: JUNE ORGANIZER MEETING

| | | |
|---|---|---|
| MEETUP:<br>JUNE ORGANIZER MEETING | GROUP:<br>THE NY ORGANIZER MEETING | TOTAL ONLINE: $124.50<br>TOTAL OFFLINE: 0.00 |
| WHEN:<br>[DATE AND TIME] | PRICE:<br>$41/50 (REQUIRED FOR RSVP) | GROSS REVENUE: $124.50<br>FEES -$4.51 |
| CURRENT RSVPS:<br>3 | RSVP LIMIT:<br>0 | NET REVENUE $119.99 |

REFUND POLICY:
REFUNDS ARE OFFERED ONLY UNDER THE FOLLOWING CIRCUMSTANCES:
- THE EVENT IS CANCELLED
- THE EVENT IS RESCHEDULED

| CONF# | NAME | DATE | QTY | PRICE | FEE | ACTION |
|---|---|---|---|---|---|---|
| A229 | TERESA | MAY 15 | 1 | $41.50 | $1.50 | |
| A226 | KEITH | MAY 15 | 1 | $41.50 | $1.50 | |
| A216 | MARK | MAY 15 | 1 | $41.50 | $1.50 | |

*Denim Lounge*
This venue is shared
Go back    Edit    Directions    Hold meeting here RATED: ☆☆☆☆☆ BY 5 PEOPLE
DENIM LOUNGE
1223 BEDFORD AVE
BROOKLYN, NY
(718) 230-9010
WWW.DENIMLOUNGE.COM TAGS:
SERVES ALCOHOL, PARKING, PET FRIENDLY, SMOKING, RESERVATION POLICY, BACK GARDEN, BOTTLE SERVICE, COOL, CUTE, FRIENDLY TO LARGE GROUPS, GARDEN, LOTS OF COUCHES. [ADD MORE]

REVIEWS FROM THE MEETUP COMMUNITY
FILTER BY | MEMBERS AND ORGANIZERS |

| PERSONAL PHOTO | ☆☆☆☆☆ "DENIM LOUNGE IS CUTE!" - A MEETING MEMBER | POSTED MONDAY [DATE] |

| PERSONAL PHOTO | ☆☆☆☆☆ "DENIM LOUNGE IS CUTE!" - A MEETING MEMBER | TUESDAY [DATE] |

MAP
①

UPCOMING MEETINGS
| DATE/ TIME | VEGETARIANS IN JAPAN! THE NYC VEGETARIAN DINING MEETING GROUP |
TWO ATTENDING

PAST MEETINGS
| DATE/ TIME | LET'S ENJOY VEGETARIAN FOOD! THE NYC VEGETARIAN DINING MEETING GROUP |
ONE ATTENDED

~ 2200

Ride to Governor's Island ~2602

Posted by: [PHOTO/NAME]  On Jul 29, 2009

There is a FREE ferry that leaves Brooklyn on Saturdays (it runs every 20 minutes) and takes people to Governor's Island, which is a new city park and is also free. The ferry ride is quick, and the Island is gorgeous, with breathtaking views of Manhattan, Brooklyn, Ellis Island, and the Statue of Liberty. How is Saturday, Aug 15 at 1pm?

*Who likes this:*

| PERSONAL PHOTO | PERSONAL PHOTO | PERSONAL PHOTO |

~2610A

8 Members like this  ☑ I like this  ~2608

🖳 Schedule idea ~2600
🛇 Delete idea

---

Ride to Brighton Beach, Brooklyn ~2604

Posted by: [PHOTO/NAME]  On Jul 29, 2009

Let's get the gang together and go for a bike ride to Brighton Beach. I know a great path we can take. It should take about an hour if we meet in our ususal spot. Then we can grab some delicious food and eat on the beach.

*Who likes this:*

| PERSONAL PHOTO | PERSONAL PHOTO | PERSONAL PHOTO |

~2610B

6 Members like this  ☐ I like this

🖳 Schedule idea
🛇 Delete idea

FIG. 26

Spark Meetups everywhere about...

What are these Meetups about?  2700

[                                      ]

This will be your web address:

[M] http://meetup.com/everywhere/

Tell everyone more about it

[                                      ]

10000 characters left

Your links
Something about Twitter    Something about Facebook    Something about Homepage

[E] http://twitter.com/    [f] http://facebook.com/    [←] http:// link text: [    ]

Who can schedule Meetups?
- ⦿ Anyone:
  I want Meetups everywhere scheduled by anyone who's interested
- ○ Only me:
  I've got a specific plan and I'll schedule them all myself

When should Meetups happen?
- ⦿ Any time:
  People should decide when's best for them to meet
- ○ All together:
  Require all Meetups to happen on the same day

Let's go!

FIG. 27

Editing birddog
[Birddog home]

When you tie a twitter account to a birddog. We can automatically publish activity in the birddog there.

Tie a twitter account

How Many Magic Meetups? [____] ☐ (US cities only) Create

All Done. Take me to the birddog home.

2800

FIG. 28 patent law Meetups

Happening everywhere on
Saturday, May 29

3000

← Back to list of all
50 Meetups

+ Schedule a Meetup about patent law patent lawyers are great

Meetups near you:
May 29 | Brooklyn, NY
8:00 PM | address TBA

☐ Contact us

May 29   New York, NY

✎ Edit    ⊘ Cancel

♥ This Meetup needs someone to organize it. Interested?

When:
Saturday, May 29, 2010
8:00 PM

Where:
New York, NY
*venue not yet chosen*

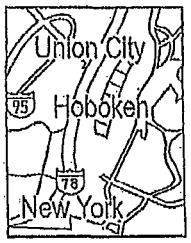

RSVP for this Meetup

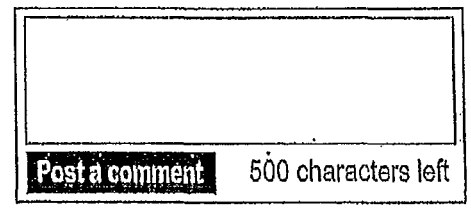

Post a comment   500 characters left

💡 Want to discuss the Meetup? Attendees get notified by email when new comments are posted.

FIG. 30 patent law Meetups

Happening everywhere on Saturday, May 29

⟵ Back to list of all
50 Meetups

+ Schedule a Meetup about patent law patent lawyers are great

Meetups near you:
| May 29 | Brooklyn, NY |
|---|---|
| 8:00 PM | address TBA |

☐ Contact us

May 29  New York, NY

✎ Edit   ⊖ Cancel

♥ This Meetup needs someone to organize it. Interested?

When:
Saturday, May 29, 2010
8:00 PM

Where:
New York, NY
*venue not yet chosen*

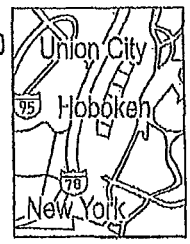

✪ You've RSVPed YES
Can't make it? Cancel

Who's coming? 1
David Pashman

Share on Facebook? ☒
Would you like to tell your fiends on Facebook about this Meetup?
[Yeah, sure!] [No thanks.]

FIG. 31 patent law Meetups

3200

Happening everywhere on
Saturday, May 29

← Back to list of all
50 Meetups

+ Schedule a Meetup about patent law patent lawyers are great

Meetups near you:
| May 29 | Brooklyn, NY |
| 8:00 PM | address TBA |

☐ Contact us

May 29   New York, NY

✎ Edit    ⊖ Cancel

♥ Be this Meetup's organizer
As the organizer of this Meetup, you can pick the location, change the date and time, and edit the description.

[Sure, I can do that] [No thanks.]

When:
Saturday, May 29, 2010
8:00 PM

Where:
New York, NY
*venue not yet chosen*

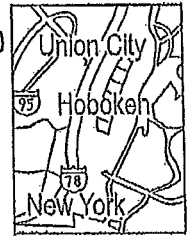

◉ You've RSVPed YES
Can't make it? Cancel

Who's coming? 

David Pashman ⊞

[Post a comment]   500 characters left

💡 Want to discuss the Meetup? Attendees get notified by email when new comments are posted.

FIG. 32 patent law Meetups

Happening everywhere on
Saturday, May 29

3300

← Back to list of all
50 Meetups

+ Schedule a Meetup about patent law patent lawyers are great

☐ Contact us

Edit this Meetup
about patent law

When's the Meetup?

[May ⇕] [29 ⇕] [2010 ⇕] 📅  [8 ⇕] : [00 ⇕] [PM ⇕]

Where will the Meetup happen?

[venue name (ex. Mainstreet Café)]

[New York, NY]

Haven't picked a venue yet? You can just enter a city for now.

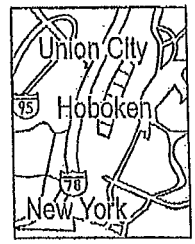

Any notes for attendees?

[                                        ]

10000 characters left

Schedule it!

FIG. 33 patent law Meetups

Happening everywhere on
Saturday, May 29

3500

← Back to list of all
50 Meetups

+ Schedule a Meetup about patent law patent lawyers are great

Meetups near you:
May 29 | Brooklyn, NY
8:00 PM | address TBA

☐ Contact us

May 29  New York, NY
✎ Edit   ⊖ Cancel

♥ This Meetup needs someone to organize it. Interested?

When:
Saturday, May 29, 2010
8:00 PM

Where:
New York, NY
*venue not yet chosen*

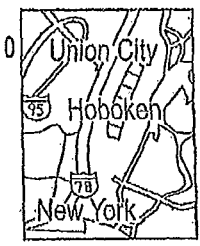

⊙ You've RSVPed YES
Can't make it? Cancel

Who's coming? 

David Pashman

[ Post a comment ]   462 characters left

☻ did you hear...patent law is great
 - David Pashman    4/29/10  1:39PM

FIG. 35

SYSTEM AND METHOD FOR CONDITIONAL GROUP MEMBERSHIP FEES

BACKGROUND OF THE INVENTION

Field of the Invention

A system and a method consistent with the present invention broadly relates to organizing real-world gatherings. More particularly, the present invention is consistent with providing an automated, computer-assisted system and a method for organizing a real-world gathering for a particular topic of interest.

Description of the Related Art

In social networking, people are often interested in forming groups or having gatherings centered on common interests. In the past, groups might form or gatherings may be held within the confines of a social or organizational setting, such as a school, community center, private club, or the like. Today the Internet offers a much more powerful tool for social networking. However, there still lacks an Internet social networking facility that provides a centralized way for people to manage groups for or events of in-person meetings through the Internet, and as such, help maintain ongoing local interest groups, create meetings around events, and the like.

The Internet now is one of the most popular sources for obtaining and sharing information. One popular activity associated with the Internet is communication between people, and notably people who may be separated by vast distances. Some familiar technologies that facilitate communication and involve the Internet include email, bulletin boards, virtual chat rooms, blogs, instant message systems, Internet-based social communications facilities, and the like. This set of technologies, and those that are similar, are characterized by being substantially solely on-line.

In other words, the foregoing set of well-known Internet related applications support geographically distributed communications, and do not have as their objective anything more.

In spite of the increased ability to communicate on-line, however, many people still are interested in meeting together in person with other people who are interested in the same topic, event, and the like. What is needed is a way to harness the formidable communications capabilities of the Internet to help support and facilitate such in-person topic or event related gatherings (herein, "gatherings" and "meetings" shall be interchangeably used, and shall unless otherwise noted refer to in-person gatherings).

The challenges of organizing real-world gatherings are much different from those of organizing online meetings. For example, to engage in online chat, there is no question of physical location, distance from home, availability of venue, or the like. All of the foregoing considerations and more, including intangibles such as social dynamics, make organizing real-world gatherings a more difficult and complex task.

Known Internet communication tools are insufficient for the task. In particular, email alone is inadequate because a person in one area has no organized way of approaching the problem of finding the identities and addresses of others in his area who are interested in a given topic and also interested in a topic-related meeting. Instant messaging and chat rooms alone are likewise inadequate for the same reasons.

Message boards and blogs are insufficient by themselves because these tools are not designed to allow a person to begin with a topic of interest or event, find an associated message board or blog that is relevant to the topic or event, and identify participants of the board or blog who are in a person's area and who are interested in an in-person topic or event related meeting.

Internet dating and introduction services are related to the idea of in-person meetings, but only on a one-to-one model, and all of these services are agnostic with respect to a particular topic of interest; instead, such services focus on compatibility with the idea of forming a relationship and not on meeting in a group setting to discuss a given topic of mutual interest. In effect, these services facilitate only one-off (non-recurring) gatherings in only a single geographical locale.

Internet newsgroups are topic related, but provide no support to a person who wants to attend a topic or event related meeting in person in his own geographic area.

Additionally, so-called "social networking" services, such as SixDegrees, provide a system for users to be introduced to friends of friends via website communication and/or email, but again provide no support to a person who wants to attend a topic or event-related gathering in person in a selected geographic area.

Internet invitation services likewise are inadequate to fulfill the above-identified need. Such services, of which Evite is an example, allow users to enter the email addresses of invitees to private events. Automated invitations are sent by the service, and each invitee may accept or decline the invitation. Separately, users may browse or search the Evite website directory of public events, but all the events are one-off, non-recurring events, and all the events must be submitted by individual users choosing to publicize already existing events. It is impossible for persons who are not already acquainted to use the system to self-organize into groups, and to attend topic-related in-person gatherings with others in a given locale. Evite thus does not provide an automated method for strangers with a common interest to self-organize into real-world, local groups.

General information postings, such as ads or articles in print media and signs posted around town, are well known. This approach starts with a meeting at a date and time certain, and then advertises the meeting. Posting such notices in common locations such as a town square or popular bulletin board is now possible online as well. One such example of this approach is a "craigslist" type website (see, e.g., dc.craigslist.com), where people wishing to advertise meetings can easily make such a posting. Such posting approaches, however, are limited in that they begin with a predetermined meeting location, date, and time, and require a group already to be formed. No self-formation of groups or meetings takes place, and the location of the posted meeting cannot be determined by those interested in attending. Furthermore, the posted events are typically one-off, non-recurring events. Any group continuity depends on the efforts of the person doing the posting, and no support along these lines is provided by the website.

SUMMARY OF THE INVENTION

An objective of the invention, among other objectives which will become apparent from reading the description herein, is to provide an automated or partly automated system to overcome the above-mentioned problems by facilitating local in-person gatherings of people brought together by a common interest.

One embodiment of the invention is a fully automated system in which the facilitation of such meetings does not include a person being designated as a group leader. Another embodiment of the invention provides for a group leader. In the description below, the invention will be taught first according to the leaderless embodiment, and afterward according to an embodiment that includes the concept of a group leader. Alternative embodiments will be presented as part of the discussion.

The below-described illustrative, non-limiting embodiments of the present invention overcome the above disadvantages and problems in the prior art, and also may provide solutions to other disadvantages and problems that were not described above. Also, a system that operates according to the teachings of the present invention is not necessarily required to overcome any of the particular problems or disadvantages described above. The appended claims should be consulted to ascertain the true scope of the invention.

It is an aspect of the present invention to provide a system and a method consistent with facilitating the creation, organizing, scheduling, and joining of in-person (also referred to as "real-world") group gatherings of interest around a topic, event, or the like.

In embodiments, a computer-implemented method may be provided for facilitating fee-based group membership, comprising receiving, from at least one designated organizer for at least one group of a plurality of groups, data representing a monetary value of a membership fee for the at least one group; receiving, from a first plurality of user terminals associated with a first plurality of users, a first plurality of requests to join the at least one group; registering the first plurality of users with the at least one group without requiring payment of the membership fee; receiving, from a second plurality of user terminals associated with a second plurality of users, a second plurality of requests to join the at least one group; transmitting, to the second plurality of user terminals, data configured to display payment options, the payment options configured to facilitate a transaction for the membership fee; and registering at least a portion of the second plurality of users with the at least one group after the at least a portion of the second plurality of users pay the membership fee. In embodiments, the plurality of groups may comprise a plurality of web-based meeting groups associated with a plurality of in-person gatherings or events. The first plurality of users may comprise a predetermined number of users, where the predetermined number of users may be received from the designated organizer. Data may be transmitted to the first plurality of user terminal configured to display a first graphical user interface configured to receive the first plurality of requests, wherein the first graphical user interface is without any indication that the membership fee is associated with the at least one group, and data configured to display a second graphical user interface configured to receive the second plurality of requests, wherein the second graphical user interface indicates that the membership fee is associated with the at least one group.

In embodiments, a system for facilitating fee-based group memberships may be provided, comprising at least one server computer including at least one processor, the at least one server computer configured to transmit, to a plurality of user terminals, data configured to display a meeting facility configured to facilitate users to organize and join a plurality of meeting groups associated with a plurality of in-person gatherings or events; designate at least one user of the plurality of users as at least one organizer for at least one meeting group of the plurality of meeting groups; receive, from the at least one organizer, data representing a numerical amount for a membership fee for the at least one meeting group; receive, through the meeting facility, a plurality of requests from a plurality of users to join the at least one meeting group; register a first portion of users of the plurality of users without charging the first portion of users the membership fee; and after the first portion of users are registered, register a second portion of users of the plurality of users after the membership fee is paid by each user of the second portion of users. In embodiments, the first portion of users may comprise a predetermined number of users, wherein the predetermined number of users may be received from the organizer.

In embodiments, a computer-implemented method may be provided for facilitating fee-based group membership, comprising receiving, from at least one designated organizer for at least one group of a plurality of groups, data representing a monetary value of a membership fee for the at least one group; receiving, from a plurality of user terminals associated with a plurality of users, a plurality of requests to join the at least one group; registering a pre-determined number of users of the plurality of users with the at least one group without requiring payment of the membership fee; after the pre-determined number of users have been registered, registering a plurality of remaining users of the plurality of users after the plurality of remaining users pay the membership fee. The plurality of groups may comprise a plurality of web-based meeting groups associated with a plurality of in-person gatherings or events. A first portion of the plurality of requests to join the at least one group may be received from the pre-determined number of users, and where a second portion of the plurality of requests to join the at least one group may be received from the plurality of remaining users. A numerical value representing the predetermined number of users may be received from the organizer.

In embodiments, a computer-implemented method may be provided for confirming attendance for in-person meetings or events, comprising transmitting, to a plurality of user terminals, data configured to display at least one graphical user interface configured to facilitate users to organize and join a plurality of meeting groups associated with a plurality of in-person meetings or events; receiving, from at least one user terminal of the plurality of user terminals, a specified number of attendees and a conditional confirmation of attendance for at least one in-person meeting or event; monitoring a number of confirmations of attendees for the at least one in-person meeting or event; and when the number of confirmations equals or exceeds the specified number of attendees, modifying the conditional confirmation of attendance to a non-conditional confirmation of attendance. In embodiments, incrementing the number of confirmations of attendees may be provided after modifying the conditional confirmation of attendance. The number of confirmations of attendees may include conditional confirmations and non-conditional confirmations for the at least one in-person meeting or event. The number of confirmations of attendees may be equal to a number of non-conditional confirmations for the at least one in-person meeting or event. Transmitted data may be configured to display a number of conditional confirmations and a number of non-conditional confirmations.

In embodiments, a computer-implemented method may be provided for confirming attendance for in-person meetings or events, comprising transmitting, to a plurality of user terminals, data configured to display at least one graphical user interface configured to facilitate users to organize and join a plurality of meeting groups associated with a plurality of in-person meetings or events; receiving, from at least one user terminal of the plurality of user terminals, a specified number of attendees and a conditional RSVP for at least one in-person meeting or event; monitoring a number of RSVPs for the at least one in-person meeting or event; and when the number of RSVPs equals or exceeds the specified number of attendees, modifying the conditional RSVP to a non-conditional RSVP. In embodiments, the number of RSVPs may be incremented after modifying the conditional RSVP. The number of RSVPs may include conditional RSVPs and non-conditional RSVPs for the at least one in-person meeting or event. The number of RSVPs may be equal to a number of non-conditional RSVPs for the at least one in-person meeting or event. Data transmitted may be configured to display a number of conditional RSVPs and a number of non-conditional RSVPs.

In embodiments, a method of communicating at least one message between users may be provided, comprising transmitting, to a plurality of users, data configured to display at least one graphical user interface configured to facilitate users to organize and join a plurality of meeting groups associated with a plurality of in-person meetings or events; transmitting, to at least one user of the plurality of users, information identifying at least one predetermined communication; and in response to only a single action performed by the at least one user, transmitting the at least one predetermined communication to at least one other user of the plurality of users. In embodiments, the at least one user and the at least one other user may have attended a common in-person meeting or event. The at least one user and the at least one other user may have been determined to have attended a common in-person meeting or event based on RSVPs received for the in-person meeting or event. The at least one graphical user interface may be further configured to facilitate users to join at least one meeting group of the plurality of meeting groups based on topic-related interest and geographic locale.

In embodiments, a method of communicating at least one message between users that attended an in-person meeting or event may be provided, comprising transmitting, to a plurality of users, data configured to display at least one graphical user interface configured to facilitate users to organize and join a plurality of meeting groups associated with a plurality of in-person meetings or events; receiving attendance information from at least two users of the plurality of users for an in-person meeting or event; after the in-person meeting or event has occurred, transmitting, to at least one user of the at least two users, data configured to display at least one graphical user interface comprising at least one input option associated with at least one other user of the at least two users; and in response to only a single selection of the at least one input option, transmitting at least one predetermined message to the at least one other user. In embodiments, the attendance information may comprise at least two RSVPs for the in-person meeting or event. The attendance information may be input by at least one organizer after or during the in-person meeting or event. The at least one graphical user interface may be further configured to facilitate users to join at least one meeting group of the plurality of meeting groups based on topic-related interest and geographic locale.

In embodiments, a method of communicating at least one message between users that attended an in-person meeting or event may be provided, comprising transmitting, to a plurality of users, data configured to display at least one graphical user interface configured to facilitate users to organize and join a plurality of meeting groups associated with a plurality of in-person meetings or events; receiving, from at least two users of the plurality of users, RSVPs for an in-person meeting or event; after the in-person meeting or event has occurred, transmitting, to at least one user of the at least two users, data configured to display at least one graphical user interface comprising at least one input option associated with at least one other user of the at least two users; and in response to only a selection of the at least one input option, transmitting at least one predetermined message to the at least one other user. In embodiments, the at least one graphical user interface may be further configured to facilitate users to join at least one meeting group of the plurality of meeting groups based on topic-related interest and geographic locale.

In embodiments, a computer-implemented method for a venue marketplace for in-person meetings or events may be provided, comprising (a) transmitting, to a plurality of venue users, data configured to display a first graphical user interface, the first graphical user interface including (i) at least one input option configured to receive venue data from the plurality of venue users, and (ii) at least one input option configured to accept or reject at least one bid offer for at least one venue of the plurality of venues; (b) registering a plurality of venues based at least partially on the venue data; and (c) transmitting, to at least one organizer for at least one meeting group associated with at least one in-person meeting or event, data configured to display a second graphical user interface, the second graphical user interface including (i) at least one search option configured to facilitate the at least one organizer to search the plurality of venues, and (ii) at least one input option configured to receive the at least one bid offer for the at least one venue of the plurality of venues. In embodiments, the venue data may comprise a venue name, a venue location, a venue image, a venue availability, a venue hours of operation, a venue cost, and the like, or any combination thereof. Further, the system may receive, from at least one venue user of the plurality of venue users, at least one acceptance parameter; determining, based at least partially on the at least one acceptance parameter and the at least one bid offer, whether to automatically accept or reject the at least one bid offer; and transmitting, to the at least one organizer, data configured to display an indication that the at least one bid offer has been accepted or rejected based on the determination.

In embodiments, a computer-implemented method for providing a venue marketplace for in-person meetings or events may be provided, comprising receiving, from a plurality of venue users, venue data for a plurality of venues; storing the venue data in at least one venue database; transmitting, to a plurality of organizers at a plurality of computing devices, data configured to display a first graphical user interface configured to search and/or browse the venue database; receiving, from at least one organizer of the plurality of organizers, a bid value for at least one venue of the plurality of venues; transmitting, to at least one venue user of the plurality of venue users, the bid value; and receiving, from the at least one venue user, an acceptance or rejection of the bid value. Further, the system may receive, from at least one venue user of the plurality of venue users, at least one acceptance parameter; determine, based at least partially on the at least one acceptance parameter and the bid value, whether to automatically accept or reject the at least one bid offer; and transmit, to the at least one organizer, data configured to display an indication that the bid value has been accepted or rejected based on the determination. The venue data may include a venue name, a venue location, a venue image, a venue availability, a venue hours of operation, a venue cost, and the like, or any combination thereof. Further, the system may receive, from the at least one venue user, a counteroffer; and transmit, to the at least one organizer, data configured to display the counteroffer.

In embodiments, a system for a venue marketplace for in-person meetings or events may be provided, the system comprising (a) a first graphical user interface on at least one first computer, the first graphical user interface including (i) at least one input option configured to receive venue data from at least one venue user of a plurality of venue users, (ii) at least one bid offer associated with at least one venue, (iii) at least one input option configured to accept or reject the at least one bid offer; and (b) a second graphical user interface on at least one second computer, the second graphical user interface including (i) at least one search option configured to facilitate at least one organizer to search a plurality of venues, the plurality of venues including the at least one venue; (ii) at least one input option configured to receive the at least one bid offer value for the at least one venue. In embodiments, the venue data may include a venue name, a venue location, a venue image, a venue availability, a venue hours of operation, a venue cost, and the like, or any combination thereof. The first graphical user interface may further include an input option configured to receive at least one acceptance parameter from the at least one venue user, and wherein the second graphical user interface further comprises a visual indication of whether the at least one bid offer has been accepted or rejected, the visual indication based at least partially on the at least one bid offer and the at least one acceptance parameter.

In embodiments, a computer-implemented method for a venue marketplace for in-person meetings or events may be provided, comprising (a) transmitting, to a plurality of venue users, data configured to display a first graphical user interface, the first graphical user interface comprising at least one input option configured to receive venue data from the plurality of venue users; (b) registering a plurality of venues based at least partially on the venue data; (c) transmitting, to a plurality of users, data configured to display a second graphical user interface including (i) at least one search option configured to search a plurality of meeting groups associated with a plurality of in-person meetings or events, (ii) at least one input option configured to facilitate the plurality of users to join at least one meeting group of the plurality of meeting groups; and (d) transmitting, to at least one organizer user for the at least one meeting group, data configured to display a third graphical user interface including (i) at least one search option configured to facilitate the at least one organizer user to search the plurality of venues and (ii) at least one input option configured to receive at least one bid offer for the at least one venue of the plurality of venues. In embodiments, the venue data may include a venue name, a venue location, a venue image, a venue availability, a venue hours of operation, a venue cost, and the like, or any combination thereof. The system may further receive, from at least one venue user of the plurality of venue users, at least one acceptance parameter; and determining, based at least partially on the at least one acceptance parameter and the at least one bid offer, whether to automatically accept or reject the at least one bid offer.

In embodiments, a computer-implemented method for a venue marketplace for in-person meetings or events may be provided, comprising receiving, from a plurality of venue users, venue data for a plurality of venues; storing the venue data in at least one venue database; transmitting, to a plurality of users at a plurality of computing devices, data configured to display a first graphical user interface configured to facilitate the plurality of users to join a plurality of meeting groups associated with a plurality of in-person meetings or events; transmitting, to a plurality of organizer users comprising at least a portion of the plurality of users at a plurality of computing devices, data configured to display a second graphical user interface configured to search and/or browse the venue database; receiving, from at least one organizer user of the plurality of organizer users, a bid comprising a bid value for at least one venue of the plurality of venues. In embodiments, the method may further comprise transmitting, to at least one venue user of the plurality of venue users, the bid value; and receiving, from the at least one venue user, an acceptance or rejection of the bid. The method may further comprise receiving, from at least one venue user of the plurality of venue users, at least one acceptance parameter; and determining, based at least partially on the at least one acceptance parameter and the bid value, whether to automatically accept or reject the bid. The venue data may include a venue name, a venue location, a venue image, a venue availability, a venue hours of operation, a venue cost, and the like, or any combination thereof.

In embodiments, a computer-implemented method may be provided for facilitating jointly organized events among at least two meeting groups, comprising transmitting, to a plurality of user terminals, data configured to display at least one graphical user interface configured to facilitate users to organize and join a plurality of meeting groups associated with a plurality of in-person events; receiving, from at least one first organizer of at least one first meeting group, a request to create a first in-person event associated with at least one first activity; receiving, from at least one second organizer of at least one second meeting group, a request to create a second in-person event associated with at least one second activity; determining, with at least one processor, if the at least one first activity and the at least one second activity are substantially similar or related; and if the at least one first activity and the at least one second activity are substantially similar or related, transmitting, to at least one user terminal of the plurality of user terminals, data configured to display a combined RSVP list comprising users registered for the at least one first activity and users registered for the at least one second activity.

In embodiments, a computer-implemented method may be provided for facilitating jointly organized events among at least two meeting groups, comprising transmitting, to a plurality of user terminals, data configured to display at least one graphical user interface configured to facilitate users to organize and join a plurality of meeting groups associated with a plurality of in-person events; receiving, from at least one first organizer of at least one first meeting group, a first request to create a in-person event; receiving, from at least one second organizer of at least one second meeting group, a second request to create the in-person event; and creating the in-person event, wherein the in-person event is associated with users of the at least one first meeting group and users of the at least one second meeting group.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE DRAWINGS

The invention and the following detailed description of certain embodiments thereof may be understood by reference to the following figures:

FIG. 1 shows a specific embodiment of a highest level of a hierarchical arrangement of topics according to an embodiment of the invention.

FIG. 2 shows a specific example of a second-highest level of a hierarchical arrangement of topics according to an embodiment of the invention.

FIG. 11 depicts an embodiment of a start a meeting group tab with customization.

FIG. 12 depicts an embodiment of a start planning meetings with new organizer group home page.

FIG. 13 depicts an embodiment of an organizer's checklist page.

FIG. 14 depicts an embodiment of a meeting group home page.

FIG. 16 depicts an embodiment of an organizer resources page.

FIG. 17 depicts an embodiment of a city calendar page.

FIG. 18 depicts an embodiment of a creating an event page.

FIG. 19 depicts an embodiment of a printable ticket.

FIG. 20 depicts an embodiment of a payments received page with a detailed view of an event with payments turned on.

FIG. 22 depicts an embodiment of a venue details page.

FIG. 26 depicts an embodiment of a voting function as provided through a user interface.

FIG. 27 depicts an embodiment of a container creation interface for an event.

FIG. 28 depicts an embodiment of an event being associated with a social networking site such as Twitter.

FIG. 30 depicts an embodiment of an information page for a specific event.

FIG. 31 depicts an embodiment of a specific event being associated with a social network site such as Facebook.

FIG. 32 depicts an embodiment for a user interface to allow an individual to become an event organizer.

FIG. 33 depicts an embodiment for a user interface for editing event information such as its venue.

FIG. 35 depicts an embodiment for a user interface for posting a comment for an event.

Figure 3:
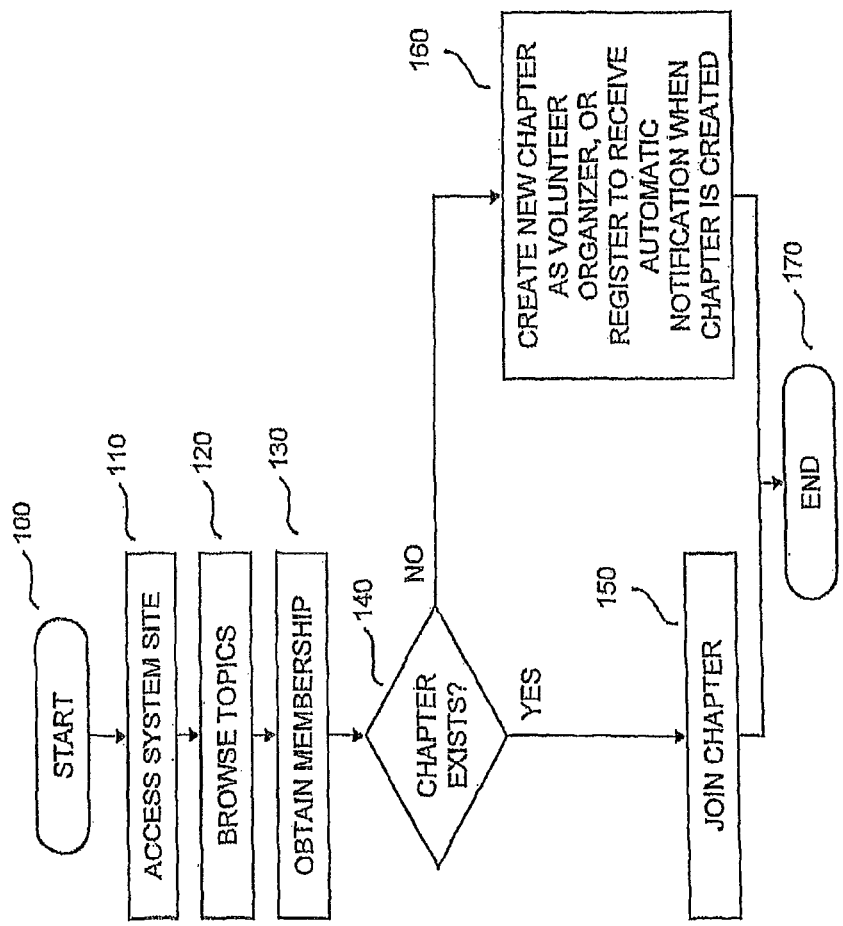
FIG. 3 shows an exemplary flow diagram for a part of the processing according to one embodiment of the invention.

While the invention has been described in connection with certain preferred embodiments, other embodiments would be understood by one of ordinary skill in the art and are encompassed herein.

All documents referenced herein are hereby incorporated by reference.

DESCRIPTION OF THE PREFERRED EMBODIMENTS

The present invention will now be described in detail by describing various illustrative, non-limiting embodiments thereof with reference to the accompanying drawings. The invention may, however, be embodied in many different forms and should not be construed as being limited to the illustrative embodiments set forth herein. Rather, the embodiments are provided so that this disclosure will be thorough and complete, and will fully convey the concept of the invention to those skilled in the art. The claims should be consulted to ascertain the true scope of the invention.

This illustrative, non-limiting embodiment of the present invention is a software application that organizes real-world group gatherings around a topic of interest. The software application can be delivered to the user via a web-based graphical user interface. The software application can also be deployed over a dedicated computer network (e.g., a LAN or a WAN), or via a stand-alone computer system for a particular company, such as an intranet installation, or by some other means. For simplicity and ease of discussion, various illustrative, non-limiting embodiments of the present invention will be described with reference to an Internet/world wide web-based system, with the understanding that networks or communications systems similar to, but not identical with the Internet, may of course be used.

On a practical level, the software that enables the computer system to perform the operations described in further detail below may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of ordinary skill in the art will appreciate that "media", or "computer-readable media", as used here, may include a diskette, a tape, a compact disc, an integrated circuit, a ROM, a CD, a cartridge, a remote transmission via a communications circuit, or any other similar medium useable by computers now known or hereafter developed. For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "including" the software. Thus, the term "including" is intended to encompass the above and all equivalent ways in which software is associated with a computer usable medium. For the sake of simplicity, therefore, the term "program product" is thus used to refer to a computer useable medium, as defined above, which includes in any form of software to enable a computer system to operate according to the above-identified invention. Thus, the invention is also embodied in a program product including software instructions which enable a computer or computers to organize a real-world gathering for a particular topic of interest according to the invention.

In this illustrative, non-limiting embodiment, the system allows for an automated organization of a real-world gathering of two or more individuals around a common topic of interest. The gatherings are real-world, face-to-face meetings that take place in at least one city and small towns in various countries around the world. The gatherings can take place at various venues such as local cafes, restaurants, stores, bar or other establishments.

The following terms are used throughout the specification and are defined as follows:

Topic: A subject or interest around which members of the system form groups, e.g., Pug Owners, Spanish Language, Environmental Defense, and/or have events.

Event: A gathering of individuals around a subject of interest, where the individuals may not be a part of a chapter, group, or even know one another.

Locale: A defined geographical location, even including definitions such as the area within a radius from a given zip or postal code.

Chapter: This is the intersection of a topic and a locale, e.g., Pug Owners, Louisville, Ky. In other words, it is a group of members organized locally around a topic of interest.

Gathering: A real-life, face-to-face meeting of a chapter. A gathering may be a periodic gathering, such as a monthly gathering, although other frequencies can be used. A gathering may be referred to as an in-person meeting, or a Meetup (Meetup is a trademark of Meetup, Inc.).

Organizer: Member who chooses to start and run a local chapter.

Event Container: An event container, or simply container, is a network of affiliated events in topic, time, and/or geography, where the container is initiated by a promoter. In embodiments, the container may also be implemented as including a single event.

Promoter: An individual who initiates a container, where the promoter uses the container to create and bound certain aspects of the events, such as a description of the events, date of the events, time of the events, what freedoms others will have in creating the particulars of the event, and the like.

Coordinator: An individual who chooses to coordinate an event.

Event Location: An event location, or simply 'location' in the context of describing a container or event, is the city or town that an event may take place.

Venue: This is a meeting place, which may be suggested by the system, a member, an organizer, a coordinator, a promoter, and the like, e.g., a restaurant, a café, a park, a library, a private home, etc.

A system according to this embodiment of the invention automates the organization of real-world gatherings around a topic of interest. A visitor to the system (which may be referred to as a member or participant) typically provides his or her location via a zip code, postal code, or city, then searches or browses for a topic of interest, e.g., Spanish Language. The system may return a list of local chapters that meet for Spanish Language conversation practice, sorted by distance from the user's location. In addition, the visitor can search for a topic of interest without providing a locale. That is to say, the order of providing locale information and topic of interest information is not critical in this embodiment.

The topics of interest and the locales may be organized using a multiple-level hierarchy. For example, as shown in FIG. 1, a set of highest level topics may be defined, and linked to sub-topics in a known manner. Activating the link to "Language" in the set of highest level topics may result in a display of sub-topics such as shown, for example, in FIG. 2.

FIG. 2 represents an embodiment in which, regardless of the user's locale, there is defined a date and time certain for the topic. Thus, a user interested in the particular topic of "Spanish Language" can, in the embodiment shown in FIG. 2, be provided with the worldwide date and time for the in-person meeting relating to the Spanish language, independent of locale.

Going further with the example, assuming the user has already provided his locale information by indicating a relevant zip code, city name, latitude/longitude information, or the like, information about the next meeting or gathering of the local chapter for the particular topic may be provided by activating the "Spanish Language" link.

In the situation in which no chapter existed already in the user's locale, the user could be presented with nearby locales having chapters for that particular topic. In one instance of the invention, the system will automatically instantiate a chapter when a user searches for a topic and a locale where no chapter currently exists.

Instead of searching through a hierarchy of topics, the system may provide a user with the ability to carry out a keyword-based search. It will be appreciated that other variations on topic selection are possible and are within the scope of the invention.

When the user searches for a topic of interest without the locale being known by the system, the user may be provided with the topic information and the information about all the chapters associated with this topic. Once the visitor selects and/or finds a locale and a topic of interest, the visitor has found a chapter (it will be recalled from the definitions section, above, that the chapter is an intersection of a particular topic and a locale).

The visitor may be presented with available information about the chapter, including, without limitation: a number of members in the chapter, member photos and biographies, a chapter creation date, a brief description of the chapter, a longer description, a calendar of events, event photos, message boards and so on. In the embodiment in which there is a chapter organizer, the organizer's identity may be indicated along with relevant organizer information.

In addition, a local chapter may also provide information about other chapters worldwide. This information may include details on nearby chapters, numbers of members worldwide, photos of members worldwide, and links to their message boards.

The system may also provide communications tools for members to communicate between chapters, e.g., a topic-level message board "General Spanish Language Board" and web logging tools "General Spanish Language Blog." Chapter information may be split up into a number of logical parts, which can be easily navigated e.g., through the use of tabs. Those familiar with this field will understand that other variations are possible and are within the scope of the invention.

In this exemplary system, gatherings may be organized for one or more types of chapters. One type of chapter is a leaderless chapter, according to a first embodiment of the invention. In a leaderless chapter, the system operates completely automatically, including fully automatic selection of the date and the time for the gathering, and the candidate venues for the users. That is, a gathering is automatically scheduled by the system.

In the first embodiment of the invention, there may be provided a system administrator who has a manual override capability to handle special scheduling problems, but a feature of the first embodiment is that there is provided a fully automated manner of facilitating in-person, topic-related meetings of persons, by geographic area. For the sake of linguistic convenience, a chapter according to this first embodiment of the invention may be referred to as a leaderless chapter.

According to a second embodiment of the invention, there is provided another type of chapter, having a person who is denominated as an organizer. It will be understood that "organizer" is used as a term of linguistic convenience, and is meant to generally refer to the idea of a person who is a contact person, and allows for situations in which the organizer is a group leader, a moderator, a facilitator, a secretary, or any other similar role. It will be understood that the automated system is performing an important and significant amount of the organizing itself.

A chapter according to this second embodiment of the invention, having an organizer, may be thought of for the sake of linguistic convenience, as a led chapter.

In a led chapter, local organizers are free to take part in the larger event, and/or to set their own day and time to meet. In one embodiment, organizers may select from a list of other chapters and topics to affiliate with. For example, the organizer of a local Christian Athletes chapter is provided by the system the ability to indicate an affiliation with the local Bible Study chapter as well as with other Christian Athletes chapters in nearby towns. That is, affiliations can be geographical and/or topical. Such affiliations may be listed on that organizer's local chapter home page.

Organizers, according to another embodiment, can allow the system to create an automatic voting ballot of two or more candidate venues (i.e., utilize a predetermined set of venues already in the system), but make changes prior to releasing the voting ballot for voting. The organizer may add extra venues, or replace venues on the system's voting ballot. Moreover, the organizer may nominate new venues, including private homes (i.e., utilize a set of venues that was not selected from the predetermined set of venues already in the system).

In another embodiment, the organizer may simply choose a venue for the gathering, thereby overriding the need to vote.

Organizers may be provided with tools for managing their chapter. They may use the system to send notifications and messages directly to members. They may create polls and ballots to survey members on particular subjects, for example, choosing activities or agenda items. They may limit or terminate membership in the chapter, and grant member privileges such as the ability to choose or nominate a venue, edit messages, edit profile information, and so on.

In general, the system may require a user become a member before providing any specific information about chapters or members. For example, the system may require the user to furnish a verifiable email address and a password as a precondition of membership, or other information as well, including a zip code or other geographic locale indicator.

Once a member, a user may be permitted to join a local chapter of any type. The user may then receive a welcome message and an automated email notification of a real-life, face-to-face gathering. In addition, the user may set his profile for the chapter including nicknames (usernames), personal biographical or other information, personal pictures, email contact options (allowing other members of the chapter to contact them), and other related information. The member may set up different profiles for different chapters. In addition, the member may set up alerts. For example, the member may set up an alert to receive a notification when a new message is posted to the message board.

The members may volunteer to be a host for an upcoming gathering. A host is different from an organizer, although both functions could of course be performed by the same person at a given time. A host is an attendee of a gathering who helps get the meeting started by helping attendees find each other. The host function is important because the people who attend a meeting may never have met, and because the venue may be large or noisy, making it difficult for such persons to actually connect with each other.

A host may perform some simple tasks to facilitate the gathering, such as printing out a sign and putting it on a tabletop, or bringing nametags and a marker. According to one embodiment of the invention, the system includes functions for automatically generating flyers, nametags, and/or table top signs for the chapter. The message on such promotional materials is specific to each chapter. The host just needs to print them out and bring them to the gathering.

According to one embodiment of the invention, the system may automatically schedule a worldwide or nationwide repeating gathering day, such as an "International Spanish Language Day." According to this embodiment, the system may schedule the periodic gathering for all chapters of the "Spanish Language" particular topic on the same day, and optionally at the same time, all over the world. Here, "at the same time" can mean an identical local time, in which case the chapters in different time zones are not meeting contemporaneously. It can also mean an identical time regardless of time zone, such as a standard time for chapters to meet all across the world. In other words, for a given topic, an identical calendar date and optionally an identical time is used for the automatic scheduling of the in-person gatherings for all of the chapters associated with the topic.

According to another embodiment, local chapters may set their own day and time to meet by carrying out a voting operation facilitated by the system or by a chapter organizer setting a day, time and recurrence using tools provided by the system.

The advantages of a worldwide or national gathering day are several. For example, assume the particular topic "Yoga" has a worldwide gathering day of the first Saturday of every month at 12 pm. A local Yoga chapter gathering at 12 pm on the first Saturday of the month in Washington D.C. knows that Yoga chapters all over the world are gathering at their own local time. Because of this arrangement, national media can be used to inform the public of such meetings, and national organizations can direct people to the local version of the topic, e.g., the Yoga chapters can announce that Monday, April 12th is this month's Yoga day. By providing a single website URL, for example, interested persons can automatically be directed to the local chapter nearest them. Likewise, using the system itself, interested persons can select "Yoga" as a topic of interest, and provide their geographic locale information, and be directed to the nearest chapter.

Furthermore, the automatic, periodic scheduling of a gathering, whether worldwide or only local, constitutes a means whereby the system (which may have automatically formed a chapter out of a group of strangers) automatically takes the steps necessary to keep the group alive on an ongoing basis. The system therefore not only automatically helps groups emerge, but also helps sustain them.

An exemplary embodiment of the invention will now be described with respect to FIG. 3, in which one example for implementing part of a system according to the invention will be described.

FIG. 3 shows one way to add new members to chapters. The process begins at step 100 which assumes that the user has some means for accessing the Internet, such as a personal computer, web-enabled phone, web-enabled television, connected PDA, or other Internet capable appliance. Step 100 also assumes that the user's appliance also has some communication means for accessing the interne, such as a dial-up service, a wired service, a wireless service, or the like.

In step 110, the user accesses a web site of the system according to the invention. The user may be provided with a variety of information, such as the already mentioned capability to search topic by keyword, or hierarchical list, or the like. The user takes advantage of such capabilities, and browses through the topics according to his personal interest in step 120, eventually selecting a topic of interest. The system thus receives a user selection of a topic from the plurality of predefined topics.

In step 130, the user is prompted to obtain a membership by providing, for example, a verifiable email address or the like, and information about the locale in which the user may be considered normally to exist. The information about the locale may be thought of as a user indication of a geographic locale. It is possible to grant membership in any of a variety of ways known to those familiar with this field. Once the membership is obtained, processing continues to step 140.

In step 140, a determination is made as to whether a chapter, corresponding to the geographic locale and the topic, exists. If so, processing may continue to step 150 in which the user is added to the chapter that corresponds to the selected topic and the geographic locale to which the user belongs. Another way to put this is to say the user may be added to a chapter selected on the basis of a topic and a locale. The adding of the user to the chapter as a member may be automatic or in response to a user indication. The system provides an indication to the user of the one chapter that was determined based on the topic and the geographic locale. The user may also be provided with information relating to the respective members of the chapter and the date and time of the next gathering. The user may take an action to indicate that he or should would like to become a member of the chapter, and to receive notification of chapter gatherings and activities, or the membership assignment may automatically be performed.

When no chapter exists, processing continues to step 160 in which a user may volunteer to create a new chapter as a volunteer organizer (according to the second embodiment of the invention described above) or, wait until a chapter is formed (automatically as in the first embodiment or otherwise). If the user volunteers to organize a new chapter, this indication is made by the user to the system and may be thought of as an organizer volunteer indication. If the user waits until a chapter is formed, the system may send an automatic notification of the chapter's creation to interested persons such as the user.

Processing ends in step 170 in FIG. 3, but it will be appreciated that the steps need not be performed necessarily in the order just mentioned, and it will also be appreciated that a member may join a number of different chapters in the locale depending on the interests of the member.

Figure 4:
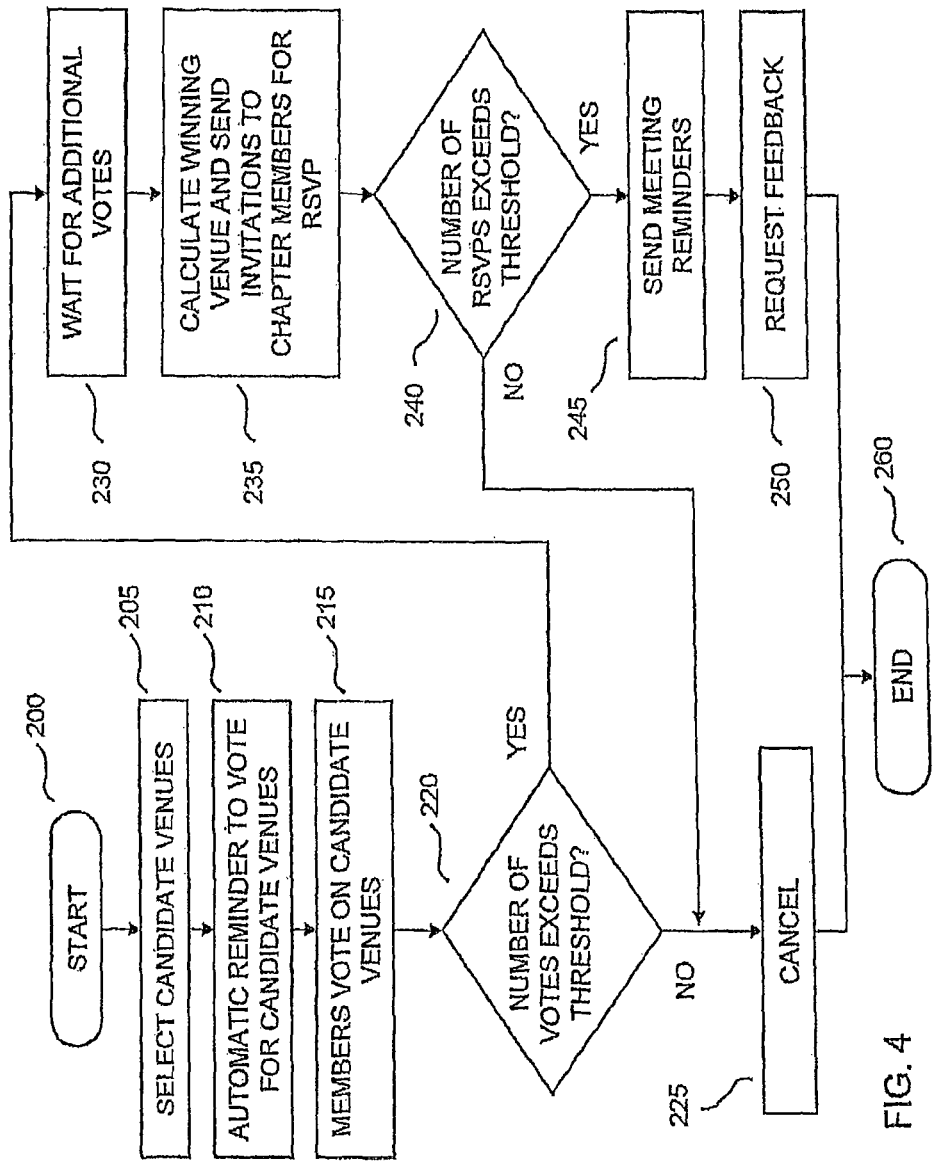
FIG. 4 shows an exemplary flow diagram of another part of the processing according to an embodiment of the invention.

FIG. 4 shows one manner of implementing part of a system according to the invention, in which the automatic scheduling of a meeting is performed. The example shown relates to the embodiment in which chapters do not have organizers, but may understood to apply, mutatis mutandis, to the embodiment in which chapters do have organizers.

Processing begins at step 200, and it is assumed that this processing takes place at an appropriate server, with suitable connections to the Internet. Of course, other hardware configurations could be used as meets the needs of the particular indications that work that is involved. It is also assumed that the system schedules meetings at a point in time that is in advance of the already-known meeting date. Thus, a database of meeting dates can be periodically consulted, and those meetings requiring automatic scheduling on any given date can easily be determined. The processing after step 200 therefore is described with respect to the scheduling of a given gathering or meeting, or, in other words, with respect to automatically scheduling an in-person gathering for the chapter at one venue of several associated with the locale.

To set up a gathering, the candidate venues for the gathering are selected at step 205. The system has a database of venues for public meetings, including information on opening hours and suitability for various kinds of chapters. The system offers a variety of choices to facilitate the selection of venues for the gatherings. For example, a crowded bar might not be the proper venue for practicing Spanish language, and a bar of any kind might not be acceptable for a meeting of a Bible Study chapter. The system automatically selects or rejects candidate venues for the gathering. In particular, the system evaluates the number of members in the chapter, proximity of the venue, and suitability of the venue for the topic, e.g., outdoor spaces for pets. Some of the suitability criteria can be mathematically calculated (such as the seating capacity of a particular venue compared to the average number of attendees for the meeting). Some of the suitability criteria can easily be implemented using appropriate rules (i.e., no topics involving pets in venues that serve food indoors, or, alternatively, all topics involving pets requiring venues that are outdoors). Other, more subtle criteria can be implemented with specific rules as appropriate. It may thus be said that the scheduling of the in-person gathering includes selecting the venue based on a characteristic of the topic and/or a characteristic of the number of active members in the chapter.

In addition, members may provide inputs to propose candidate venues. Venues may be organized by types. A categorization for venues may include a multi-level hierarchical listing similar to the one described above for topics of interest. For example, a particular coffee house may be categorized as follows: it is under the broad category "public places" and then under the narrower type of "coffee shops".

To propose candidate venues, a member can be provided with a listing of venue categories and the member selects the desired venue candidates for the locale. In addition, a member can simply browse through all venues in his locale. For any venue of interest, the member may view information about the venue. The information may include, but is not limited to, venue ratings made by other members, venue location information, directions to the venue and so on.

Venues are then automatically slotted on the ballot and the members are automatically invited to vote at step 210. Members vote on candidate venues in step 215, by means of any of the many well-known techniques for obtaining votes electronically. When the period for voting ends, the system automatically tallies up the votes at step 220. When too few members voted to select the venue, then the gathering may be canceled at step 225. The voters (the interested members who voted) may be directed to a nearby locale where sufficient number of users expressed interest in a gathering or they can be simply notified that the event is cancelled due to a lack of interest. The members are also free to arrange to meet privately using the message boards. When the analysis in step 220 indicates that enough members voted, the system may optionally wait for additional votes for a predetermined period of time at step 230.

When the optional additional voting period ends, the system tallies up the number of votes for various candidate venues in step 235, informs the members of the winning venue, and invites the members to make a reservation (RSVP) for the gathering. To prevent gatherings growing too large for a given venue, the system can also make a determination to split the gathering between two or more venues, based on a configurable threshold of votes, when more than one venue has received a minimum number of votes. This kind of determination may be performed using a configurable threshold for each venue, allowing the system automatically to split up groups exceeding the configuration. This threshold may vary from topic to topic, and chapter to chapter, depending on the needs of the topic and organizers, if any. The threshold may be thought of as a venue attendance threshold, and this threshold may be based on a characteristic of the topic and, in a led chapter, may be set by the organizer.

For example, for a political campaign topic, a gathering will may be set to occur for any venue on the ballot that receives at least 25 votes. In such a case, the system may automatically notify members that that more than one venue has been chosen, and request that the RSVP be made in such a manner as to indicate a chosen venue (which can be different than the one they voted for). This allows a group in a given locale to split into sub-groups that a) are sized appropriately so that a single venue does not become uncomfortably crowded, and b) allow users to meet at the most convenient venue for them, when a given locale has enough members to support multiple gatherings. To put it another way, when the number of votes from the chapter members planning to attend the gathering exceeds a venue attendance threshold, more than one venue for the gathering is automatically selected and the members are notified.

When the RSVP period ends, the system tallies up the number of members giving an affirmative RSVP (RSVPers) to determine if enough people are coming, at step 240. An affirmative RSVP may be thought of as an indication that a chapter member is planning to attend the in-person gathering, or as an attendance plan indication from the member. When less than a predetermined minimum number of members RSVPed in the affirmative, i.e., not enough members plan to attend the gathering, the gathering may be canceled at step 225. The attendance threshold may be determined on various bases, such as an minimum number of e.g. 5 for all gatherings, or may be determined based on a characteristic of the topic, such as 10 for basketball or 4 for bridge.

When the gathering is canceled, the RSVPers may be notified of the cancellation, for example, by email. In addition, the system may provide these RSVPers with a list of other chapters where sufficient interest for the topic was expressed.

As an alternative to canceling the meeting when the number of RSVPs is below the threshold, a special variant of a pre-event reminder mail may be sent, alerting users that turnout may be small so that they can make extra efforts to confirm attendance using message boards provided by the service.

On the other hand, if enough members RSVPed, the gathering takes place at the elected venue and the members who plan to attend are automatically reminded of the gathering, at step 245. One or more reminders may include the winning venue, directions to the winning venue, time and date for the gathering. Moreover, the reminders may include specific aspects of the particular topic to be discussed and so on. Reminders may be sent to only those who RSVPed, or to all chapter members.

After the gathering takes place, the system polls the RSVPers for quantitative and/or qualitative feedback (which includes any suggestions for the next gathering, suitability of the venue, whether the RSVPer attended the gathering, an estimate of the number of people who attended and so on), at step 250. When the user completes the poll, the system automatically sends a thank you message. An end to the process is shown at step 260 for the sake of a clear explanation, and at this step the system also archives the past gathering. The nature of the periodic gatherings, however, dictates that the process recur, and at a suitable time the processing begins again with step 200 for organizing the next gathering.

The messages mentioned above, including requests for RSVP, reminders, and requests for feedback may include appropriate advertising material, such as coupons for discounts at the selected venue or the like.

In a led chapter, the organizer can allow the system to organize the event, and then the process is as illustrated in FIG. 4. Organizers, however, may manually override a number of the above described steps. Organizers provide additional flexibility in organizing the gathering. As already mentioned, the organizer can add extra venues or replace venues on the system's voting ballot. The organizer can nominate new venues, including private homes. The organizer may simply choose a venue for the gathering, thereby overriding the need to vote. In addition, the organizer may select a different venue for gathering after the system tallies up the number of votes. The organizer can also cancel the gathering when there are too few members or for some other reasons. The organizer may set a threshold number of votes below which the gathering is automatically cancelled due to lack of interest and so on. In addition, the organizer may request the members to pre-vote on candidate venues to narrow the list of candidate venues. Moreover, the organizer may send members warning messages that too few members voted or RSVPed for the event, inviting other members to vote or to make an RSVP.

A determination may be made as to whether a chapter for the topic of interest exists in a locale convenient for the user. Such a determination may be performed in a variety of ways, including a calculation showing whether the chapter is within a predetermined radius such as one hundred miles, or a calculation utilizing latitude/longitude related information. When the chapter for the topic of interest does not exist in a locale convenient for the user, the user may automatically be invited a) to join a chapter for this topic of interest at a distant locale that is closest to the locale of the user, b) start his own chapter as an organizer, c) presented with a list of nearby chapters in related topics, selection of which is automatically calculated based on cross-membership information (e.g., "Members who signed up for Spanish Language chapters also signed up for Spanish Expat chapters") or d) add his name to a waiting list users who want to be informed when other chapters start nearby. The system can automatically detect when a predetermined number of users have indicated interest in a topic within a locale, and automatically determine to start a new chapter, electronically notifying the interested persons of the establishment of the chapter, and automatically schedule a first meeting.

In the illustrative, non-limiting embodiments mentioned above, gatherings are facilitated by allowing internet users all over the world to search for a topic of interest and find a real-world, local group that meets on that topic nearby. In addition, these exemplary systems allow users to form local groups around a common interest, and associate those local interest groups with similar groups around the world.

The present invention is a web-based, user interactive meeting facility for enabling groups of users to interact and organize in-person meetings associated with any topic of user interest to help maintain ongoing local interest groups, such as including topics relating to cooking, books, writing, pets, politics, social activism, small business, professional, education, environmental, science, community, investment, art, crafts, town meetings, sports, games, entertainment, music, religious, travel, personal, and the like. The meeting facility may allow a user to express an interest for a new group in a geographic area, form new groups based on the expressed interest of others, run and organize a group, organize in-person meetings, join an existing group, manage meetings, merge or coordinate with other groups, and the like. In addition, the meeting facility may provide for monetary management of meetings, provide sponsorship for meetings, generate financial benefits though group targeted advertisements, and the like. In embodiments, the web-based interactive meeting facility may provide an improved way for users to connect and meet with other geographically proximate users who share similar interests, as well as providing a way for groups around the world to coordinate activities.

For instance, an individual may have an interest in joining a group as a member, where the group shares an interest with the individual and has meetings within a local area accessible to the individual. The individual may go to a website associated with the meeting facility and search for a group, such as based on an interest topic, on a geographic region, from a list of top interests, and the like. In embodiments, the individual may also come to the meeting facility through an association with other social networking sites or from other individuals, where the individual may receive an invitation from a member of an existing group, from the organizer of a group, from another individual considering becoming a member of a group, through an Internet search, and the like. Social networking sites, such as Facebook and MySpace, may connect users of the social networking site to their meeting group, and vice versa, such as through an API of the social network site or the meeting facility. In embodiments, users may also be introduced to a meeting group through a plurality of on-line communications facilities, such as SMS, Twitter, Yelp, and the like, where the meeting facility may continue to facilitate communications between meeting facility members, and non-members, through these communications facilities and social networking sites. For example, meeting group events may be formed on-line, in a mobile ad-hoc manner, such as through user's texting or 'tweeting' each other, and forming impromptu meetings. In embodiments, the individual may also come to the meeting facility through a search engine, such as provided by the meeting facility or through a third-party search engine (e.g. Google or Yahoo). When the individual views one of the meeting group websites associated with the meeting facility for the first time they may view the site as a non-member. In embodiments, there may be different views of the website available based on whether the individual is a member, a non-member, a group organizer, and the like. In embodiments, the meeting facility may enable international participation, such as through the availability of multiple languages, currency, national restrictions, and the like.

In searching for a meeting group the individual may search by topic, by area, by viewing lists of top interests, by viewing the lists of top cities, and the like. When an individual finds a meeting group that they may be interested in joining, they may be able to view the group's homepage, which may include a description of the meeting group, activities, ongoing discussions, member profiles, photo galleries, fees for the meeting group, and the like. In embodiments, some meeting groups may be private, and their homepage may be viewed by only the organizer, members, or individuals that have been invited to view the site or to become a member by the organizer of the group. In this regard, the meeting group's organizer may have several options, such as to make the meeting group public, make the meeting group accessible by approval only, make the meeting group available to members who have an invitation or invitation code, close the meeting group to new members, and the like.

The non-member coming to the meeting facility website for the first time, without an invitation or the like, may find a public meeting group that they wish to join. In this instance, the non-member may enter, such as from an event page, but may need to join the meeting group before they are allowed to sign up for an event. For example, the individual may not be allowed to RSVP for an event before becoming a member, where RSVP may be one of a plurality of ways a user may indicate their interest in attending a meeting group event. The non-member who wishes to join the meeting group may be required to supply personal information, such as their name, nickname, email address, reason for joining, address, age, photo, caption for their photo, current activity level in other meeting groups, the current activity level within the interests of the group they are joining, and the like. In addition, the non-member applicant may be required to choose a password for access to the meeting group's homepage as a member. In embodiments, once the individual becomes a member, they may have additional access in association with the meeting group's homepage, such as being able to RSVP to events of the groups, participate in discussions associated with the group, provide photos from events, rate events, setup a way to pay meeting group fees associated with events and/or membership, view fee payment history, invite guests, print tickets to an event (e.g., with a map and location for the event, event description, and bar code) and the like. The member may be able to exchange money with the organizer and other members, such as though PayPal, Amazon FPS, and the like. In embodiments, the member may also be provided refund options, a list of payments made, and the like. In addition, the member may be able to provide support to the group's organizer, such as to be approved by the organizer to have access to certain organizer privileges. In embodiments, once the individual is a member they may more fully participate in events, receive emails concerning upcoming events, and the like.

Alternately, an individual searching for a group to participate in may not find a group, such as not finding a group matching the interest of the individual, not finding a group matching the interest of the individual in the individual's local area, not find a group matching the interest of the individual that is accepting new members, and the like. In this case, the meeting facility may provide a way for the individual to express their desire to be part of a group that currently does not exist, such as to fill out a web form to that effect, specify a topic and locale, and the like. In embodiments, the individual may be required to provide certain information associated with their desire to be a part of the new group, such as their name, photo, address, general location, distance radius of interest from a location, a statement expressing what kind of group they want to be a part of, the type or category of the new group, the geographic region for the new group, and the like. In addition, the individual may provide a pledge to the new group should the new group ever form, such as to come to the first meeting, to bring supplies, to pay a fee, to provide transportation, to provide a meeting location, to assist the organizer, and the like. In embodiments, the individual may be able to view other individual's information associated with their desire to also have a new group, such as by location, type or topic of interest, age, number of individuals interested in a given topic, and the like. In embodiment, the individual may express that they may be interested in becoming the organizer of a group, such as when there is a minimum number of individuals in a geographic region that are interested in a certain group topic. In embodiments, the individual may receive communications, such as emails, associated with their expressed desire to be a part a group not yet formed. In embodiments, user interest in a new group may be stored with the meeting facility, such as in a database, and be made available to users that may potentially want to become organizers of a new group. In this way, the meeting facility may be able to provide the potential user with the level of user interest to help the potential organizer to decide, what pledges are available, provide automatic services to form the group once the individual makes the decision to form the new group (such as sending out bulk emails to users that recorded an interest, setting up the web page, setting a date for the start of the new group, setting up an account in an integrated financial management facility associated with the meeting facility, providing sponsorship), and the like.

For example, the individual may be interested in becoming an organizer and forming a biking group in the vicinity of the New Jersey shore area, and they note that there are six other individuals near the shore that are also interested in being a part of a biking group. In addition, some of these individuals may have declared pledges for the first meeting of the group. The individual may then decide to start up the new group in association with the meeting facility. In embodiments, the individual may start the new group in association with the meeting facility, where the meeting facility helps the organizer set up the new group, such as by providing a homepage for the group, giving startup advice for starting a new group, providing a help-checklist for starting the group, providing an email announcement for the new group to the other individuals that expressed a desire to be a part of the new group, provide an announcement in association with the website of the meeting facility for all members and non-members to view, and the like.

In embodiments, in creating the new meeting group, the organizer may be able to create tags that will associate the group with the topics, interests, locale, and the like, of the new group. In this way, the group may then be identified through the tags to other groups, members in other groups, users looking for a group, external group and applications (e.g. social networking groups, news groups, city pages, regional events websites), and the like. In embodiments, the use of tags may lead to the formation of new groups, such as through a tagging facility for group organization and visualization, where tags may be used for matching users with similar interests, visualizing (such as through a mapping tool) the location of groups tagged with a given interest, visualizing groups indicated with a predetermined tag for the purpose of organizing events. For example, a tag may be created to correspond to a national grass-roots event, such as the anniversary of the Boston Tea Party, and groups that choose to have a tea party event may temporarily tag their meeting group to indicate that their meeting group is participating with a tea party event, and where the organizer's meeting group may now show up on a visualization map of all groups with that tag. In this way, other users, meeting groups, outside groups, may be able to see all the locations where meeting groups are holding an event. In embodiments, tags may be a way for meeting groups to be identified to the users and applications across the Internet, where tags may change as the interests of the group change, where interests of the group temporarily align with interests outside the group, where the group would like to get its members involved in a new interest direction, and the like.

In embodiments, the individual wishing to become an organizer of a new group may need to be approved by the meeting facility, such as to provide information associated with the new group, to provide personal information, to provide financial information for group management fees, to provide sponsorship information, location of the new group, reason for wanting to start the new group; and the like. The individual that starts a new group may be referred to as the group's organizer.

In embodiments, an organizer may be provided additional privileges, control, and/or facilities in association with running the group, such as a group homepage, fee options, control of wiki shared access with members or co-organizers, member listing, attendance control, last member contact information and email lists, member restrictions (e.g., public, private, restricted, and the like), creating a new meeting, facility for selecting a venue for a meeting, provide payment options, provide international access, capability to be associated with other groups in a collaborative manner, accept sponsorship to the group through advertisements on the web page, accept sponsorship by an organization to pay group fees, provided with access to a financial management facility for managing the financial matters associated with the group, and the like. The group's homepage may include a plurality of components, such as a group description, member information, discussions, calendar of events, links to products and group materials, a photo-board for events, ratings for events, attendance, hyperlinks to associated web pages, feeds, jobs, blogs, and the like. The components available to the organizer's homepage may be flexible in their selection and placement, such as in the use of meeting facility specific gadgets or third-party gadgets (e.g. Google gadgets). The organizer may also be provided with payment management resources, meeting management facilities, attendance control, fees control, and the like. In embodiments, the organizer may choose to share their organizer privileges with members of the group, such as though wiki aspects associated with the homepage.

Once the organizer has set up the new group, they may create a meeting event, such as selecting a date, time, venue, fees, payment options, sending out emails, listing the event on the group homepage, and the like. For instance, in a first meeting of the group the organizer may utilize any pledges that other individuals may have previously offered, specify fees associated with the group and/or meetings, specify needs for the meeting, specify any desire for shared responsibility for the group and/or the meeting, and the like. In embodiments, the meeting facility may provide for a plurality of homepage related functions to the organizer to make meeting creation and management easier and more efficient. For example, in creating a new meeting the organizer may be provided drop-down menus or the like for location of the meeting, such as a new venue, chosen from a list of past group venues for the group, chosen from a list of past group venues for all groups, and the like.

In embodiments, the organizer may provide information associated with the venue, such as location information, whether the venue is in a private or shared setting, a rating for the venue as provided from the group's past experience or from all group's past experience, a detail page with address and organizer specific descriptions or tags, a map such as through an annotated graphical user interface associated with the meeting facility, and the like. The organizer may select a venue based on these parameters, as well as being able to search for a venue based on location, street address, near a point of interest, near another venue, and sort by distance, alphabetical, popularity, and the like. The organizer may also examine reviews of venues from other groups, and filter the choices based on member and/or group attributes, view upcoming events at the venue, obtain additional information about the venue, such as whether the venue has parking, is kid friendly, and the like. The organizer may have access to a venue map facility as part of the meeting facility, where, for instance, the organizer may be able to bring up a map of an area, and where venues are indicated as the organizer moves across the map, and provided with all the available venue information by clicking on the indication (e.g. a pin or bubble, with an annotation of the venue's name, label, tag, and the like). The organizer may be able to choose between the meeting being public, private, limited member participation, by invitation only, and the like. The organizer may set RSVP settings and deadlines in association with a meeting, such as in connection with payment of fees for the meeting. The organizer may be able to contact members, such as based on their meeting activity, and set criteria for sorting and selection of members to be emailed, such as by the last time the member attended a meeting event.

The meeting of a group may entail a plurality of activities associated with the particular interests of the group, as well as activities that are associated with the management of the meeting, such as taking attendance, taking photos for the homepage, and the like. Post-meeting activities may include updating the homepage, scheduling new meetings/events, adding photos to the homepage, recording attendance, managing fees, posting received event ratings, and the like. In embodiments, some post-meeting activities may be organizer controlled, group controlled, co-organizer controlled, controlled by the meeting facility, and the like, as may be determined by the organizer.

In embodiments, the meeting facility may provide for a way for meeting groups to interact and associate with other groups, such as to form an alliance of groups. The purpose of the alliance may be to increase the access of membership to a larger geographic region, to help in achieving the goals of the groups, to combine forces for a movement, to allow groups to grow beyond their original geographic limits, and the like. In embodiments, the control and management of an alliance of groups may include many of the same meeting facility functions described herein (e.g., homepage, discussions, venue selection, membership, joining options, approval process, activity, wiki co-organizer functions, and the like), where rather than there being a group organizer, there is an alliance organizer. For instance, there would be group membership and group joining rather than individual membership and individual joining, and the like. Further, the alliance organizer may also be determined in a similar way, where they may be selected based on a first group organizer expressing an interest in forming an alliance, a first group organizer from a list of group organizers (that have expressed an interest in forming an alliance) expressing an interest in forming an alliance, and the like. Again, similar to groups, alliances may also be searched on and viewed, but in addition, due to the potentially national or global distribution of groups included in an alliance, a mapping facility may be provided to show the groups participating in the alliance. Groups may then search for alliances to join, and alternately, alliances may search for groups to invite into the alliance.

In embodiments, both groups and alliances may be required to pay management fees in association with the meeting facility. These fees may be required from the organizer of the group or alliance, or the fees may be paid by some sponsoring organization, such as an educational organization, governmental organization, company, and the like. For instance, a high school may sponsor a club site in association with the meeting facility, where the school rather than the organizer (e.g., a teacher or student) pays certain fees, such as a monthly maintenance fee. In another example, local political groups may be sponsored into a national alliance by a political organization, where the political organization pays certain fees.

In embodiments, advertisements may be utilized in association with groups or alliances, such as the placement of advertisements on their homepage, in discussion forums, communications, and the like. Advertisements may be coordinated, provided, or offered to groups and alliances through the meeting facility. Groups and alliances may choose to accept or to opt-out of advertisements, such as declining an offer supplied in an email, clicking on a decline button associated with the advertisement as placed on the homepage, specifying that the group and/or alliance is or is not interested in all advertisements, and the like. In embodiments, sponsored advertisements may help defer the costs of management fees, the cost of meeting events, provide products to members of the group, provide benefits to members of the group, and the like. In embodiments, groups and alliances may choose to opt-out of advertisements at any time. In embodiments, sponsorship may be provided to the organizer through the meeting facility, obtained by the organizer, be related to meeting groups using a venue associated with the sponsor, and the like.

In embodiments, the meeting facility functionality, such as non-member searching and viewing, member group activities, alliance participation, organizer management resources, financial management facility, member RSVPing, meeting check-in, connecting to social media through the meeting facility, and the like, such as described herein, may be accessed through a plurality of computer related facilities, such as a personal computer, a mobile computing device, a mobile phone, a cell phone, a navigation device, a PDA, a game, a mobile game device, through the internet, through a local area network, through a browser, through email, through instant messenger, through text messenger, and the like. In embodiments, the meeting facility may provide for social networking, group social networking, a governmental and/or community meeting resource, for social activism, governmental activism, environmental activism, a political organizational resource, an entertainment venue resource, international networking, personal networking, an enterprise meeting tool, an educational meeting resource, an entrepreneurial group resource, an professional group resource, and the like. In embodiments, the meeting facility may be incorporated into third party applications, such as other social networking sites, news groups, city events calendars, mobile device applications (e.g. i-phone applications, blackberry applications, and the like), third-party websites, search engines, and the like.

In embodiments the meeting facility may provide a financial management facility to the organizer for managing the financial aspects of the meeting group, including financial accounting, member payments, sponsor payments, refunds, batch refunds, dues, payments to vendors, payments for venues, payments for group activities, organizer payments to the meeting facility, and the like. In embodiments, the financial management facility may enable the organizer to export and/or import from third-party financial management applications, such as Quicken, Microsoft Money, Moneydance, FirstOffice, Lawson Software, SAP Business One, and the like. In embodiments, the financial management facility may enable the organizer to export and/or import from third-party spreadsheet applications, such as Microsoft Excel, Microsoft Works, Lotus 1-2-3, Appleworks, Wordperfect Quattro Pro, Google spreadsheets, Openoffice, and the like. In embodiments, the present invention may provide organizers and members with accounting utilities that ease the financial burdens associated with organizing in-person meetings amongst a disparate group of individuals, including facilities that provide a transparent accounting for users not accustomed to accounting software, more sophisticated accounting options for those individuals accustomed to third-party applications, charts and graphs to show status of payments, reminders and checklists, and the like.

Figure 5:
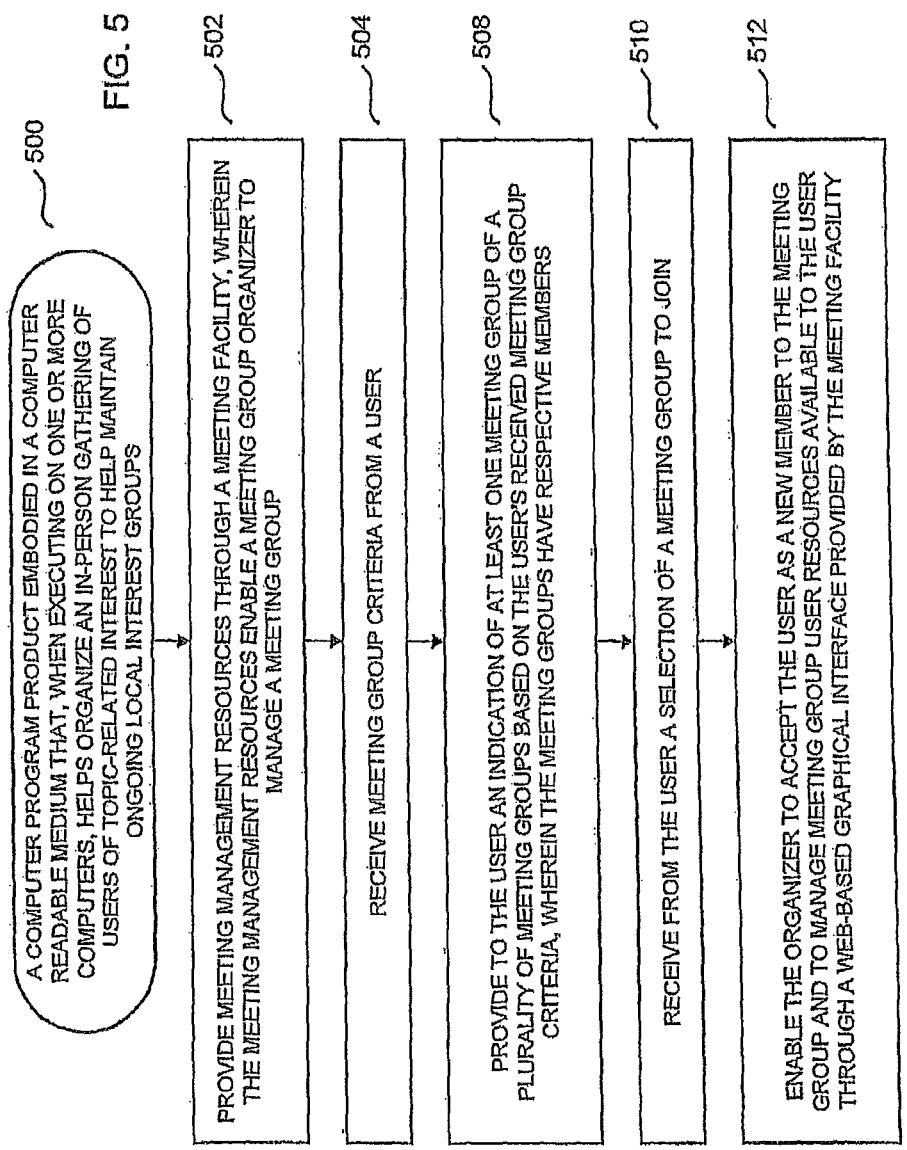
FIG. 5 shows a flow diagram showing how an organizer-based meeting facility may be implemented in an embodiment of the present invention.

Referring to FIG. 5, in embodiments the present invention may provide for an organizer-based meeting facility. For instance, a new user may locate a meeting group website managed by an organizer through meeting management facilities provided by a meeting facility, where the user may locate the meeting group website by entering meeting group criteria into a search interface (such as entering a zip code and/or topic into the search interface), entering general information related to an interest into the search interface, and the like, where the user may utilize intermediate search results, subsequent questions, and the like, to help locate the meeting group website. The user may then be provided information about the meeting group through the meeting group website, and be provided an opportunity to join the meeting group, wherein the organizer may have the ability to determine what information is available/visible to the user, and whether the user is allowed to join (such as through questions provided to the user through a joining interface provided through the website). After being allowed to join, the user may be provided meeting group resources managed by the organizer through meeting management facilities provided by the meeting facility, where the meeting group may be made up of the organizer and a plurality of users. Alternately, a user may not find a meeting group they want to join, where the meeting facility provides that user with a way to specify criteria for a meeting group they would like to be a part of, such as though an alert list, waiting list, and the like. That is, a user may utilize the meeting facility to help find a group in the future that matches their interests and locale. In turn, the meeting facility may use the interests provided by a plurality of such users to help form new meeting groups, such as through an organizer that is looking to form a new meeting group with a specified set of criteria. For example, a number of users may be looking for a hiking group near Albany N.Y., and seeing that there is currently no such group, may sign up with the meeting facility to be alerted when such a group forms. The user may also specify other interests, locations, and the like, for other meeting groups that currently don't exist. Continuing with the example, the meeting facility may provide a user with access to what interests currently exist for groups not yet formed, for instance, for a hiking group near Albany N.Y. In this case, the user may be provided with the interest level, such as how many users are on the alert list for hiking groups near Albany N.Y., and upon seeing such interest, may utilize the meeting facility to form a new meeting group, as described herein. In this way, an individual may be a user of the meeting facility without being a member of a meeting group.

In embodiments, a computer program product embodied in a computer readable medium that, when executing on one or more computers, may help organize an in-person gathering of users of topic-related interest to help maintain ongoing local interest groups 500 by performing the steps of: at a step one 502 providing meeting management resources through a meeting facility, wherein the meeting management resources may enable a meeting group organizer to manage a meeting group; at a step two 504 receiving meeting group criteria from a user; at a step three 508 providing to the user an indication of at least one meeting group of a plurality of meeting groups based on the user's received meeting group criteria, wherein the meeting groups have respective members; at a group four 510 receiving from the user a selection of a meeting group to join; and at a step five 512 enabling the organizer to accept the user as a new member to the meeting group and to manage meeting group user resources available to the user through a web-based graphical interface provided by the meeting facility. In embodiments, the received meeting group criteria may be input through a search interface, where the search interface may be provided through the meeting facility, through a third-party, a search engine, and the like. In embodiments, the meeting group criteria may include a geographic locale of the user, where the geographic locale may be provided by a zip code input by the user, determined through a computing facility (e.g. a mobile computing device, service provider) being utilized by the user, and the like. In embodiments, the meeting group criteria may include a topic, where the topic may be input by the user, selected by the user from a predetermined list of topics, selected by the user from a list provided by the search interface, and the like. In embodiments, at least one of the meeting management resources may be a calendar of meetings, where the calendar of meetings may specify a location for a meeting, a date and time for a meeting, and the like. The user may select to join one of a plurality of meetings included in the calendar of meetings, where joining may be through an RSVP facility, and the like. In embodiments, at least one of the meeting management resources may be access to at least one of the respective members of the meeting group the user joined, where access may be through email, instant messaging, to the organizer, and the like. In embodiments, the organizer may be able to share access to meeting management resources with select members of the meeting group. In embodiments, a meeting group may be referred to as a chapter. In embodiments, a user may find a group by searching, browsing, and the like. Meetup groups may have one or more topics, tags, and the like (where the words topics and tags are used interchangeably) associated with it. The tag may be pre-existing, or created by a user if the tag does not yet exist, such as in a database of the meeting facility. Once created, this new tag may be used by additional, new, or existing users.

In embodiments, a computer program product embodied in a computer readable medium that, when executing on one or more computers, may help organize an in-person gathering of users of topic-related interest to help maintain ongoing local interest groups by performing the steps of: providing a web-based meeting facility to a plurality of users, where each of the plurality of users choose to join at least one of a plurality of meeting groups based on topic-related interest and geographic locale; enabling at least one user-organizer to maintain control of organizing meetings with the at least one of the plurality of meeting groups, wherein the one of the plurality of meeting groups is made up of a subset of the plurality of users; and providing organizational facilities to the user-organizer through the web-based meeting facility for creating and facilitating activities of the at least one of the plurality of meeting groups, where one of the organizational facilities may be scheduling meetings. In embodiments, a user may 'join' the meeting facility simply by entering their email address and creating a password, and may not be required to join a group. They may simply select an interest (or no interests) and select to be notified when a group about any interest that they have selected starts near them. In embodiments, it may be possible for a meeting group to exist in a leaderless state, such as if an organizer steps down and removes themselves from that position. For instance, the group may remain leaderless for a period of a couple of weeks while a new leader emerges and steps up. In embodiments, if no new organizer steps up, the group may be disbanded.

Figure 6:
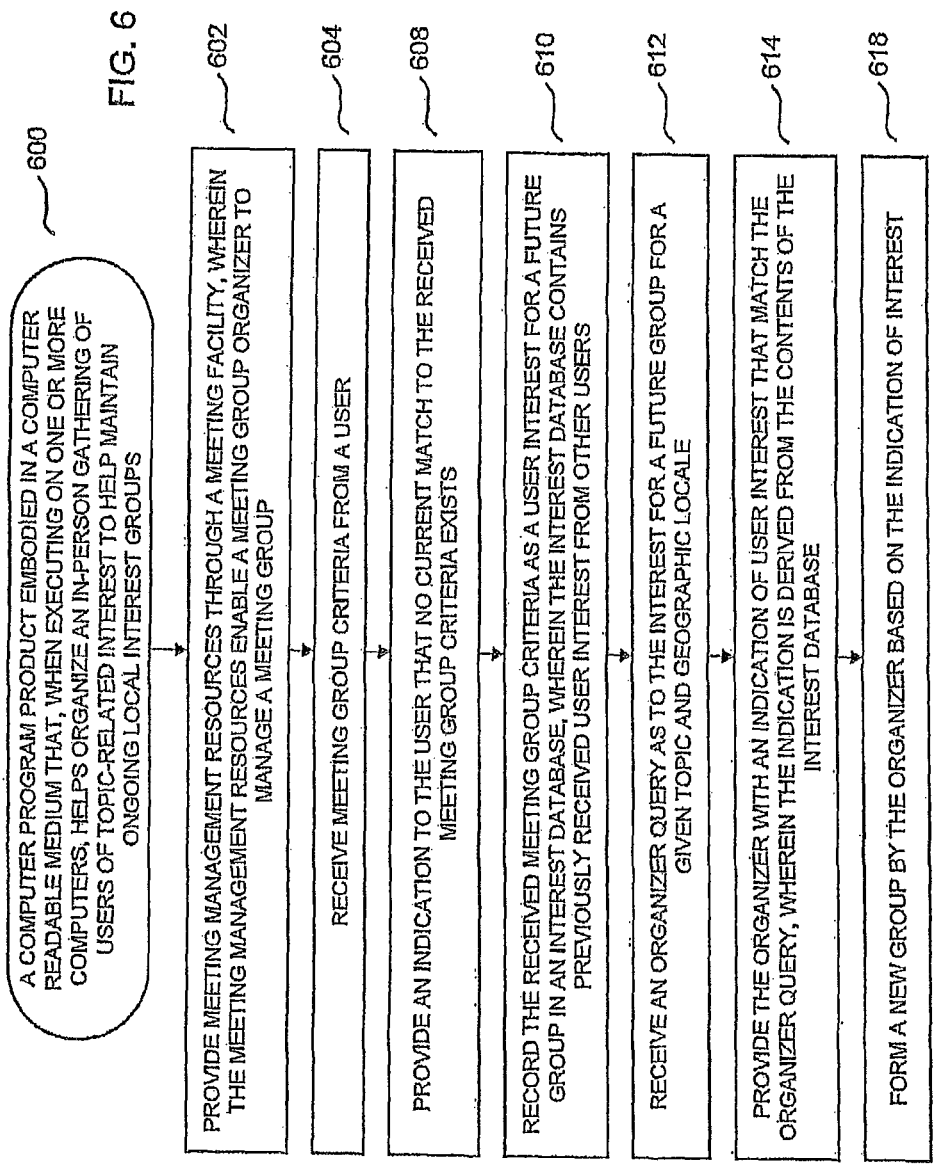
FIG. 6 shows a flow diagram showing how meeting groups may be formed through user generated interest in an embodiment of the present invention.

Referring to FIG. 6, in embodiments the present invention may provide for meeting group formation though user generated interest. For instance, a potential organizer may monitor interest presented by users in at least one of a topic and locale and decide to initiate the formation of a new meeting group using the resources of the meeting facility. In embodiments, a computer program product embodied in a computer readable medium that, when executing on one or more computers, may help organize an in-person gathering of users of topic-related interest to help maintain ongoing local interest groups 600 by performing the steps of: at a step one 602 providing meeting management resources through a meeting facility, where the meeting management resources may enable a meeting group organizer to manage a meeting group; at a step two 604 receiving meeting group criteria from a user; at a step three 608 providing an indication to the user that no current match to the received meeting group criteria exists; at a step four 610 recording the received meeting group criteria as a user interest for a future group in an interest database, where the interest database may contain previously received user interest from other users; at a step five 612 receiving an organizer query as to the interest for a future group for a given topic and geographic locale; at a step six 614 providing the organizer with an indication of user interest that match the organizer query, where the indication may be derived from the contents of the interest database; and at a step seven 618 forming a new group by the organizer based on the indication of interest. In embodiments the forming of the new group may be automatically formed once the organizer chooses to form the new group based on the indication of user interest, where the automatic formation may include emails to users with recorded interest matching the organizer query, meeting management resources made accessible to the organizer, and the like. In embodiments, meeting group criteria may exist, but the user may ignore that group and choose to sign up for an alert list anyway. In embodiments, an organizer may have to pay and provide information to the meeting facility before the group is formed, and in this way the group may not be formed in a completely automatic way. In embodiments, the meeting facility may provide time to a new organizer to set the meeting group up before emailing those in the local area who have signed up to be notified when a relevant meeting group starts near them, such as based on their pre-selected topics. In embodiments, users signed up through an alert list may be notified of the formation of a new meeting group and choose to join, choose to not join, choose to remain on the alert list until another meeting group is formed, and the like. In embodiments, if an existing meeting group is disbanded, the members of that group may be placed back on an alert list for the topics that were assigned to the meeting group that they had been a member of. In such a case, when a new group is formed matching their topics or tags, they may be re-alerted through the process of the alert list as described herein. In embodiments, users that are on an alert list may also receive regularly scheduled targeted system email newsletters highlighting meeting groups and group events relevant to their interests (i.e. topics or tags) that they may have missed.

In embodiments, the present invention may provide for a computer-implemented method of receiving an indication of interest from a user in participating in a meeting group, where the indication of interest may be indicative of a user preference for a type of meeting group; accumulating indications of interest for a plurality of users; and upon accumulation of sufficient interest in a type of meeting group, facilitating communication to users that have indicated interest in that group suggesting the forming of a meeting group.

Figure 7:
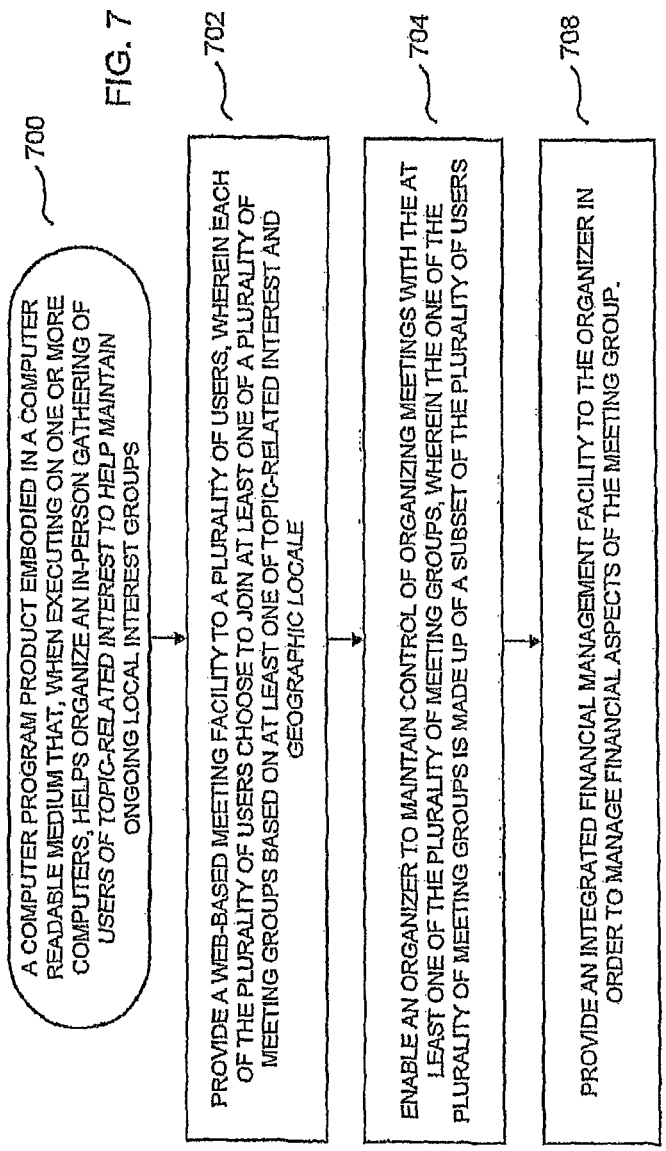
FIG. 7 shows a flow diagram showing how the meeting facility may include a integrated financial management in an embodiment of the present invention.

Referring to FIG. 7, in embodiments the present invention may provide for a meeting facility with integrated financial management, where an organizer may be able to manage the financial obligations of at least one of the meeting group and individual meetings, through an integrated financial management system provided by the meeting facility. In embodiments, a computer program product embodied in a computer readable medium that, when executing on one or more computers, may help organize an in-person gathering of users of topic-related interest to help maintain ongoing local interest groups 700 by performing the steps of: in a step one 702 providing a web-based meeting facility to a plurality of users, where each of the plurality of users may choose to join at least one of a plurality of meeting groups based on at least one of topic-related interest and geographic locale; in a step two 704 enabling an organizer to maintain control of organizing meetings with the at least one of the plurality of meeting groups, where the one of the plurality of meeting groups may be made up of a subset of the plurality of users; and in a step three 708 providing an integrated financial management facility to the organizer in order to manage financial aspects of the meeting group. In embodiments, the integrated financial management facility provides an integrated centralized accounting facility for the finances of the meeting group. In embodiments, the financial aspect may be a financial obligation by a user, a payment to the organizer (e.g. the payment is from a user, from a user for payment of dues), from the meeting facility, a refund, a batch refund to users, for an event expense, for expenses associated with the running of the meeting group, and the like. In embodiments, the integrated financial management facility may utilize financial resources provided from a third-party application, such as a financial enterprise application (e.g. Amazon, PayPal), a financial management application (e.g. Quicken), a spreadsheet application (e.g. Microsoft Excel), and the like. In embodiments, a user may 'join' the meeting facility simply by entering their email address and creating a password, and may not be required to join a group. They may simply select an interest (or no interests) and select to be notified when a group about any interest that they have selected starts near them. In embodiments, the financial aspect may be a payment from the member to the organizer, for dues, for fees for specific events, and the like. All of these payments may be transacted either offline in cash (and simply recorded in the financial management facility) or transacted online, such as via PayPal or Amazon payments, who are third party systems that integrate in varying degrees with the meeting facility functionality. In embodiments, once a member has paid the organizer, that member may get a refund, such as initiated by the organizer (e.g. via a financial payment facility such as Amazon payments or PayPal). If the payments have been received for an event where the organizer is using a financial payment facility, the organizer may initiate a batch refund of all payments related to that event. In embodiments, there financial scenarios of payments between members and organizers may not necessitate the meeting facility being involved in the transaction, but merely provides the software facilitation. In embodiments, group revenue generated through sponsorships generated by the meeting facility may also be included in the financial management tools and integrated with the financial payment facility.

Figure 8:
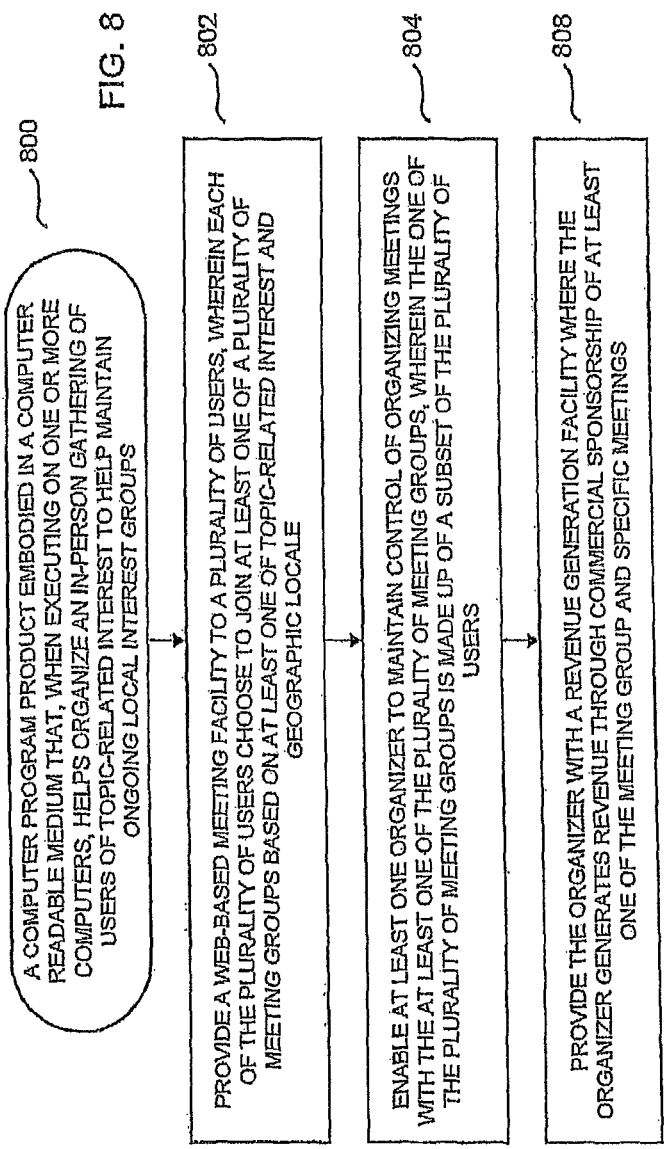
FIG. 8 shows a flow diagram showing how revenue may be generated through sponsorship in an embodiment of the present invention.

Referring to FIG. 8, in embodiments the present invention may provide revenue generation though sponsorship, where a user may create a meeting group and generate revenue through commercial sponsorship of the meeting facility site and/or specific meetings. In embodiments, a computer program product embodied in a computer readable medium, a computer implemented method, and the like, that helps organize an in-person gathering of users of topic-related interest to help maintain ongoing local interest groups 800 by performing the steps of: in a step one 802 providing a web-based meeting facility to a plurality of users, where each of the plurality of users may choose to join at least one of a plurality of meeting groups based on at least one of topic-related interest and geographic locale; in a step two 804 enabling at least one organizer to maintain control of organizing meetings with the at least one of the plurality of meeting groups, where the one of the plurality of meeting groups may be made up of a subset of the plurality of users; and in a step three 808 providing the organizer with a revenue generation facility where the organizer may generate revenue through commercial sponsorship of at least one of the meeting group and specific meetings. In embodiments, the commercial sponsorship may be provided by a sponsor through the meeting facility, by the organizer, and the like. The commercial sponsorship may include an advertisement placed on a meeting group website provided through the meeting facility. The commercial sponsorship may be the sponsor providing revenue to at least one of the organizer and the meeting facility for use of the sponsor's venue. In embodiments, a sponsor which has been recruited by the meeting facility may have their ad placed on a meeting group if the sponsor selects that group to be sponsored, and the group accepts the sponsorship, where this may be referred to as an opt-in sponsorship. in this situation, the sponsor may provide revenue to the meeting group via the meeting facility, utilizing the financial management tools described herein, and a third party financial payment facility (e.g. Amazon and PayPal). In embodiments, a sponsor which has been recruited by the organizer may have their ad placed on a meeting group by working out the arrangement directly with the organizer, and where the meeting facility may not handle the placement of the ad created on the group website or compensation to the group by the sponsor. The organizer may however record receipt of revenue from the sponsor in the financial management tools manually. In embodiments, the organizer may reorder the placement of the ad units for sponsors that they recruit on their webpage, and hide ad units of their sponsors which they do not want to display. Ad units which are sourced by meeting facility may not be moved or hidden by organizers, but may be removed at any time, which may end their participation in the sponsorship and payments from sponsor to organizer (made via the meeting facility) will cease.

Now that the overall system has been described, we turn towards a set of web-based embodiments of the present invention. It should be understood that the following embodiments are meant to be illustrative of how the present invention may be implemented, such as implemented through an Internet website hosted on server and made available to users across the internet on computing facilities as described herein, and are not meant to be limiting in any way.

In embodiments, the present invention may include a register or sign in page, where the page may have links to public pages on the site; the Organizer Center, the main Discuss Meetup.com Message Boards, the Home page, and the like. The page may have a plurality of tabs, such as meetings by topic, meetings by city, start a meeting, 'what's a meeting', and the like. The page may have a register or sign-in prompt. Features and functionality may include a register for a new meeting account or sign in. Also included may be a 'forgot your password' prompt, to request verification link to reset a password. In addition, a user may sign in using a secure server option.

In embodiments, the present invention may include a member account page, detailing a view of information requested during an account creation process. Included may be account information, personal and payment information, personal information, name, user ID, email address, password, location, birthday, Skype name, and the like. In addition there may be features and functionality associated with what a member may change and how a member may toggle between a personal and payment information tab, and a membership and communications tab, and the like. Meeting group memberships may be listed in alphabetical order with mailing list options. The page may itemize other communication options, including meetings in the Making (list profiles and messages), message boards (updates), general preferences (member to member email and greetings), email from the meeting facility options, a global unsubscribe option, and the like. From this page, a member may leave a meeting group, adjust their mailing list settings, add or edit a profile photo, cancel message board subscriptions, edit a meetings in the making profile, picture and settings, subscribe or unsubscribe to email from meetings, unsubscribe from the meeting facility service, and the like.

Figure 9:
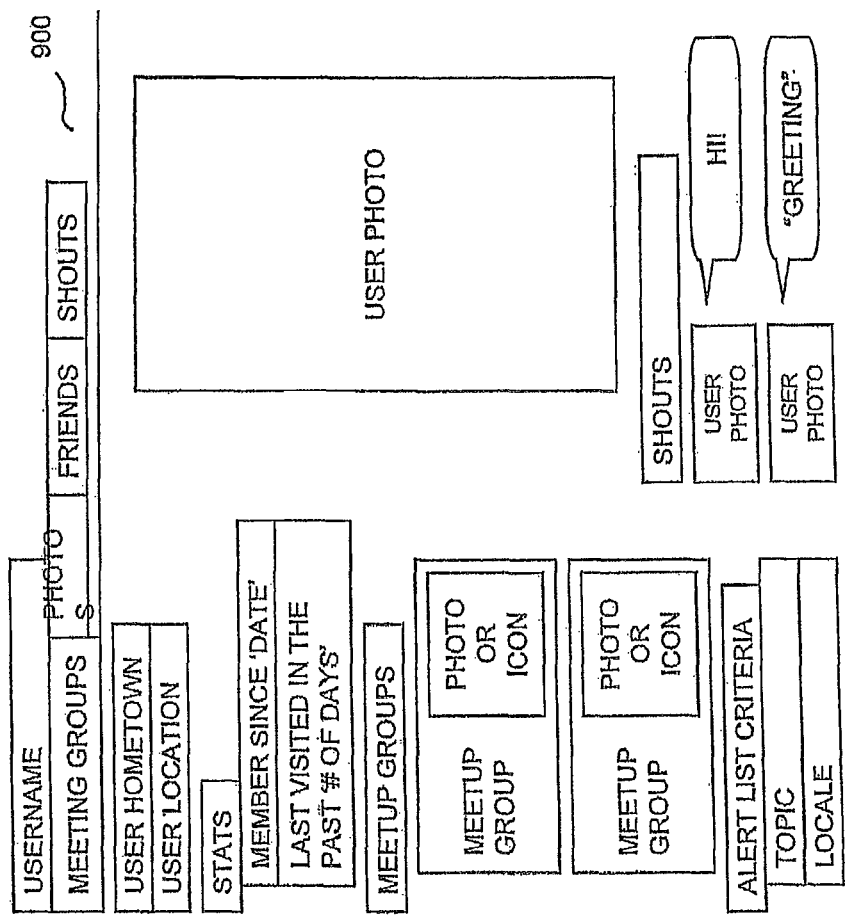
FIG. 9 depicts an embodiment of a main profile page.

FIG. 9 depicts an embodiment of a main profile page 900, showing a number of tabs including the main profile page, meetings, photos, friends and greetings, and the like. The header may include personal information, such as member's user name, and basic membership content (e.g. hometown, location, statistics, meeting memberships, and the like.) In addition, features and functionality may include how a member may privatize selected information, including meeting group memberships and meetings in making list subscriptions, change links, statistics, editing greetings, and the like. A photos tab may display photos uploaded to the site by a member. In embodiments, a member may choose to show or hide photos, manage photos, and the like. A friends tab may be included, such as showing both mutual and members who have added the user as a friend, including popular topics among friends in a list format, and the like. A member may post a greeting to a friend's profile, remove a friend, block a friend from linking to their profile, and the like. A greetings page may be included, where greetings may be shown next to each member profile who posted the text. A member may be able to send a greeting back by clicking on the link associated with the greeting, delete a greeting, save a greeting, and the like.

In embodiments, the present invention may include a meeting-by-topic page, where a member may search for a meeting by topic, such under categories, popular topics, growing topics, using the topic search box, and the like. In embodiments, clicking on a category may bring you to a category page, with a list of category-specific topics, clicking on the popular topics or growing topics sections may bring you to a topic page, where you may search for a meeting by area, zip code, and the like.

Figure 10:
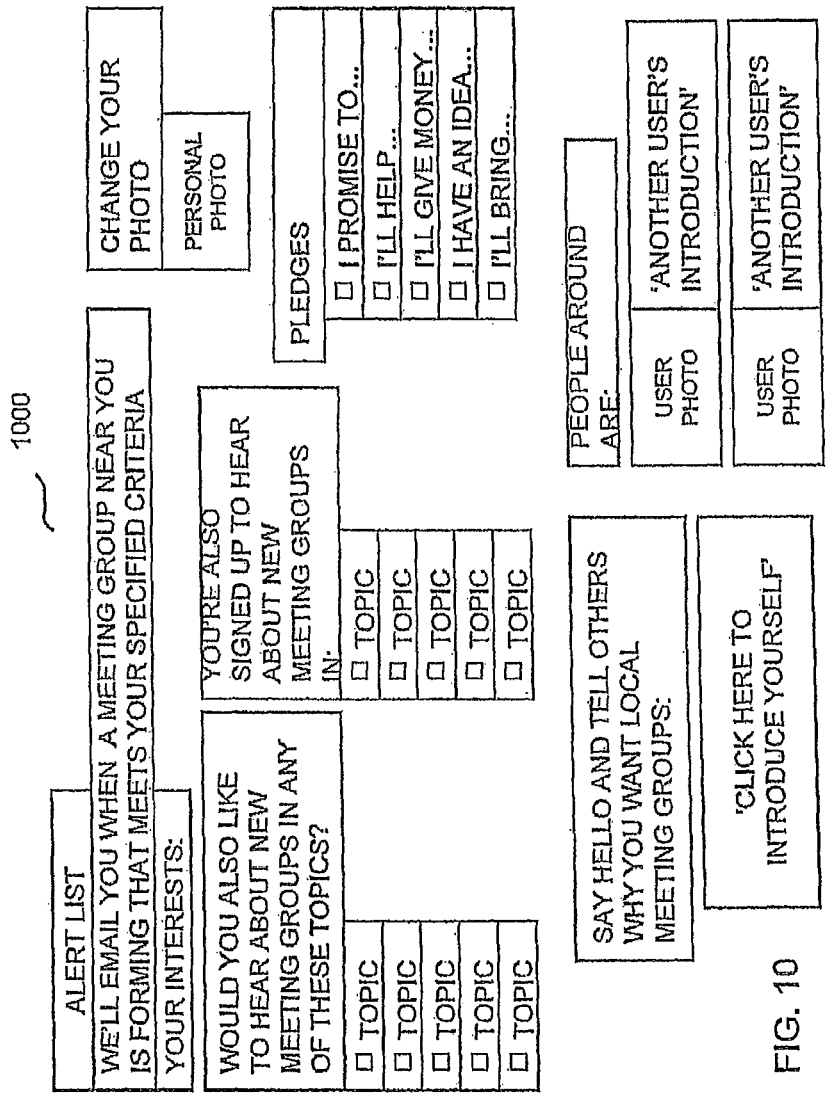
FIG. 10 depicts an embodiment of an alert list process page.

FIG. 10 depicts an embodiment of an alert list process page 1000. When there are no Meeting Groups in a given topic and locale, members may be directed to the alert list sign up page, which may be alternately referred to has a waiting list, a meeting in the making list, and the like. The alert list may include a plurality of users who have registered with the meeting facility, but for which there is no current match. In this way, a user may be included as a user of the meeting facility but not be a member of any group, that is, they may be users of the meeting facility in that the meeting facility provides a vehicle for the user to be alerted to groups that match the criteria they provide to the meeting facility that specifies the types of meeting groups they would like to be involved with. In embodiments, the topic home page may include links to worldwide topic relevant pages on the site; 'Welcome' page (topic home), Worldwide (topic specific) Message Boards, and the like. A member may add interests, add introduction copy, add or change profile photo, add pledges, and the like.

In embodiments, the present invention may include a city page, which may allow a member to sign up for a weekly city email newsletter, or view popular topics, newest meetings in the area, and the like. In embodiments, a member may be able to add an RSS subscription for a feed of all new meetings, receive weekly calendar of upcoming meetings via email, select a popular topic, subscribe to different formats, such as Atom, iCal, Outlook, and the like.

In embodiments, the present invention may include a meeting home page, which may link public pages, an organizer center, a discussion message board, home page, and the like. The page may include a plurality of tabs, including meetings by topic, meetings by city, start a meeting group, and the like. There may be a way for an individual to introduce themselves to the meeting facility community, such as with a photo and a caption. The individual may also be able to subscribe to a free weekly newsletter for local meetings, be provided with a list of other meeting groups that the individual might like, and the like.

In embodiments, the present invention may include a meeting group sign up page, where the individual may sign-up, where an individual may submit a profile to join a meeting group, create a meeting account, submit a profile to join a meeting group, and the like.

FIG. 11 depicts an embodiment of a start a meeting group page 1100, which may include a search interface or search facility for finding a topic that the individual will create the new meeting group in, and in which the meeting group may be customized. Customizing may include specifying the location of the group, name of the group, a photo of the organizer, a description of what the group is about, when meetings are, whether the group and/or meetings are private or public, communications options, RSVP options, scheduling options, enable/disable message board and/or mailing list, purchase options, coupon options for sponsorship programs or check payments, money back options, secure transactions options, payment options, and the like. In embodiments, after the meeting group has been created, a notification to those individuals who have signed up may be sent, such as within a period of time after creating the meeting group. FIG. 12 depicts an embodiment of a new organizer group home page 1200 with start planning meetings options, including congratulations text and organizer checklist banner, notification that meeting groups in the making list announcement and invitations will be sent within 72 hours, organizer help and tools, email the meeting group and the organizer's checklist, group pages such as 'welcome', 'about us', 'calendar (default page to plan a meeting), 'members', 'photos', 'messages', 'polls', 'files' and 'promote', organizer profile, 'schedule meeting' button to add meeting to the calendar, and the like. Features and functionality may include click through to organizer checklist options 'create a descriptive title', 'write an agenda' and 'pick a date and time', edit your meeting group options to edit title, date, enter a location, and customize general meeting details, add a photo, set RSVP options and 'schedule meeting' button, and the like.

In embodiments, the present invention may include an organizer account page, including information requested during account creation and subscription. The member may change the various information, such as their name, userID, email address, password, location, birthday, Skype name, and the like. The 'your subscription' section may allow an Organizer to change the subscription renewal option, see full payment history, opt to start receiving payment receipts, change/update credit card information and cancel subscription (renewal). A contact billing support link may allow organizers to use a contact form through the site to contact meeting facility support. An organizer, co-organizer, assistant organizer, and the like, may step down from that position in a meeting group. As a member, an Organizer may also leave a meeting group, and edit their mailing list settings. In addition, there may be the option to subscribe/unsubscribe to meetings in the making lists or adjust settings, cancel message board subscriptions, adjust general email preferences (who can contact member), unsubscribe from the meeting service completely, and the like.

In embodiments, the present invention may include an organizer help and tools page, with subject tabs including news, settings, meetings and locations, communicate, grow, help, and the like. Various help facilities for helping an organizer set up the group may be provided, such as for the meeting name, meeting location, a description of the group, other topics that may suit the meeting group, when meetings are held, what are members called, writing a message to new members, adding a photo for the homepage, private vs. public settings, invitation settings, messaging settings such as for email and message board, update feeds, profile questions, new or leaving member emails, fee settings, Wiki sharing settings, manage the meetings button that may lead to a calendar page, create a new meeting button, manage the locations button, create a location button, communications broadcast settings, create and view polls, add profile questions, personalize the 'about' page, and the like. In addition, there may be an organizers' forum, which may link to a main discuss meetings forums, such as the organizer forum, an organizer center, which may link to how-to articles posted to the organizer resource center, a facility for 'finding an organizer meeting near you' that may link to an organizer topic homepage, map and search option, list of largest and newest Organizer Meetings, and the like. There may be provided a frequently asked questions (FAQ) section that may link to an organizer FAQ from the help section. There may also be a contact for linking directly to a home page. There may be help provided to an organizer to help grow the group, such as adding information into the group's blog or into social networking sites, create customized products, create a social network application, how to invite others to the group, create flyers and business cards, create logos, and the like.

In embodiments, the present invention may include an organizer email page for various communications options, including using the message board, using mailing lists, archived mailing lists, emailing an individual, using an email form, and the like. Using the email form may allow the organizer to click to 'see more options' and send messages to subsets of members; including mailing list members, all members, inactive members, members associated with specific meetings, and the like. The page may also allow the organizer to post messages to the message board, preview, provide correspondence through the site, and the like.

FIG. 13 depicts an embodiment of an organizer's checklist, such as to provide suggested tips an organizer may complete in order to run a more successful meeting group. Each option may summarize functionality or offer a tip. Tips may have links to settings, functions, organizer center articles for more details, and the like. In addition, the organizer checklist may be disabled from the settings tab.

Figure 15:
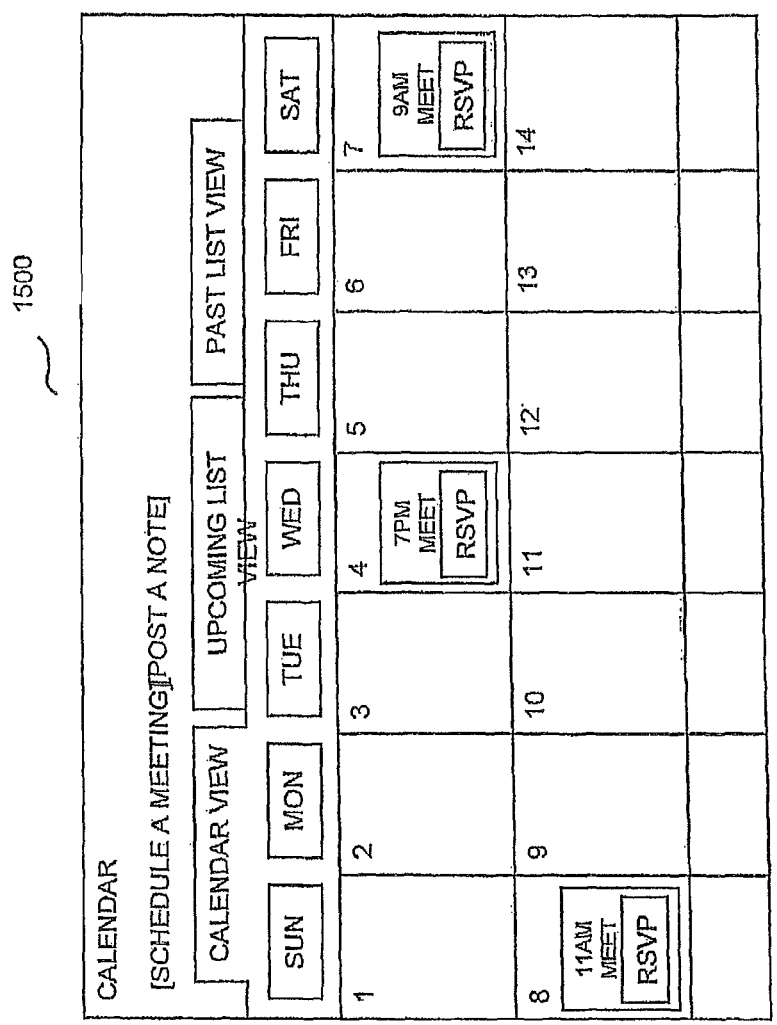
FIG. 15 depicts an embodiment of a calendar page.

In embodiments, the present invention may include various meeting group resource pages, including the member home, meeting group home, about us, calendar, photos, group settings, organizer resources, promote, find a meeting group, city calendar, and the like. FIG. 14 depicts a member home page 1400 that may be what the member sees when they login, and may allow the member to list all upcoming meetings for the member, such as sorted by date, and the like. The meeting group home may provide pages about a specific group, and may include a feeds for what is new to the group, a main header for the group, mailing lists, message boards, schedules, and the like. The about us page may provide the group's own wiki or mini-web site. Both the organizer and the members (with the organizer's permissions) may create as many pages as they like. The meeting group's calendar page 1500, as depicted in FIG. 15, may provide a place to post notes associated with group activities and meetings. The photo page may be provide to each group, and may be organized as albums around activities and meetings, where photos may provide links to further information. The group setting page may be a central place for all settings that may be used in the management of the group. The organizer resources page 1600, as depicted in FIG. 16, may be a central place for all organizer resources, including an organizer's checklist, organizer resource center, organizer message board, promote your meeting group, frequently asked questions, contact meeting group support, find an organizer meeting group near you, payments you've collected, and the like. The promote page may provide a centralized page for all resources associated with the promotion and growth of the group. The 'find a meeting' page may be the central location provided to search for groups within the meeting facility. In addition, the city calendar 1700, as depicted in FIG. 17, may provide for a city, regional, area, summary of all the meetings occurring for a given area.

FIG. 18 depicts an embodiment of a portion of a 'creating an event' page 1800, where organizers have the option to charge members and how to implement payments, such as choosing the payments option (e.g., Amazon Payments, PayPal). For instance, the organizer may calculate how much to charge based on what they want their members to pay OR what they want to pocket (user can edit either the "Attendees pay" . . . or the "You will receive"). There may be an option to require payment to be linked to an RSVP, such as checking a box to indicate that members must pay via Payments when they RSVP, or not checking indicating members can RSVP, and pay however they want (e.g. via Amazon, with cash, etc). Using Payments may also mean the organizer may have to enter a refund policy that members read and accept when they RSVP. In embodiments, there may be an RSVP response page.

FIG. 19 depicts an embodiment of a printable ticket 1900, which may include the name of the event, date and time of the event, fees, a map showing the location of the event, a unique bar code for the event, and the like.

FIG. 20 depicts an embodiment of a payments received page 2000, which may provide a list of all the events an organizer has set up for which they're charging their members, such as by using Amazon Payments or PayPal. Details of each event may be viewed, including refund management, printing of tickets, communication with members, and the like. Event details may also be viewed, where the organizer may see the payment status of each of their members.

In embodiments, the present invention may include other options introduced into the event creation process, including the ability for organizers to set an RSVP deadline for their members (i.e. the event is on Friday but the organizer needs to know by Wednesday how many people are definitely coming). In addition, organizers may ask their members questions when members RSVP (e.g. email info, emergency contact, and the like).

Figure 21:
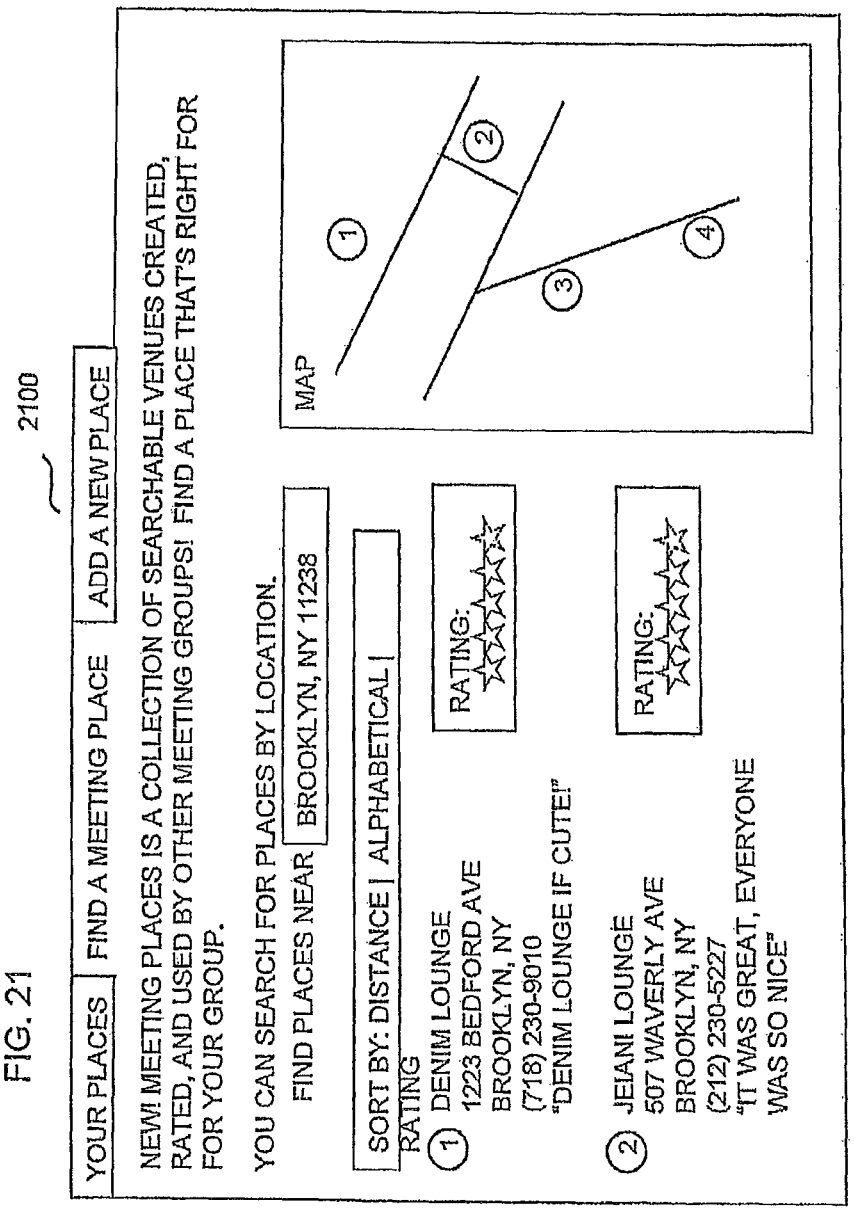
FIG. 21 depicts an embodiment of a find a meeting place page.

FIGS. 21 and 22 depict embodiments for how an organizer may choose the venue (i.e. the location or place) for a meeting of the group, including pages for 'your places' for venues the organizer has used before, find a meeting place 2100 for locating a new place to meet, venue details 2200, editing venue details, adding a new place, posting an event/venue survey, and the like. The organizer may save information detailing venues that the group has used before, and may choose to share this information with other groups, which may also include a review of the venue. The organizer may search for a new venue, as from venues that have been shared by other organizers. Searches may sorted based on location, address, being near a point of interest, and the like. The search may provide a map detailing all venues within an area of interest. The organizer may be able to view venue details, including reviews, ratings, directions, a description of the setting, schedule of other meetings at the venue, revision history, changes to the venue, whether the venue public or private, loud, kid friendly, and the like. In embodiments, the organizer may be able to sort reviews based on the user type, location, member, and the like. The organizer may also be able to add a new venue, such as by adding information and their experience with the group at the site. A group may provide a post event survey that includes a review of the venue.

In embodiments, the present invention may include a member titles page. Organizers and assistant organizers may give their members "titles.", such as for organizers assigning roles to their members (e.g. venue scout, chief cookie bringer, etc.). However, the organizer may also use member titles for other purposes, such as for humorous reasons, tracking attendance, for an event experience, money owed, and the like. These member titles may be added, edited, deleted, made public, kept private, and the like, and may show up whenever the member is referenced or displayed in association with the meeting group.

In embodiments, the present invention may include an organizer's checklist, where the meeting facility helps new organizers get their groups off the ground, such as identifying techniques that could help them succeed, and pushed them to the organizers as "tips." These tips may be checked off when completed, and show as checked off on all associated pages. As tips are checked off there may be a completion indicator updated, such as a sliding banner bar, a percent complete, and the like. FAQ articles may also be linked to tips and advice.

In embodiments, the present invention may include a pre/post event discussion page, where members may post comment about the event, including posting comments from the post event survey, comments in a chat box, and the like. Comments may be edited or deleted by the organizer.

In embodiments, the present invention may include an attendance taking widget. After an event occurs, an organizer may edit attendance to accurately determine who attended and who was absent. The organizer may change the RSVP of a person after the event occurs. For instance, if someone RSVP'd "Yes" but did not attend, the organizer may click the "Mark as absent" button and they are moved to the absent side. Or, if the person is marked absent but actually attended, the organizer may edit the entry.

In embodiments, the present invention may include facilities for meetings in the making, the process by which an individual may express their desire to be a part of a group that doesn't yet exist within the geographic region that the individual has access to. In an example of a local topic page, one of these pages may exist for each intersection of a topic and a locale. In embodiments, individuals may come to these pages after doing on-line searches; such as a Google search. For example, if an individual searched "Taoism group New York", they might end up on a site. If there are no meeting groups in the topic/location that an individual is looking for, or if they don't want to join the available groups for some reason, they may sign up to be notified if new Meeting Groups start. Listed below any meeting groups (if any), may be a list of people who have signed up for through this process of "Meetings in the Making", which may display each person's name, a short intro they write, their photo, location, date, and the like. And for example, if someone were to start a new Taoism Meeting Group near New York, each of these people would receive an email inviting them to join. Upon signing up, an individual may introduce themselves and add a photo, choose other related topics, change location-radius, opt-in to a weekly update, and the like. Upon first signing up, the individual may receive a welcome email. The email may recommend other meeting groups related to the topics they've signed up for. From then on, whenever anyone starts a new meeting group in the topics you've chosen, the individual may be invited to join with a "New Meeting Group" email. The "New Meeting Group" email may be generated by the meeting facility a few days after someone starts a new meeting group. An organizer may use this time period to get their group ready for its announcement. Members of meetings in the making may also opt-in to a weekly update email. This may repeat any new meeting groups that formed that week. It also may show a sample of one person from each topic list an individual has signed up to hear about, with a count of how many people are on each list. The weekly update email may also include some recommended meeting groups and a short version of the weekly calendar of meetings near the individual. This way, individuals with no new meeting groups in one week may see a mixture of other new content.

In addition, upon signing up for meetings in the making, the individual may also make a pledge. These may be promises to help out in some way if a new meeting group starts. An individual may check off as many pledges as they like, or write in their own. Seeing that other people have offered their help encourages potential organizers to step up and start a new meeting group. In embodiments, if an individual may be reminded of their pledge when they hear about new meeting groups via the new meeting group email. If an individual joins a meeting group, that group's organizer may be notified that you pledged, and prompted to follow up with you about it. In addition, an individual's pledges may show up on their profile, but may be only visible to themselves and their meeting groups' organizers. In embodiments, organizers may be encouraged to return to local topic pages from time to time, such as to recruit new members to their meeting group. They may be especially encouraged to recruit people who have pledged, since this is a sign that these people are very interested and are more likely to be active members. If an organizer is logged in, they may use envelope icons that may be next to each name to send that person an email invitation to their meeting group.

In embodiments, the present invention may include a greetings page, also referred to as a shout. Greetings may be messages posted on the site, sent from a single Meeting member to another. Individuals may be prompted to post greetings in several places on the site, and may be most centrally on each person's profile. The individual may write a greeting on the overview profile page or the greetings tab page. The overview page may have a truncated list the individual's greetings, where the greetings tab page may list them all, and may be sorted based on date, meeting group, a friends listing, and the like.

In embodiments, the present invention may include a mailing list page, which may be a distribution list that allows everyone in the group to email everyone else. Organizers may control whether the group gets a mailing list. Members may be able to control how often they receive messages, where they may email by using a unique email address, or from a form on the site. In addition, the user may have the option to automatically post all mailing list emails to the message boards. Members may be able to email organizers, other members, and the like, such as through a facility on the individual's profile page, in a directory of member contacts, in a mailing list page, by searching for the member through a search facility provided through the group meeting facility, and the like. The email may contain information about the sender, such as their name, their affiliation with the meeting group (e.g. organizer, assistant organizer, member), other meeting groups the sender is a member, and the like. In the case of other meeting groups, the email may contain links to the other meeting groups. In this way, emails from a member may increase the exposure of the associated meeting groups through the member's activity on in the system.

In embodiments, the present invention may include how the meeting facility may be associated with a social network site, such as Facebook, MySpace, Bebo, Hi5, Orkut, and the like. Social network sites may be accessed through the meeting facility, such as through a meeting group promote page, which may link the member directly to the social network page. The member may sign-in to add to add a meeting group to a social network profile, link to the search tool for finding meeting groups, link to register with the meeting facility, block meeting group links, and the like. In embodiments, the individual may search for meeting groups without adding the social network application to their profile. From the social network an individual may display a meeting group's welcome message, link to join a meeting group, link to a group's page, link to a start a meeting page, link to a search for meetings, and the like. After a user agrees to add the social network, the application may appear on the user's profile page, such as displaying meeting groups the user organizes or is a member of, event name links to an event page, list all meeting groups that member is part of, link to refresh the list of meeting groups, link to edit the list of meeting groups, and the like. In embodiments, there may be a group information page, which may include the group's welcome message, a next event listing, a listing of members also available in the social network site, a link to view user's list of meeting groups, a link to a view a list of meeting groups that friends are in, a link to find meeting groups, a link to the site associated with the meeting facility, and the like. A member may be linked to RSVP functionality in association with the social networking site, such as displaying an event description, options for RSVP, displaying photo and links to list of meeting groups, display RSVP responses, link back to group page, and the like. In embodiments, there may be a way to view all the meeting groups that friends are a part of, including their names and photo, the group names, and the like. In embodiments, this may be available to those friends who also have the meeting facility application installed, and for those who do not, they may be invited to add the meeting facility application.

Figure 23:
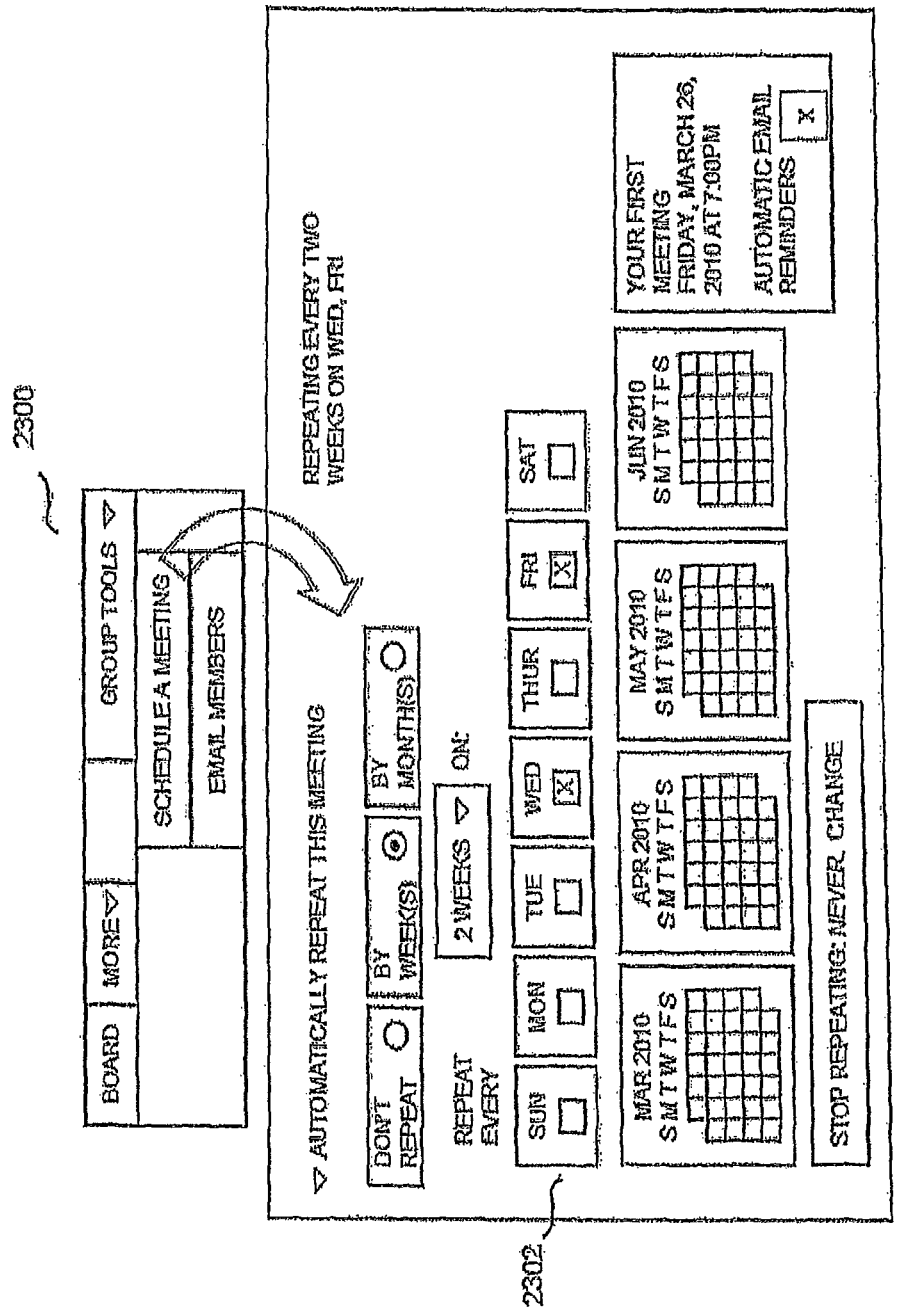
FIG. 23 depicts an embodiment of a calendar implementation for an automatic scheduling user interface.
Figure 24:
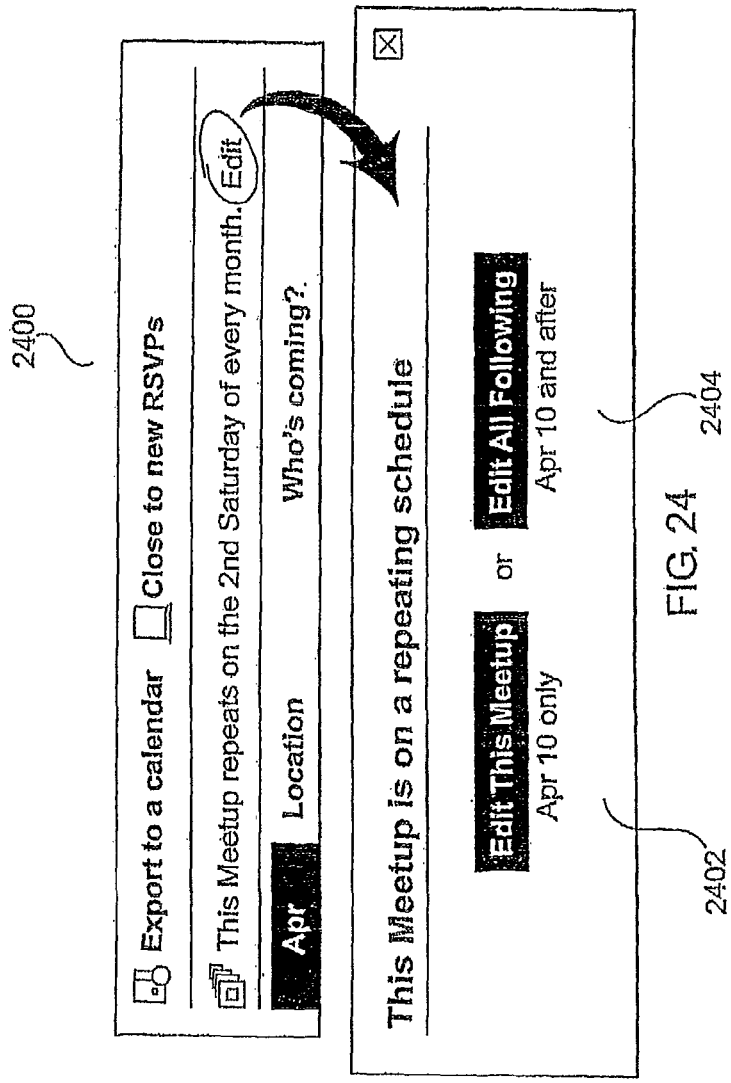
FIG. 24 depicts an embodiment of an edit function for automatic scheduling.

In embodiments, the present invention may provide for an automatic scheduler for scheduling a series of repeating meetings or events. In embodiments, the automatic scheduler may be presented as a function through a calendar, such as described herein. The automatic scheduler function may be turned on for individual meetings or events, and so may enable multiple series of meetings or events at once. The automatic scheduler may provide for selectable settings, such as for a repeat period (e.g. weekly, monthly, yearly, bi-weekly, multiple days per week, and the like), reminder settings, stop date for when the repeat series will end, setting rolling dates for when RSVPs are open or closed, who is invited, who is organizing, and the like. Individual repeating meetings or events may be customized, the settings may be applied throughout the series, there may be default settings, and the like. The automatic scheduler may apply settings to be common throughout the series. In embodiments, the automatic scheduler may enable time savings for users, improve attendance, grow the community, and the like. FIG. 23 provides an example automatic scheduler user interface 2300, showing how a user may schedule a meeting to be automatic, such as repeating on some time basis, and being displayed through a calendar interface 2302. Additionally, FIG. 24 shows how a user may be provided with a meeting edit function 2400 for editing the meeting schedule, including editing the repeat of a particular meeting 2402, editing the repeat of all the following meetings 2404, and the like.

In embodiments, an organizer or co-organizer may put the organization of a meeting group on 'automatic pilot', such as in an instance when the organizer was going to be away, when the organizer doesn't have time to attend to the management of the group, and the like. In this instance the automatic scheduler may be turned on, setting up recurring events based on an event the organizer had set up; automatically picking the date, time, and possibly location, based on what the system thinks is best for it's topic and location, based on trends that are known, such as from other groups, and the like. Trending may be provided through the meeting facility, such as through software algorithms, through third party facilities, provided manually by individuals, and the like. In embodiments, the automatic pilot mode may also pick topics for events, or suggest topics to members for members to select through voting for an event. In embodiments, optional or individual features may either be disabled or on automatic as well. For example, only public groups may be on automatic pilot; or if the group is "approval only", all members will be auto approved.

In embodiments, the present invention may provide for a computer system for organizing in-person gatherings of users of topic-related interest, such with a web-based meeting management facility having a user interface accessible to a plurality of users, wherein each of the plurality of users may use the user interface to join at least one of a plurality of meeting groups based on at least one of topic-related interest and geographic locale; a server-based automatic control facility for enabling at least one organizer to automatically control the organization of meetings of a meeting group without intervention of the organizer, and the like. Automatic control may enable an automatic scheduler for a meeting, event, and the like, of the meeting group, such as presented to the users. The automatic scheduler may provide for a selectable setting, such as a meeting repeat period, a reminder setting, a rolling date for RSVPs, who is enabled to be invited, a fee that is set to be free or set to a certain amount, and the like. Automatic control may automatically pick a meeting criteria, an event criteria, and the like, such as a time, a date, a location, a leader, a topic, and the like. Automatic control may automatically pick a meeting criteria, an event criteria, and the like, based on trends from past activities of the group, such as trends of the organizer's group, trends of another group, trends of another like group (e.g. one hiking group setting automatic features based on another hiking group's trends), and the like. Automatic control may provide a voting mechanism for choosing criteria for a meeting through voting amongst users, for taking inputs from users and creating a meeting, event, and the like.

In embodiments, the meeting facility may provide for a "collaboration mode", where the collaboration mode may allow for members of a meeting group to create and collaboratively edit meetings associated with the meeting group, such as where the organizer enables members to schedule and plan meetings. Organizers may choose to enable members to: propose meetings, build on other's suggestions, help find places for meetings and commit to attend meetings while they're still 'in the making', and the like. Organizers of a meeting group may have the ability to enable or disable this new collaboration feature in one of several sub-modes, such as in a closed mode, a moderated mode, an open mode, and the like. For instance, an organizer may select "closed" mode, which may disable this feature entirely. In the closed mode the ability to create and edit meetings may be limited to the group leadership team, as described herein. Organizers may alternatively choose a "moderated" mode where any member of the group may propose a meeting but where the organizer retains approval rights and must approve any meeting before it is confirmed as an official group meeting. Meetings created in moderated mode may be visible to all members in the group, a select set of members, and the like, and members may have the ability to vote for the meeting to be approved. For instance, after a certain number of members vote to have the meeting, the organizer may be notified and choose to approve the meeting. An organizer may also choose an "open" mode where any member of the Meetup group may add or edit any meeting. In addition, organizers may choose to make an individual meeting editable by all or a subset of members of the group regardless of the collaboration mode the group is running in. For example, this may allow an organizer to select "closed" mode but nonetheless allow members of that group to edit certain aspects of that specific meeting, such as time/date, location, or other details of the meeting.

In embodiments, a computer system for organizing in-person gatherings of users of topic-related interest may include a web-based meeting management facility having a user interface accessible to a plurality of users, wherein each of the plurality of users may use the user interface to join at least one of a plurality of meeting groups managed by an organizer and based on at least one of topic-related interest and geographic locale, where a user becomes a member when they join the meeting group, and wherein the meeting management facility includes collaborative meeting management resources to allow the organizer to set the meeting group into a collaborative mode where the collaboration mode allows for members of the meeting group to at least one of create and collaboratively edit meetings associated with the meeting group.

Figure 37:
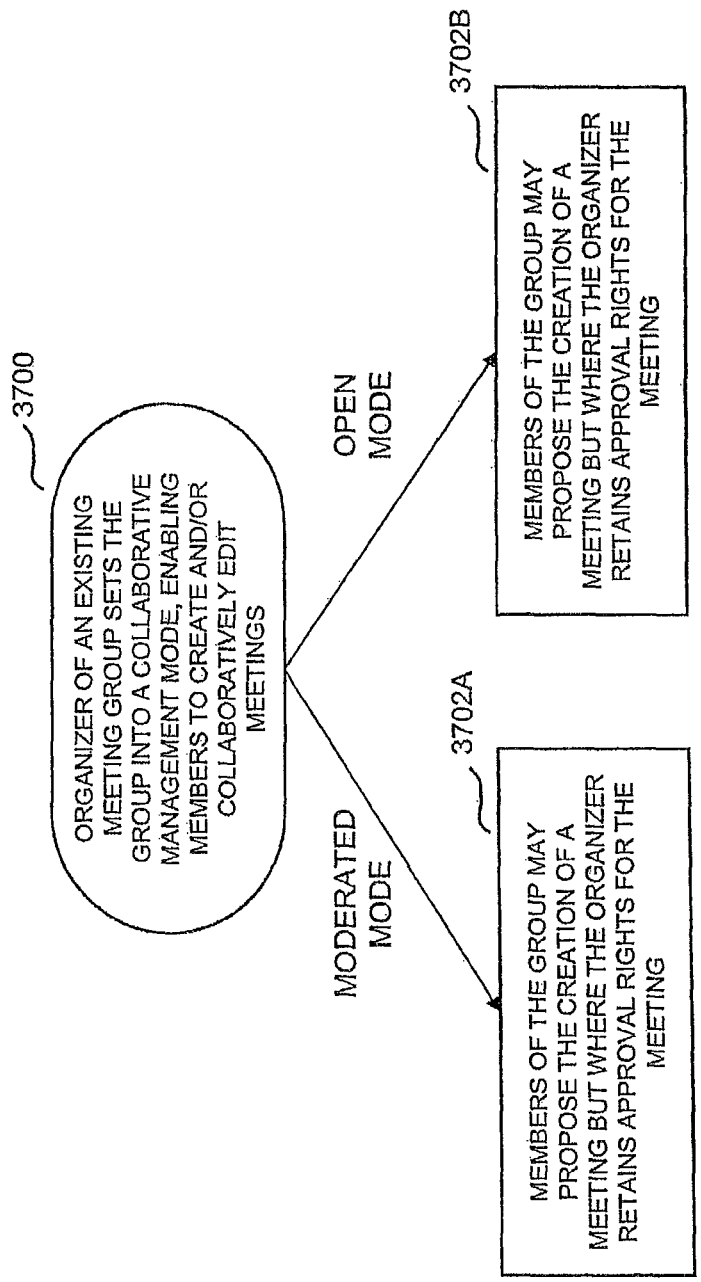
FIG. 37 depicts an embodiment flow diagram for a collaborative mode of managing meeting groups.

Referring to FIG. 37, in a first step 3700, an organizer may set the meeting group into a collaborative management mode, enabling members to create and/or collaboratively edit meetings. Optionally, as shown in step 3702A, the organizer may select a moderated collaborative mode where members of the group may propose the creation of a meeting but where the organizer retains approval rights to the meeting, which may also include a notification of members of the group of the proposed meeting, where members have the ability to vote for the meeting to be approved, where only a subset of members may be able to vote for a meeting to take place, where after a certain number of members vote to have the meeting the organizer is notified, and the like. Optionally, as shown in step 3702B, the organizer may select an open collaboration mode, where a member of the meeting group is able to add or edit any meeting. The collaboration mode may be set to a closed collaboration mode where members are disabled from any features available through collaborative meeting management resources. Although this collaboration mode has been described in terms of an organizer and a meeting group, the collaboration mode may also be applied to a promoter and an event as described herein, where the various sub-modes (e.g., open, moderated, closed) may be controlled by a promoter or coordinator with regard to collaboration with event participants. In embodiments, the organizer may choose to make a meeting editable by a subset of members of the group regardless of the collaboration mode, such as where the editable features that members are able to edit include the time, date, location, and the like, of the meeting.

In embodiments, meeting groups may share and/or promote activities with external facilities, such as with a social network, Twitter, Facebook, Rich, LinkedIn, Tumblr, Foursqure, a blog, a website, and the like. For instance a meeting group for traveling may want to tweet their travels as they go, and the present invention may provide a facility to link the meeting group's activity through Twitter. In embodiments, this may enable a meeting group to connect with other popular sites across the web. For instance, a user of the present invention may be able to post to Facebook or other website, such as posting to their Facebook Wall and/or their friend's news feeds when they RSVP for a meeting or event, schedule a meeting or event, join a meeting group or event, and the like. In an example, after a person joins a group, they may be taken to a profile question page, where they can check off, "Tell your Facebook friends that you've joined this Meeting Group", or the like. Then they may be prompted to log in to Facebook. In another example, after a person RSVPs for a meeting or event, the member may be presented with a link to invite friends to join them. For instance, a link may include links for connecting to friends through Facebook, Twitter, and other like social media. In embodiments, the link may appear on the RSVP confirmation sent to the member after they RSVP. Once the connection is made to the social media, a more direct connection to friends may be enabled, such as invite-linked names and/or photos of your friends listed in the confirmation correspondence so the person may easily click on the friends they want to invite to join them at the meeting. In addition, there may be a search facility for finding friends in the social media to connect, to invite, and the like. When a person invites a friend, the friend may receive an invitation to attend the meeting, such as shown on the webpage of the friend's social media facility (e.g., on the friend's Facebook wall), though email, through IM, and the like. The invitation may include information about the meeting, such as the name of the meeting, location, date and time, photo, map, comment link, and the like. In embodiments, individuals may share groups, events, photos, and the like with these external facilities. For example, sharing group information may include an organizer, member, non-member, and the like, sharing a group to their newsfeed on Facebook or Twitter through the user interface. In this instance, the group name with a link back to the group may be shared. In another example, sharing event information may include an organizer, member, non-member, and the like, sharing group events with a link back to the group, and event details shared. In another example, members may share RSVPs, such as posting their RSVP to their Facebook newsfeed through the user interface, where group and/or event information may be posted, with a link back. In another example, an organizer, member, non-member, and the like, may share photos, such as to their Facebook or Twitter account. In embodiments, an organizing may link an external facility, such as described herein, to their meeting group.

In embodiments, recommendations regarding meeting groups, events, members, and the like, may be made to members or non-members based on activity through the web-based meeting facility (e.g., a member's activity through a website user interface provided by the web-based meeting facility), activity on a social networking site frequented by a member or non-member, social networking information associated with the member or non-member, and the like. Information derived from the at least one of these sources may then be used to make recommendations, such as recommending meeting groups, events, and the like that they might enjoy based on their interests. For example, Facebook's connect feature allows Facebook users to connect their Facebook accounts to third-party services, including their photos, friends list data, basic public information, and the like. In an embodiment, once a user accepts Facebook's connect feature, the system could take the user's stated interests (such as in the "interests" field of Facebook profile) and utilize that list in determining a user's "alert list topics." If there is a meeting group with a tag that matches the user's Facebook interests, the system may notify them of that group. For instance, if on Facebook the user says 'I'm into vintage cars', but did not list vintage cars in their meeting alert list as a topic they're interested in, the system may send them Meeting groups about vintage cars via email, highlight these groups as recommended when they search on Facebook, and the like. In embodiments, recommendations may also be made based on a social graph, recommending groups, events, and the like, based on groups your social network friends are in. For example, if a user is friends with you on Facebook, and they are searching for groups or events through the meeting facility, the user may get a message (e.g. via some UI indicator) saying, "your friend Bill Jones is attending this meeting group" or "Your friend Bill Jones is a member of this group." Although Facebook is depicted in the preceding examples, it will be appreciated by one skilled in the art that recommendations may be based on user information derived from any social networking sites where such information is available. In embodiments, recommendations may be provided to a user based on their activity on the web-based meeting facility. For instance, a user that has joined a meeting group about a certain topic, attended events about a certain activity, and the like, may be recommended to other meeting groups, events, and the like with similar or related topics or activities. For example, a user may currently be a member of several outdoor and travel meeting groups, but has recently attended a meeting group for photography. This user may never have listed photography as an interest before, so they may have not previously received recommendations to new groups, events, and like for photography. The system, having recorded the user's recent activity in a photography group now may provide the user with recommendations related to photography. In embodiments, the user may also be asked if they would like to receive these new recommendations associated with photography, be enabled to opt out of the new recommendations, and the like, where the user may be able to maintain control of the recommendation topics for which they receive reminders. In another example, a non-member user may attend a meeting group as a guest. The system may then store the guest user's personal information and topic of the meeting group, and send the guest user recommendations based on their guest participation in the meeting group, such as in a introductory recommendations list to the web-based meeting facility groups, events, members, and the like. Further, if personal information was provided, the guest user may be provided recommendations based on their interests as derived from third-party sites, such as social media sites, and the like.

In embodiments, the present invention may implement a computer implemented method for providing recommendations for an in-person meeting group, comprising collecting user information (e.g., user information from a member user's activity on the web-based meeting facility, user information from a non-member user as a guest to a meeting group, user information from a user derived from a social network site, and the like), where the user information provides information related to topical interests and location information for at least one of a plurality of users; comparing the user information with a topical listing of in-person meeting groups in the same geographical region as the at least one user, wherein the in-person meeting group is formed and maintained through a web-based meeting facility; and providing an in-person meeting group recommendation to the at least one user based on the comparison. In embodiments, the user information may be gathered from a user database maintained through the web-based meeting facility. The user information may be associated with at least one other user in the user database with whom the user shares group membership. The user information may be associated with at least one other user in the user database with whom the user has shared a previous in-person meeting, where sharing may be indicated through the user and the other user RSVP'ing to the same meeting, through the user and the other user checking-in to the same meeting, and the like. The user information may be from user-provided information to the web-based meeting facility, from a friends list, from a friends list maintained through the web-based meeting facility, a friends list provided by the user. The user information may be gathered from a third-party social networking facility, such as provided by the user to the social networking facility, provided by the user through permission to gather the user information from the social networking facility. The user information from the social networking facility may be contained in a social network diagram, such as relating to social interactions within the web-based meeting facility, within or between third-party web facilities such as social network sites. The location information may be at least one of the city, ZIP Code, region, and the like. The recommendation may be for an in-person meeting group, for a meeting of an in-person meeting group, for an event, and the like. The recommendation may be emailed to the user, provided to the user though the user interface of the web-based meeting facility, provided to a third-party social networking site, and the like. In embodiments, the recommendation may be based on a collaborative filtering algorithm that is based on analyzing similarities between interests of a user and interests of a member of a group.

In embodiments, meeting groups or event participants may upload photos directly from their mobile communications facility, such as a cell phone, to the meeting facility. For instance, photos may be uploaded from an iPhone, Droid, blackberry, and the like, through the Snapup application. In an example, a user may open up a meeting or event from their phone, indicate they want to add a photo, snap the photo, add a caption, and upload the photo, where the photo may now be available for viewing as the meeting or event is happening. In embodiments, meeting groups and event activities may be available through a user's mobile communications facility, such as future and past meetings and events, RSVPs to upcoming meetings and events, get directions, view RSVP lists, have discussions, search for a group or event, view meeting group information, view event information, join a meeting group, join an event, and the like. In addition, live streaming of video may be utilized to support a meeting or event, such as though UStream, Livestream, Slideshare, and the like. In embodiments, through the ability to upload photos and video as a meeting or event is occurring, anyone may potentially share in the real-time event, even if they couldn't get there themselves.

Figure 25:
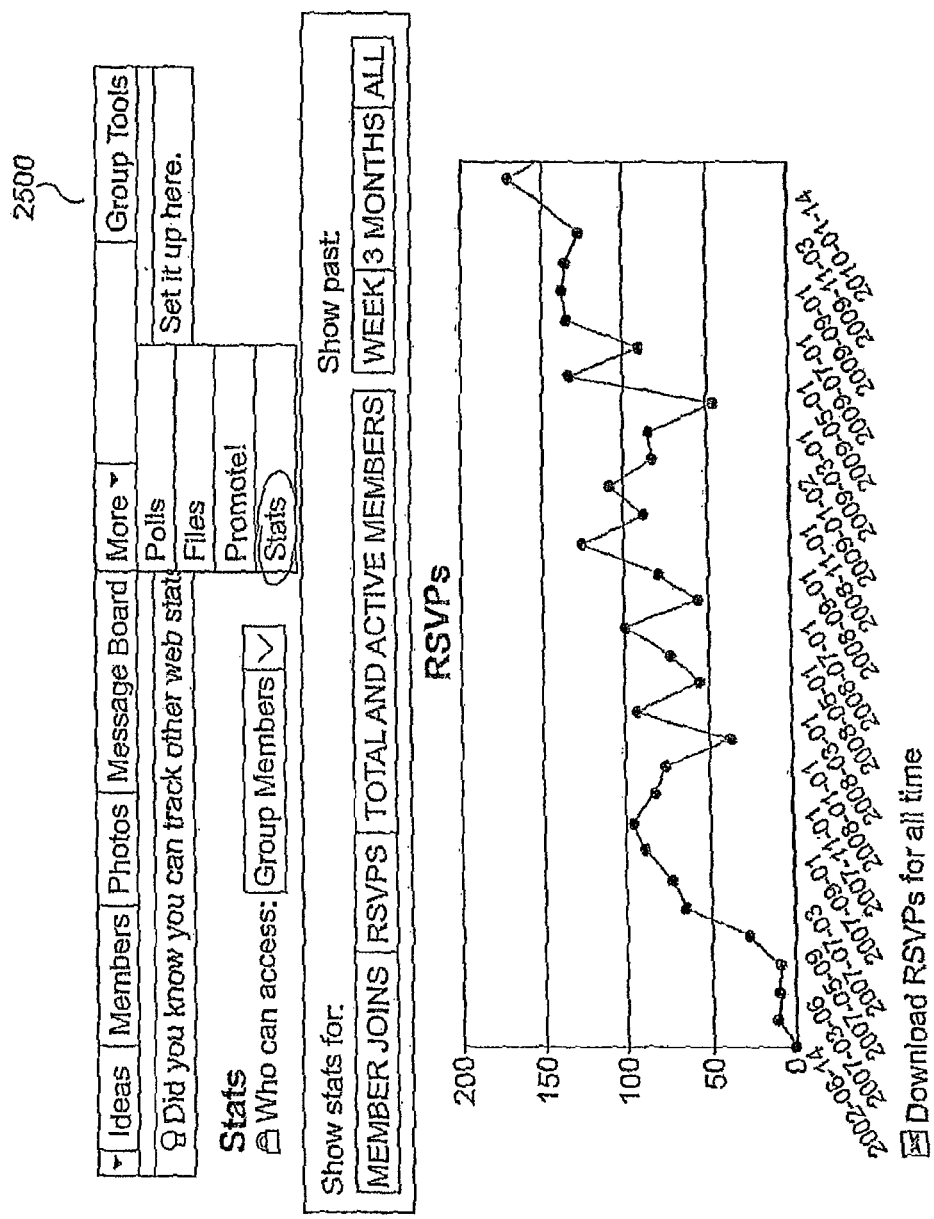
FIG. 25 depicts an embodiment of a statistical analytic for RSVPs received to a meeting group.

In embodiments, analytics and statistics may be applied and viewed for a meeting group or event through third-party sites, such as through Google's analytics platform. Through these sites an organizer or promoter may be able to learn how many page views are being received, what locations visitors are from, what pages they're looking at, when they visit, and the like. An organizer may be able to see which events get the most traffic, or if emails send a lot of people to the site, see what words people search for to get to the group of event page. This may help in the writing of a compelling group description and tag the meeting group more effectively. Statistics may be available through the meeting group or event page. For example, a 'Stats' menu item on the user interface may provide statistics, such as through reports and the like, including group joins, RSVPs, total members, active members, and the like, where reports may contain charts and graphs with selectable time resolution and extent. In embodiments, analytics may also be applied to the activity of finding or forming new groups, such as displaying trending information on fastest growing topics, most popular topics, fastest growing cities, and the like, or other interesting trends that help people find meeting groups while profiling as many meeting groups as possible. FIG. 25 shows an example RSVP analytic representation 2500 showing the total number of RSVPs received for a representative group.

In embodiments, an organizer may create a new meeting with an RSVP window for responding, such as a setting when RSVPs may be first provided and the last date and time for RSVPs. For instance, an organizer may say, "automatically open RSVPs 10 days before the meeting and close them an hour before the meeting." This may provide the benefit of controlling and adjusting for the needs of the particular meeting. For example, an organizer may plan a meeting and want members to know about the meeting, but doesn't want to track RSVPs yet. Or, an organizer has an event with limited seating: the organizer can announce "tickets go on sale next Monday". In embodiments, meetings may include RSVPs, not include RSVPs, include RSVPs with close date and/or time, open date and/or time, or both. RSVPs may provide the organizer with a way to control the number of people attending the in-person gathering.

Figures 36A, 36B:
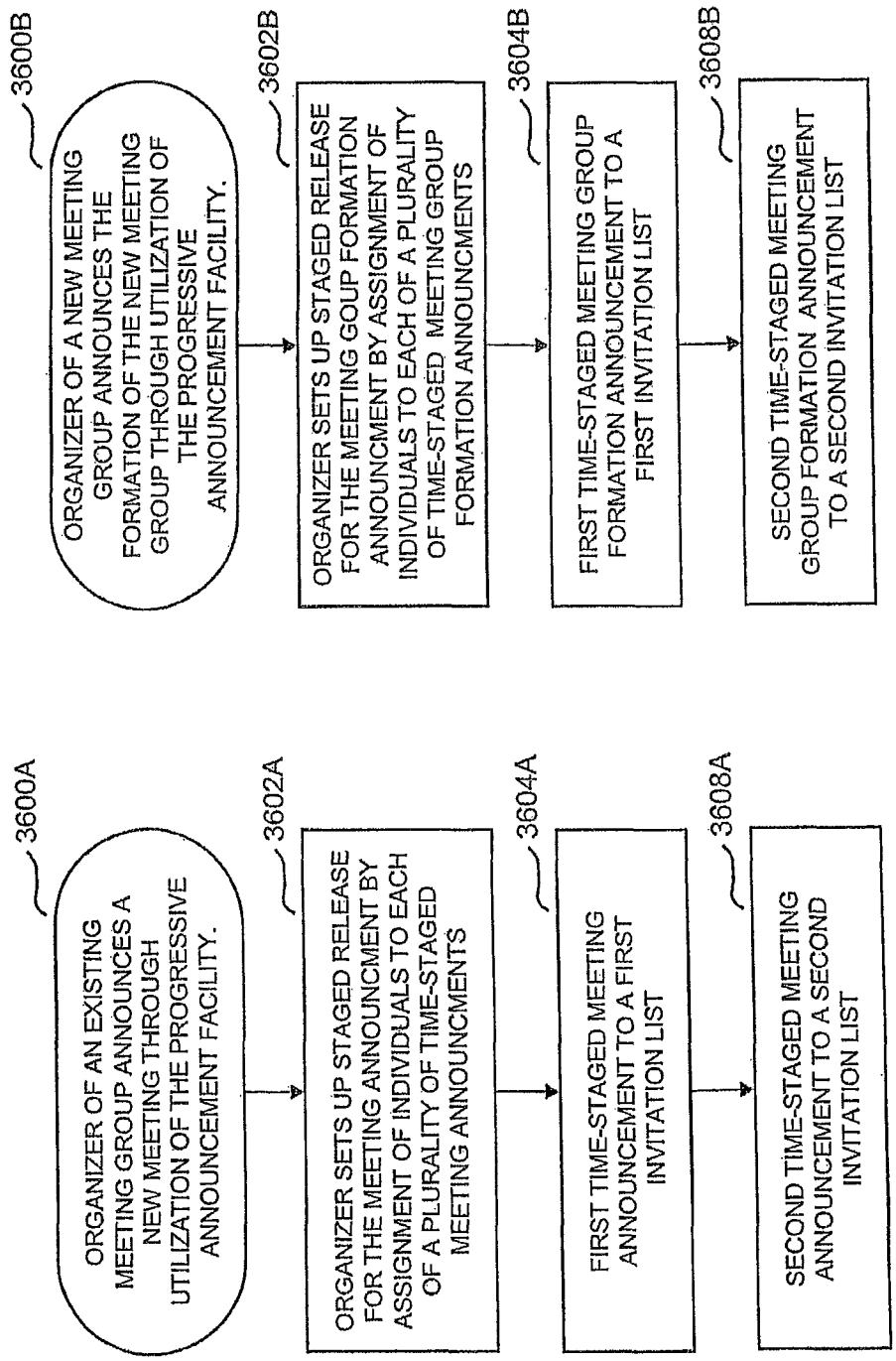
FIG. 36A-B depict embodiment flow diagrams for a progressive announcement facility.

In embodiments, the present invention may provide for meeting announcements, new group announcements, event announcements, and the like, in a progressive process, where the announcements are not provided to all individuals at once, but are provided at certain times based on one or more parameters. The progressive process of announcement delivery may provide organizers with greater control in the delivery of an announcement, where progressive time-wise stages of announcements may be employed in the control of the RSVP availability for meetings and/or events, joining availability for new meeting group or new event announcements, and the like. For example, and referring to FIG. 36A, an organizer of an existing meeting group may announce a new meeting through utilization of a progressive announcement facility 3600A, where the organizer sets up a staged release for the meeting announcement by assignment of individuals to each of a plurality of time-staged meeting announcements 3602A, where the assignment may be manually, automatically, and the like, as described herein. Then, a plurality of staged meeting announcements may be released, such as a first time-staged meeting announcement to a first invitation list 3604A, a second time-staged meeting announcement to a second invitation list 3608A, and the like. In another example, and referring to FIG. 36B, an organizer of a new meeting group may announce the formation of the new meeting group through utilization of a progressive announcement facility 3600B, where the organizer sets up a staged release for the meeting group formation announcement by assignment of individuals to each of a plurality of time-staged meeting group formation announcements 3602B, where the assignment may be manually, automatically, and the like, as described herein. Then, a plurality of staged meeting announcements may be released, such as a first time-staged meeting announcement to a first invitation list 3604B, a second time-staged meeting announcement to a second invitation list 3608B, and the like. In each case, the time-staged meeting announcement may allow the organizer, for example, to address various contingencies between the time-staged announcements. For example, the organizer could establish the availability of a key group of meeting participants (such as the officers or managers of an organization, individuals who will make a presentation, or the like) before announcing to a broader group. As another example, the organizer could determine the rate of response from an initial group to help estimate whether the capacity of a meeting venue is likely to be exceeded, releasing the second announcement if and when it appears that capacity will be sufficient to accommodate participants among the recipients of the second announcement. Similarly, new participants might be invited to a meeting after past participants, allowing new members to see a number of RSVP responses prior to responding themselves. Additional examples and embodiments are provided throughout this disclosure.

In embodiments, the announcement delivery parameter may be based on how active a member is in the meeting group, the last time a member attended a meeting, a member being a co-organizer, a member being a new member, the member being included on a preferred list, the member being included on a 'VIP' list, the member's history with attending meetings for which they have provided an RSVP, a shared connection (e.g. a friend, a social media friend, a professional connection), a user previously expressing an interest in a new group, and the like. As such, the progressive process may provide for a method of providing an announcement preferably to at least one individual over a plurality of other individuals.

For example, an organizer may want to send a meeting announcement to friends (a 'shared connection') first because their friends are more likely to RSVP than others. Then, once some number of friends has signed up for the meeting, other individuals may be more inclined to sign up. Further, the organizer may then release a second stage of the meeting announcements, that is, after their friends but before release to everyone. For instance, the first stage may be friends and other shared connections, and the second stage may be other preferred members, such as those members that are regular attendees in meetings (i.e. RSVP often). In this way, the organizer has initially 'seeded' the meeting participation with shared connections, and then further seeded the meeting participation with other regularly attending members. Now when the final all-inclusive meeting announcement is sent, individuals that may ordinarily have been hesitant to RSVP to a meeting with few or no current RSVPs listed, may see a number of people already signed up, and feel more inclined to RSVP. Although the description of the progressive process of announcement delivery is described with respect to an organizer, in embodiments a co-organizer, a host member, and the like may implement the process as described herein.

For instance, the progressive process may provide a meeting announcement in a stepped time-wise pattern where a member, group of members, groups of members, are progressively informed of a meeting based on the parameters. For example, an organizer may wish to reward certain members by providing them with an announcement first so they have the opportunity to RSVP before other members of the group. This may be necessary because certain 'regular members' have less access to computer resources necessary to RSVP than other members, and have in the past been closed out of meetings before the maximum attendance is reached. In another example, the progressive process of providing announcements may encourage certain members to RSVP to an announcement because they see other members have already signed up. That is, certain members may ordinarily be hesitant to RSVP to a meeting that has none or few members already signed up to attend. But with the progressive process, the regular members may be given an earlier opportunity to RSVP such that by the time the newer members are provided the announcement, the regulars have already RSVP'ed and are listed as attending, and the newer member may then feel less hesitant to RSVP into a meeting with an established participant list.

In another instance, the organizer of a new meeting group may use the progressive process to provide a new meeting group announcement in a stepped time-wise pattern, where users that have previously expressed an interest in the new group, friends, social media connections, and the like, are provided a new group announcement prior to other users. In this way, new users that have no previous connection with the new group organizer may be more inclined to join the group when they receive their announcement, because by the time they get their announcement there are already group members listed.

In embodiments, the organizer, through the meeting facility, may be able to select individuals for inclusion in different stages of providing an announcement, such as by specifying the individuals(s) to be included in a date/time for a first stage of the announcement release, a date/time for a second stage of the announcement release, and so on. The organizer may be able to compile lists of individuals into progressive announcement lists that may make it easier for the organizer to create announcements with staged release of the announcement. For instance, an organizer may want to create a small sub-group list for certain gatherings of select members, but willing to include others in the announcement if too few of the initial select members RSVP. In this example, the organizer may then select a subset of the meeting group membership for a first stage of announcement delivery, and a second subsequent stage of announcement delivery for an extended group to participate. In embodiments, organizers may be provided the option of having progressive announcements utilized through the selection of an automatic progressive announcement function, such as provided as a selection button in association with the organizer's user interface. This automatic function may implement a specific assignment of individuals to various stages has previously set up by the organizer, implement an automatic assignment based on preferences previously or currently selected by the organizer, implement an automatic assignment by the meeting facility based on an algorithm (e.g. as based on past behavior of the meeting group or other meeting groups, or other parameters as described herein), and the like. An automatic selection may also be selected, deselected, or provided as a default for the announcement of a new meeting group, as a part of the process of announcing a new group.

In embodiments, a computer system for organizing in-person gatherings of users of topic-related interest may comprise a web-based meeting management facility having a user interface accessible to a plurality of users, wherein each of the plurality of users may use the user interface to join at least one of a plurality of meeting groups based on at least one of topic-related interest and geographic locale, where a user becomes a member when they join the meeting group; and a server-based progressive announcement facility for enabling at least one organizer to control a time specific and individual selection specific staging of a meeting announcement release related to a meeting group based on an announcement delivery parameter.

In embodiments, the announcement may be a meeting announcement for an existing meeting group, a new meeting group announcement, and the like. The staging may have at least a first stage announcement at a date and time for at least a first individual, and a second stage meeting announcement at a subsequent date and time for at least a second individual. The staging may have at least a first stage meeting announcement at a date and time for a preselected group of individuals, and a second stage meeting announcement at a subsequent date and time for at least a second preselected group of individuals. The preselected group may be determined by at least one of the organizer, co-organizer, and host organizer. The parameter may be related to an individual's status, such as being a co-organizer, a new member, and the like. The status may be being an active member of an existing meeting group, where active is determined by meeting attendance over a period of time as selected by the organizer. The parameter may be related to an individual being included on a list maintained by the organizer. The list may be a very important person (VIP) list, a preferred members list, and the like.

In embodiments, the organizer may implement an assignment of individuals to each staging of the meeting announcement through an automatic function of the meeting management facility, such as where the assignment has been previously determined by the organizer. The assignment may be generated through an algorithm executed by the meeting management facility. The algorithm may be based on assignment preferences specified by the organizer. At least one of the stages of an announcement release may be restricted to a subset of members of a meeting group, to a subset of users signed up for a new meeting group, to the first announcement stage may be associated with a notification of a meeting as a meeting of interest to other individuals as a result of the meeting achieving a predetermined number of RSVPs at the time of an announcement release, and the like. An announcement release subsequent to the first announcement stage may be associated with a notification of a new meeting group as a meeting group of interest to other individuals as a result of the meeting group achieving a predetermined number of sign-ups at the time of an announcement release.

In embodiments, the organizer may utilize the progressive meeting announcement facility in setting up a process to automatically schedule meetings. The organizer may utilize the progressive meeting announcement facility in setting up a process to automatically manage the meeting group. An announcement release subsequent to the first announcement stage may be associated with a notification of interest on an external social media site, such as Facebook, Twitter, and the like. The organizer may utilize a statistical analysis tool to evaluate the effectiveness of the progressive announcement facility in improving a meeting attendance parameter. The parameter may be increased meeting attendance, an increase in new members to the meeting group, and the like. The user interface may be through a mobile computing platform, where individuals may be able to respond to the announcement through the mobile computing platform, smart phone, PDA, laptop computer, electronic pad, and the like. The announcement may be a meeting announcement that includes attendance information. The attendance information may include members that have already signed up for the meeting. The attendance information may include member status information associated with the members that have already signed up for the meeting. The status information may be the duration the member has been part of the meeting group. The status information may be associated with the activity of the member in attending meetings. The status information may be associated with the other meeting groups a user is a member.

In embodiments, the announcement may include a calendar indication for when a meeting group meeting is to occur. The meeting management facility may present a graphical user interface to the organizer for use of the progressive announcement facility. The organizer, through a progressive announcement facility interface, may be able to utilize a member database maintained by the meeting management facility for creating member lists associated with the staged announcement releases. The organizer may utilize a friends list to create an attendance list for at least one stage of the meeting announcement. The friends list maybe from a social media site. An attendance list for the staging may be generated in association with member interrelationships as determined through a social network diagram.

In embodiments, the user interface for meeting groups may include group navigation, organizer group tools, a group information box, a module manager, latest activity feed, meeting group module, recent photos module, video module, and the like. The user interface may include the use of functional modules, where these functional modules may be managed with a module manager, including the ability to add/remove modules from a meeting group homepage. Functional modules may include a recent photo module, a video module, new meeting module, and the like, where an organizer may be able to more easily modify the look and function of the home page. For instance, the latest activity feed may let members know more easily what's happening with the meeting group, where the organizer may be able to customize what appears in the feed, showing all of the activity of the group, and the like.

In embodiments, organizers, co-organizers, and the like may organize meeting groups, and limited organization and execution of meeting group activities may be through assistant organizers and one-time event hosts. For instance, co-organizers may share the control of group organizational functions and features of the present invention as described herein, but assistant organizers, one-time meeting hosts, and the like, may have a sub-set of privileges, such as specified by the organizer(s) of the group, provided by default, and the like. In this way, organization and execution of the activities of the group may be shared and/or distributed across a number of individuals. In an example, a one-time meeting host may be a member who has stepped up and volunteered to organize a meeting, planed the whole thing on the meeting group site as well as host the actual, in-person meeting event, but the organizer(s) don't want to make them an Assistant Organizer. In this instance, the organizer may be able to make that member a meeting host, which will give them the ability to organize a single, or limited number or series of, meetings. But once the meeting takes place their access goes away.

In embodiments, a member may provide ideas for meetings to organizers and to the group, and other members may be able to vote on whether they think it's a good idea or not. For instance, ideas that members suggest may be made public (unless, of course, it's in a private group), and organizers may receive emails when an idea is posted. Group members may vote on the ideas they like and the votes tallied, such as for all to see. Organizers and assistant organizers may turn any idea into a real meeting with the click of a button. FIG. 26 shows an example of a voting user interface 2600 where two ideas 2602, 2604 have been put forth to a group membership for voting. In the first idea, 'Ride to Governor's Island' 2602 the member the interface 2600 is being presented to has indicated that they like the idea 2608, and so they would be added to the list or representation 2610A of those who like this idea 2602. Similarly, for the second idea presented 2604, the user can see a list or representation 2610B of who likes the second idea.

In embodiments, group members may be able to identify people in posted photos and "tag" them. This means that when a group member views a group photo with people in it, they may be able to identify the people in the photo and put names to faces through tagging. Due to the present invention's application to real world face-to-face interaction, this functionality may better allow individuals to find out who goes to the meetings and to tie together the online and offline experience of the meeting group. For example, a member may find this tagging feature by looking at any photo in their photos section of the user interface, and clicking on the "Tag this photo" link next to the photos. This feature may be limited to group members. Those tagged may also receive an email notification telling them they have been tagged. And of course, they may also be able to un-tag themselves if they desire.

In embodiments, the present invention may provide for a revenue generation facility to aid in associating sponsors with meeting groups, including sponsor group search, automatic searching, auction functionality, group sponsorship aggregation, sponsor placement in emails, sponsor accounts, sponsor offer directory, sponsor offer matching, sponsor offer recommendations, sponsor page, and the like. A sponsor group search may allow a sponsor to discover groups that are looking for a sponsor, where a sponsor may search by topic and/or location among a pool of groups that have stated they are looking for sponsors. In embodiments, the revenue generation facility may facilitate discovery, search, and matching of sponsor and groups by automatic matching and/or auction functionality. For instance the matching feature may provide system alerts automatically when there are sponsors or groups that meet certain parameters. An auction feature may allow sponsors and groups to be matched through a bidding model. In this way, sponsorship matching to meeting groups and/or members may be executed dynamically, where sponsors and groups are being match continuously. Sponsor placement may place sponsor details in a communication, such as in an event reminder email to members, which may include sponsor information, such as the sponsor's name, the sponsor's URL, a sponsor's product and/or service, and the like. Sponsor accounts may be kept in a database of registered sponsors. In addition, sponsors may be tagged and identified, such as by business name, address, phone number, URL, email address, and the like. There may also be links to sponsors, such as through twitter, Facebook, Foursquare, Yelp, and the like. A sponsor offer directory may be provided that organizers use to search for a sponsor for their group, receive automated recommendations, and the like. Results from the search may contain information submitted in a sponsor account, what the sponsor is willing to offer, and the like. The sponsor offer directory may provide a "self-serve" system where groups and sponsors can find and contact each other. The sponsor page may be a public web page that provides information about a sponsor, such as what meeting groups the sponsor supports, information from the sponsor account, offers available to groups, and the like. In embodiments, the revenue generation facility may allow organizers or members of groups to aggregate purchasing, or allow sponsors to offer group discounts to multiple groups and/or members. For example, the revenue generation facility may facilitate sponsored offers to members, such as to all members of a group, all members of a type of group, to all groups, and the like. For instance, if a certain number of members sign up for the offer, then the deal may become available to all, if the predetermined minimum is not met, no one may get the deal. In this way, sponsors may be able to offer quantity discounts to members, while reducing their risk.

In embodiments, the meeting facility may enable businesses and other organizations (a "Perk Sponsor") to communicate with organizers of meeting groups regarding sponsorships, offers, discounts and other benefits ("Perks") that the business desires to extend to members of the organizer's meeting group. Meeting Perks make it simpler for Meeting Groups to get ongoing discounts, deals and other membership benefits from relevant businesses and organizations. Upon acceptance of this proposal by the organizer, the meeting facility may deliver the offer to the members of the meeting group. The Perk Sponsor may then be able to send their Perk to a collection of meeting groups, such as based on specifying geography, topics, keywords, and the like chosen by the Perk Sponsor. Organizers of active meeting groups that match the topic and location criteria for the perk may be notified, such as up to once a day, once a week, and the like, of new perks available for their meeting group(s). The Perks Sponsor may also set a maximum number of groups to sponsor. In embodiments, the Perk Sponsor may be billed upon acceptance of the sponsorship by the group organizer and upon renewal of the sponsorship, such as at a fixed rate per meeting group sponsored per month. The meeting facility may deliver Perk proposals to meeting organizers of the groups selected by the Perk Sponsor, such as by using the group selection tool. Acceptance of the Perk may be first come first served up to the number of groups that the Perk Sponsor indicated. For instance, if demand for the Perk exceeds the maximum number of groups specified by the Perk Sponsor then organizers may be able to add themselves to a waiting list for a specific Perk offer, such as in the event the Sponsor increases their budget, spots open up due to termination of a Perk relationship by either the Perk Sponsor or the organizer of the group that had previously accepted the Perk, and the like. In embodiments, organizers of meeting groups may be provided functionality that enables them to view and manage Sponsors and the available Perks. Members may also be able to view all of the Perks available to them through their meeting groups. Perk Sponsors may have a new home page, such as being publicly viewable, where it may show available Perk offers as well as a list of all meeting groups currently being sponsored by that Perk Sponsor.

In embodiments, the present invention may provide a facility for presenting users with a list of meeting events in their geographic area that are popular, such as indicated through RSVP counts. In embodiments, the list may be generated through an algorithm that creates the list to provide the user with what is 'hot' in the area, such as through highest RSVP counts, the highest total number of RSVPs, the highest percentage of RSVPs, and the like. For example, the algorithm may include the two highest RSVP count events where there is a topic match between the recipient's topics and group's topics, the top RSVP count event that is not a topic match, top RSVP count events in the geographic area, and the like. In embodiments, RSVP counts may be based on actual counts of 'Yes', of 'Yes' and 'Maybe's', of a combination of these and/or other positive indicators that a member may join the meeting, and the like.

In embodiments, the present invention may provide for a service where members can 'check-in' to a meeting or event, that is, when a member gets to the location of a meeting or event they could indicate they've arrived, such as through a smart phone and the like. A member may also be able to check-in other members that have arrived, and view what other members have checked-in. Member check-ins may be represented and viewed through a website associated with the present invention, on a third-party website, on a social network website, a smart phone (e.g. iPhone, Droid, Blackberry), and the like. For instance, a member may use a mobile-optimized version of the website, an application for a mobile device, a laptop, and the like, to "check in" to a meeting or event. This may tell the system that they are at the event and then the website or the application tells other people who are looking at the event page that the member is at the event. Check-in may also be used for attendance purposes, to create an alert (such as to other members that they've arrived). In embodiments, the check-in feature may be integrated into a third-party, such as Foursquare, Twitter, Facebook, and the like. For example, a member may check-in, where the check-in updates their Facebook status and sends a tweet. In embodiments, the check-in feature may be used independent of a meeting or event, where members check in to a location and then if there are a predetermined number of members in similar topics, a meeting or event could be spontaneously generated.

In embodiments, the present invention may provide for a 'buddy' feature, where one user or member may be matched with another member or user so that the matched members or users have a person of contact in a group or at an event. This matching would create a relationship (e.g., an interpersonal association or connection) between users or members in a group or meetings where there otherwise would not be a connection. A user, organizer, assistant organizer, the system, and the like may do the matching. The matching may be done on the basis of activity, interests, connections, and the like, whether on a site of the present invention, or on other third party sites, such as social networking sites. For example, a new member of a meeting group may want to sign up for a meeting or event, but the idea of showing up in an unfamiliar place to meet with a group of people they have never met in person before may be intimidating or otherwise not desirable. With the buddy function, the new person may be connected up with (e.g., virtually introduced to) someone to connect with when they arrive for the meeting. In this way, the buddy function acts as a personal connection for the new person when they arrive, and better enable introductions, and generally feeling more a part of the group. As a result, the buddy feature may provide a new member with a more secure or otherwise desirable feeling associated with attending a first meeting with a group, and thereby help promote that new member to join meetings, meeting groups, events, and the like.

In embodiments, the present invention may include how the meeting facility may associate groups together into an alliance, where an alliance may be a self-organized coalition of groups working together for a common purpose, a group of groups, and the like. In embodiments the alliance may be open to any group with a web presence, including groups on other platforms such as other social network sites, Facebook, MySpace, Yahoo, Google, and the like, where the alliance may help groups share knowledge and resources amongst each other. In embodiments, anyone may be able to start an alliance, and anyone group may join an alliance (which may be subject to approval by the alliance organizer). In embodiments, a user may register a member account with an alliance site (or use an existing account). Alliances created with a new member account may not be activated until the account email address is verified (by means of a confirmation email). Next, an Alliance may customize a "short name" (based on the full name by default), that may be used in the Alliance's web site URL and as the address of the Alliance's email mailing list. Alliances may then be categorized by free form keywords or tags by which the organizer identifies the Alliance's areas of interest or activity. Once complete, the alliance organizer may be shown a success message and directed to the new Alliance's home page.

In embodiments, the present invention may include an alliance home page, which may include a customizable header, description of the alliance purpose, logo, navigation links to available alliance content (e.g., settings, discussions, resources, and the like), organizer tools (e.g., links to contextually available actions, such as to invite groups to join, view pending groups who have requested to join, add new gadgets to the home page, enter a text message to display, and the like. In embodiments, gadgets may allow a customized selection of what types of tools and content are displayed on the page, along with placement and size, and the like. Features and functions associated with the home page may include a listing of groups associated with the alliance, view of the latest actions occurring within the member groups, links to communications tool, links to discussions, links to wiki-style collaborative pages, and the like.

In embodiments, the present invention may include how groups may be invited to join an alliance, where an alliance organizer and group contact members may invite other groups to join the alliance, such as by email, clicking on an invite link on the home page, and the like. Upon receiving an invitation, recipients may receive a customized message with a link back to the join page for the alliance. When invited by the alliance organizer, groups joining through the invitation link may be automatically "approved" and included in the Alliance. In embodiments, for invitations sent by alliance members, groups joining through the invitation link may be subject to approval by the alliance organizer.

In embodiments, the present invention may include how groups may join an alliance. When joining an alliance, the group contact may be prompted to enter the group's information, including name, location, website URL, description, and the like. Existing members may select a previously entered group or create a new one. Requests to join an Alliance may be subject to approval by the alliance organizer. Depending on context, the group's membership may be left in various states, such as if the group joined in response to an invitation by the alliance organizer the group may be automatically approved and active in the alliance, if the request is from an existing or verified member the request may be pending and is submitted to the Alliance Organizer for approval, if the user created a new member account during the join request the group may be left in a not verified state and only moved to pending when the member's email address is verified, and the like. In embodiments, when a group's request to join an Alliance enters a pending state, notification messages may be sent, such as a confirmation to the applying group contact detailing the join request and the alliance information, a pending group notification to the alliance organizer containing the group details (e.g., member information, group name, URL, description, reason to join, and the like) and a link to enable immediate approval or denial of the join request, and the like. In addition, the alliance organizer may see a prompt in the organizer tools selection of the of the alliance home page when there are pending join requests. In addition, the alliance organizer may be able to remove any previously approved group from the Alliance via a link in the group listing.

In embodiments, the present invention may include how a home page may be customized, such as the layout and content displayed on the alliance home page being modified by the alliance organizer to suit the alliances needs. In embodiments, content may be bundled into gadgets, such as based on the Google Gadgets, Google OpenSocial specification, and the like. Gadgets may provide a modular form for information and functionality to be included on the page. In embodiments, the alliance site may implement an OpenSocial gadget container, which will ultimately allow standard compliant $3^{rd}$ party applications to be included in the site. Gadgets may be moved to a new location on the page, removed from the page, have individual settings customized, added to the page from a list of available options, and the like. For instance, the alliance organizer may select from an expandable list of available gadgets to add to the page, where added gadgets may appear immediately on the page below. Individual gadgets may be able to declare whether or not more than one instance is allowed per Alliance. Gadgets may be moved by clicking on the title bar and dragging the gadget to the new location. As the gadget is moved, the page layout may automatically adjust to show the new droppable location for the gadget. The alliance organizer may be able to remove any gadget instance from the page by clicking on the appropriate icon. In embodiments, a gadget that has been removed may be re-added if desired. Gadgets may define a list of editable settings. For example, a feed reader gadget may include a setting for the feed URL to display and the number of feed entries to be shown. In addition, any gadget may be embedded on any other HTML page by copying and pasting a short snippet of HTML code.

In embodiments, the present invention may include how groups may be displayed, where a list of groups in an Alliance may be displayed through a groups gadget. Groups may be searched by location to find the nearest group, such as sorted by distance from the entered location. Each group may also have a detail view available with additional group information, such as including a group description, a history of group information that has been automatically updated by the alliance system, and the like. For supported group platform sites, the alliance system may be periodically updated with information for all of the member groups, such as the number of members in the group, the date of the group's next event, other platform specific information, and the like. The group detail view may show the most recently applied updates. In embodiments, history may only be visible to the group contact and the Alliance Organizer.

In embodiments, the present invention may include alliance discussion, which may provide a combined online message forum and mailing list for each Alliance. Members of the Alliance may be able to post messages online through the site, send an email message to the Alliance mailing list, and the like. Members may opt to receive all messages by email, to receive only responses within a given thread by email, to view all messages on the web site, and the like. Individual threads of discussion may be flagged as private (e.g., only visible to members of the Alliance), as public (e.g., viewable by everyone), and the like. In addition, messages posted since a member last viewed the discussion may be flagged as new and highlighted on the next visit.

In embodiments, the present invention may include a discussion thread, where replies to a new discussion message may be collected into a single conversation thread. In addition, messages in a conversion thread may be displayed in context, such as below the message that was replied to, ordered chronologically within other replies to the same parent message, and the like. When a member re-visits a previously viewed thread, the previously viewed messages may be automatically collapsed, while any new messages may be expanded, such as for easy highlighting. The alliance organizer may change the visibility setting (e.g., public, private) for any discussion thread, delete the discussion thread, edit the text of any individual message, and the like.

In embodiments, the present invention may include alliance resources, where each alliance may have the ability to create and publish wiki-style web resource pages as part of their Alliance site. These pages may be collaboratively created and edited by all members of the Alliance, though the Alliance Organizer may have final approval on what pages and changes are publicly visible outside of the Alliance members. Like alliance discussions, each resource page may be flagged as public (e.g., viewable by all site visitors) or private (e.g., only visible to Alliance members). Each set of changes to an individual page may be stored as a separate revision of the page content. The Alliance Organizer may select the specific revision of a page that may be made public. Members may edit pages that have been publicly published, but their revisions may be pending to the page (not visible) until approved by the Alliance Organizer. Public pages may appear for all site visitors, while private pages may only appear for logged in alliance members. When a new alliance is created, it may be populated with a set of resource page templates for commonly provided information. In embodiments, the alliance organizer may have the option of deleting any pages that are not relevant. Each resource page may be accessible via a unique URL based on the page name. This may make it easy to link to the page from other web sites. The page URLs may be subject to the public/private constraint set for the page. In addition, access to a private page URL by a non-Alliance member may result in a "not authorized" error message, with a prompt to login to continue.

In embodiments, the present invention may provide a user with the ability to create an in-person meeting event, independent of an established meeting group or chapter, through a meeting event facility, such as in connection with and including at least one of the features of the meeting facility as described herein. For instance, a user may want to initiate and promote an event, or network of affiliated events around some point of interest, such as a holiday, a political candidate, a social issue, entertainment, personal interest, and the like, but for which they may or may not have an existing membership list from which to make contact. For example, Oprah may want to promote an event, and may be able to utilize her existing contacts as a celebrity, but the ordinary individual may not have any contacts, beyond their friends and family, to draw upon for promotion of an event. The meeting event facility may provide for management resources to create a meeting event to which others may join as attendees, where the attendees may not have any previous direct affiliation with the promoter. Further, the meeting event facility may enable the promoter to create a 'container' of networked affiliated events, where the promoter may create the container with certain bounds and parameters that help to define the events. In an example, the promoter may be a person with a national presence, such as a TV, movie, political, artistic, and the like personality, where they want to have a national day of protest, celebration, and the like, around some issue. For instance, an author or celebrity may want to stage a national book reading, a U.S. senator may want to initiate a state wide rally around some bill currently in congress, the singer Sting may want to create an international fund raising event day around a natural disaster, and the like. Promoters may not have access to contact lists to rally people to the event(s), but through their public presence (e.g. through TV, a website, a community board, word-of-mouth, and the like) may be able to rally individuals to participate, where the promoter is able to initiate and coordinate aspects of the event(s) through the creation of an event container. It should be understood that these are only a few examples of how the meeting event facility may be utilized by promoters, and that anyone may use the meeting event facility to initiate events. FIGS. 22A-J provide embodiments of a user interface presentation, features, and functions of the meeting event facility, and are not meant to be limiting in any way.

In embodiments, a promoter may create a container so that individuals are allowed to show interest in creating or signing up to be attendees at event locations, such as locations created by the promoter or by attendees, and as more individuals create or sign up for more event locations, the scope and extent of the network of events spreads. The meeting event facility may enable these affiliated event locations to be networked together, such as with communications facilities, payment facilities, management facilities, organizational facilities, scheduling facilities, and the like, or any other function or feature as described herein, such as those provided to meeting groups as described herein. In a non-limiting example, the promoter may be a celebrity that wishes to promote a national fund raising event through the use of the meeting event facility. In this example, the celebrity may select a set of parameters to create the container such that other individuals may create their own fund raising event under the limitations and description of the container as created by the promoter. The promoter may maintain aspects of control over these affiliated events through the container specified parameters, such as when the event occurs, where events are allowed to occur, communications amongst the various parties, and the like. In embodiments, an attendee may become a coordinator of that event they've signed up for, where certain aspects of the management of the event may be maintained by the promoter and others by the coordinator, as described herein.

Referring to FIG. 27, the promoter may create a set of parameters for the container, such as through a container creation interface 2700, including what the container of events is about, links to or from the container (e.g. connecting with a website, Facebook, Twitter, and the like), who can select a location or schedule an event (e.g. only the promoter, anyone), when an event can occur (e.g. anytime, all together, on one day, on different days), and the like. For example, a promoter may create a container where any individual can create an event. In embodiments, an individual may express interest in the event through a user interface of the meeting event facility, and become an attendee, where the location of the event may be determined automatically through the container, provided by the individual, determined automatically and then modified by the individual, taken from an existing member profile as a part of the meeting facility, and the like. In this instance, the attendee may have aspects of control associated with the event, such as what additional individuals of a plurality of attendees may attend, the time of the event, communications with or amongst the plurality of attendees for the location, and the like. In embodiments, the promoter may determine the extent to which attendees may have coordinating control of such aspects as scheduling an event, communications amongst the attendees, whether events all happen at the same time or at any time, and the like. In embodiments, the promoter may limit at least some of these controls to only themselves, such as limiting only themselves as having control of scheduling event locations.

In embodiments, individuals may express an interest in an established location or in a new location. In embodiments, the container may be created in a way that an individual may express an interest in the event and become an attendee, and as such the attendee may have the option to become a coordinator of the event location and have some influence over the particulars of the event at that location. In this way the initiated event container may spawn events as individuals express an interest, where participation in the events grows through the efforts of attendees within the bounds of the criteria set up by the promoter through the container, but without the need for direct involvement of the promoter. For example, the meeting event facility may enable a grass-roots growth of a nation-wide network of affiliated events as set up by a promoter through the container, where events are spawned through attendees at an ever growing number of locations and venues as the word spreads.

Referring to FIG. 28, one of the ways the word may spread may be though tying the event to a social communications facility, such as Twitter, Facebook, an RSS feed, and the like. The user may be able to push content into one or more social communications facilities, such as through a social networking user interface 2800. For example, content may be pushed into a Twitter stream. The user may open a new account on the social communications facility, or tie to an existing account. For example, if the promoter chooses to tie their container to a Twitter account, people may then be able to follow the build-up of events, follow the events unfold, follow reaction to the events (e.g. before, during, and after the events). In embodiments, participating individuals may be able to tie the events at their locations and/or venue to separate accounts.

Figure 29:
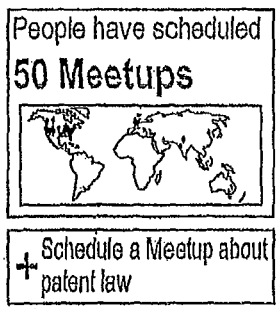
FIG. 29 depicts an embodiment of a map of events.

Referring to FIG. 29, the meeting event facility may include a user interface for depicting a map of event locations 2900, and may include one or both of a graphical and listing means for an individual to select a location to show interest. For instance, an individual may bring up a map and click on one of the locations to show interest, such as clicking on a location pin on the map. In embodiments, the map interface may allow a promoter to create default locations for the container, such as in all major cities in a region, several selected locations, one specific location, and the like, allowing new individuals to simply click on existing location indicators on the map. The interface may also allow new individuals to click on a point on the map that does not currently have an event location indicator, and so create a new location for an event. An individual may bring up the listing and click on one of the locations to show interest, such as clicking on some portion of the location listing to RSVP to participate at that location. An individual may enter a new location for an event. In embodiments, the participating individual may be the first attendee for that event at that location, and as such be afforded some aspects of control or management for that event, such as the attendees who may participate, time of the event, resources being provided and/or shared for the event, and the like, such as within the criteria set up by the promoter.

In embodiments, the promoter may be able to auto-generate event locations, such as a part of the creation of the container. These auto-generated event locations may then be available to receive interest from individuals. The auto-generate feature may make it clearer to interested individuals that the event is meant to be held across the geographical region(s) indicated by the selected locations. Individuals may then select the event of their choice and show interest in that event, as well as optionally becoming a coordinator for that event. In embodiments, an interested individual may be able to select a location that is not indicated as a result of the auto-generate function. That is, the auto-generate function for event locations may provide an effective means of 'seeding' the region of interest by the promoter, but may not limit the selection of additional event locations by interested individuals. In embodiments, the promoter may have the option to maintain different levels of control over different events.

Referring to FIG. 30, the meeting event facility may provide for a user interface presentation for an individual event 3000, such as including the name of the event, a link to the main page of the container, a map of all locations for the container, a map of the location for this specific event, location information (e.g. when, where), listing of attendees, a comment entry, a running comment stream for the event, links to social communications sites, a means to RSVP to the event, other locations nearby, and the like. As shown in FIG. 31, the individual that shows interest, such as clicking on the RSVP, may be listed on the site as an attendee, and provide an opportunity to invite others, such as through a user interface 3100 through Facebook, email, IM, and the like. As shown in FIG. 32, an attendee may be provided the opportunity to become the coordinator of the location when they RSVP, such as when the individual is the first to show interest in that location, when they may be presented with a user interface 3200 for becoming the event coordinator for the location. In embodiments, the coordinator may only have aspects of control over their associated event, where the promoter maintains the overall level of control for the container. As shown in FIG. 33, the promoter of an event may have the ability to edit organizational content for their event, such as though a user interface 3300, including the date, time, place, and the like, plus other ancillary content such as notes to the attendees.

Figure 34:
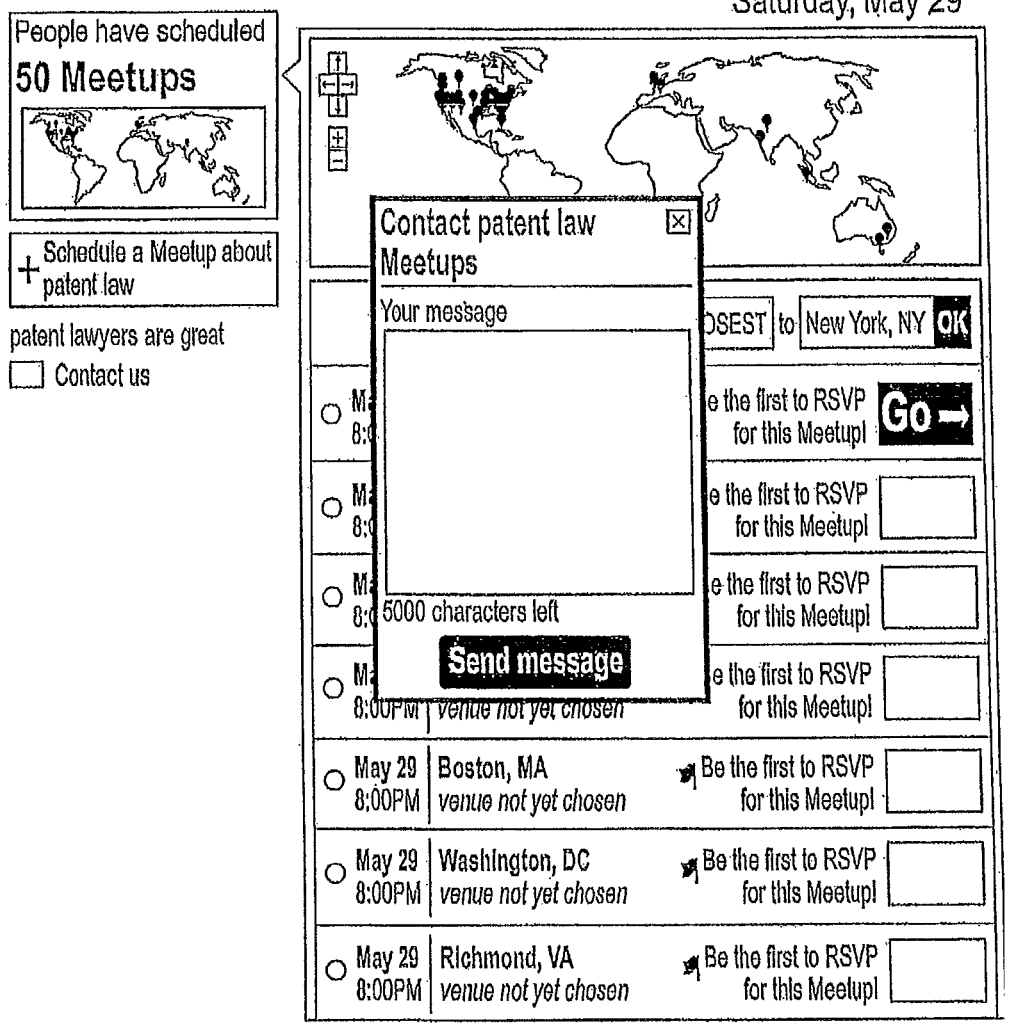
FIG. 34 depicts an embodiment for a user interface for contacting respondents for an event.

In embodiments, the meeting event facility may provide for communications amongst the promoter, coordinators, and the attendees, such as through email, IM, directly through the meeting event facility, and the like. For example, FIG. 34 shows a message box 3400 for a coordinator to contact an attendee, such as an attendee that is signed up for the event of the coordinator. FIG. 35 shows a comment box 3500 for communicating between attendees, such as generated by the coordinator, attendee, or promoter, and visible to everyone signed up for the associated event.

In embodiments, the meeting event facility may enable multiple local events that are related to be grouped into a 'community' of events, such as a community of events that are a local subset of events in a promoter's container, a community of events that are created by separate promoters but related both topically and geographically, and the like. The concept of a community of events may help aggregate smaller events so that if one person starts an event in one part of town and someone else starts one in another part of town, they may now both be aggregated into the same "community."

In embodiments, the meeting event facility may enable for 'worldwide event days' for their communities, which may allow organizations to initiate an event theme and date in the container page, so that it is easier for them to mobilize fans to start events on the same day. Once the worldwide event day is created by the account owner, it may show up on each community's page as an event.

In embodiments, the meeting event facility functionality, as described herein, may be accessed through a plurality of computer related facilities, such as a personal computer, a mobile computing device, a mobile phone, a cell phone, a navigation device, a PDA, a game, a mobile game device, through the internet, through a local area network, through a browser, through email, through instant messenger, through text messenger, and the like. In embodiments, the meeting event facility may provide for social networking, group social networking, a governmental and/or community meeting resource, for social activism, governmental activism, environmental activism, a political organizational resource, an entertainment venue resource, international networking, personal networking, an enterprise meeting tool, an educational meeting resource, an entrepreneurial group resource, an professional group resource, and the like. In embodiments, the meeting event facility may be incorporated into third party applications, such as other social networking sites, news groups, city events calendars, mobile device applications (e.g. iPhone applications, blackberry applications, and the like), third-party websites, search engines, and the like.

In embodiments, the present invention may take the form of a computer program product embodied in a computer readable medium that, when executing on one or more computers, helps organize an in-person gathering of users of event-related interest by performing the steps of: (1) providing meeting management resources through a meeting event facility, wherein the meeting management resources enable a promoter to initiate in-person gatherings as a plurality of events through a meeting event container, wherein the meeting event container provides management resources for the plurality of events as a network of affiliated events; (2) receiving meeting event container criteria from the promoter; (3) receiving a plurality of attendees for one of the plurality of events, including a first attendee, interested in attending the event; (4) providing to the plurality of attendees a location indication of the based on the promoter's received meeting event criteria; and (5) enabling at least one of the promoter and the first attendee to accept the plurality of attendees for the event, and to manage meeting event resources through a web-based graphical interface provided by the meeting event facility.

In embodiments, the present invention may provide a computer implemented method for organizing a network of affiliated live events, the method comprising: providing an event management resource to a promoter through a web-based meeting event facility, wherein the event management resource enables the promoter to initiate and manage a grouping of a plurality of affiliated in-person gatherings as live events in an event container controlled by the promoter, and where at least one such live event is allowed to be controlled at least in part by a leader associated with such live event in the event container subject to event criteria set by the promoter. In embodiments, the present invention may receive meeting event criteria from the promoter for at least one such event, receiving an indication of interest from at least one individual for at least one event, providing to the individual at least a location indication of the event based on the event criteria, and enabling the promoter to accept the individual to attend the event and to manage the event management resources for the event through the web-based meeting event facility. The individual may become the leader for the event. The leader may be enabled to alter at least one of the venue, date, and time of the event subject to the event criteria set by the promoter. The individual may request to become the leader for the event. The indication of interest and information about the individual may be received from a social networking site through which the individual signed up for the event. The event management resources may enable the promotion of the event across web-based social media. The event management resources may include a graphical user interface for managing the plurality of affiliated events. The graphical user interface presents information about the plurality of affiliated events may include a graphical map resource, location of the event, listing of individuals intending to attend events, listing of past events, a guide for initiating a new event, time of each event, date of each event, and the like. The graphical map resource may depict information about each event. The graphical map resource may provide links to individual event pages. The event management resources may provide a facility that allows third party websites to embed a graphical map resource on their site. The embedded graphical map resource may include active links to an event page managed by the promoter through the web-based meeting event facility. The meeting event resources may include a webpage for each event depicting information about and resources for the event. The resources for the event may include communications resources for the event. The communications resources may include at least one of email, SMS, chat, and micro-blogging communication services for communicating amongst individuals signed up to be attendees of the event. The communications resources may include email contact resources for communications between the leader and the promoter. The communication resources may include the ability to share communications through social networking sites. The resources for the event may include locations of other affiliated events within a specified distance of the event. The resources for the event may include a link to the main webpage for the network of affiliated events. The leader may be provided at least some control over the webpage for the event they lead. The meeting event criteria may be at least one of a location, a date, and a time for at least one of the plurality of events.

In embodiments, organizers of meeting groups and/or the meeting facility may be able to charge a membership fee to users that join meeting groups through a conditional group membership fee facility, where the fee may only be charged to users after the meeting group accumulates a threshold number of new members. The threshold may be set by the organizer, the meeting facility, a rule-based module running on a server associated with the meeting facility, and the like. Further, the users joining the meeting group, such as through a graphical user interface provided by the meeting facility, prior to the threshold being met may not be aware that a fee will be required after a number of new members have joined the meeting group. In this way, users may be motivated to join a group because joining the group is free, despite the fact that there are only a small number of members in the group. And after the group is established in its membership, users may be motivated to join the group because of its popularity, despite the fact that there is a fee for joining (i.e. after the threshold number of members has been reached). Thus, a threshold may be used to establish distinct membership categories and associated fees based on the point at which a member joins a group.

Figure 38:
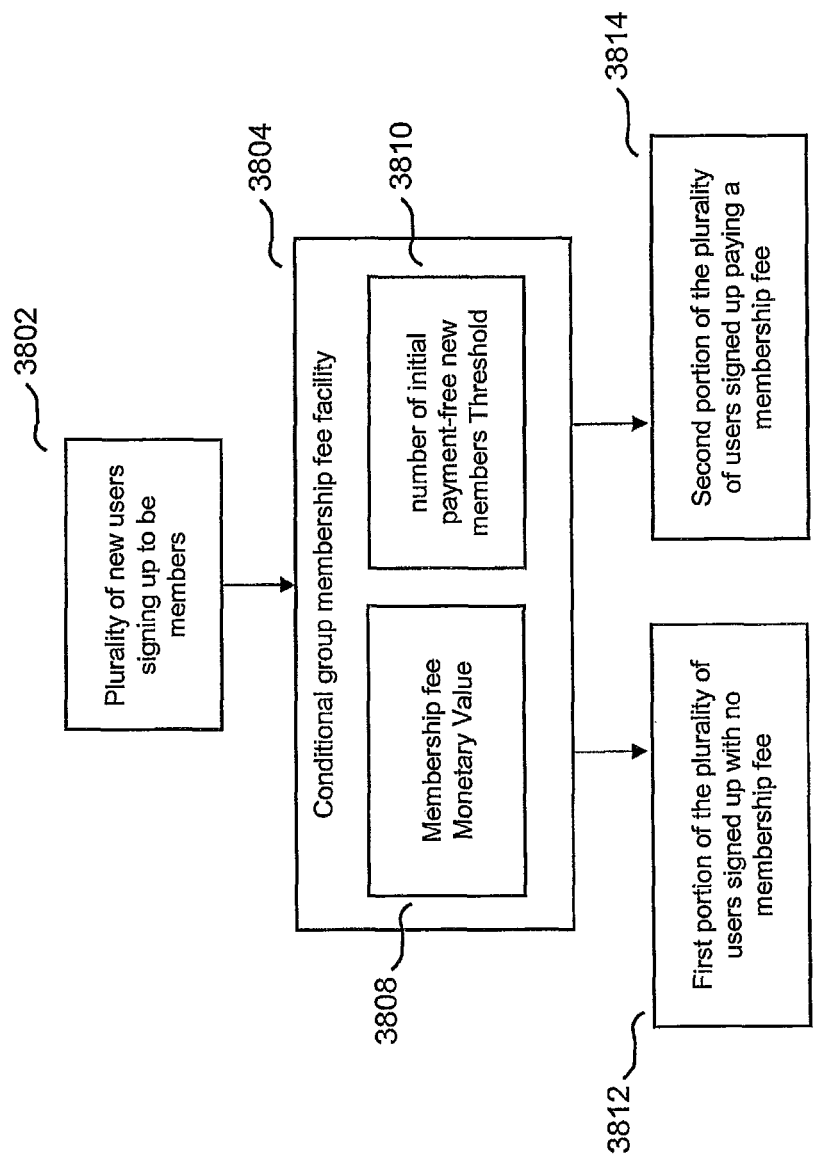
FIG. 38 depicts an embodiment flow diagram for a conditional group membership fee facility.

Referring to FIG. 38, the conditional group membership fee facility may be implemented when a new meeting group is formed and a plurality of new users sign up to be members 3802. The conditional group membership fee facility 3804 may have a specified membership fee monetary value 3808, a number of initial payment (e.g., free or with a reduced charge for early members) threshold 3810, and the like. The conditional group membership fee facility 3804 may then provide a first portion of the plurality of users signed up with a reduced fee or no fee 3812 and a second portion of the plurality of users signed up paying a membership fee 3814 as based on the point at which the meeting membership reaches the threshold 3810. In an example, an organizer of a meeting group may determine that their group may not be attractive to users to join until the meeting group has at least 20 members. The organizer may then for instance set the fee requirement threshold to 20 members, and a fee of five dollars to join thereafter. When the meeting group is initially made available to users to join, there is no membership fee listed, and users may join for free. However once the threshold of 20 members has been reached, users joining the group will see that there are 20 members in the group, and see that there is a $5 fee for joining.

In addition, the conditional group membership fee facility may allow for the dynamic setting of the threshold and/or membership fee amount, such as through an algorithm or rule-based module that sets at least one of the threshold level and membership fee amount based on a monitored parameter, such as the rate of users joining the meeting group, the number of members signing up for meeting events, the number of meeting events scheduled, an activity level of the meeting group, the number of members in the meeting group, the number of active members in the meeting group, and the like. In an example, a threshold may be initially set at 100 users, but after the meeting group is made available for users to join, a monitoring of the rate at which users are joining shows there is a high rate of joining, such as determined by a rule-based module or an algorithm of the conditional group membership fee facility, where for instance the threshold is lowered to 50 members to account for a rapid popularity of the group as determined by the rate of users joining the meeting group. In another instance, if the rate of joining is low, even when the threshold is met the fee for joining may be dynamically set low. On the other hand, if the rate of joining is high, the membership fee may be increased for a user joining after the threshold is reached. Additionally, the rule-based module or algorithm may dynamically adjust the membership fee based on at least one of the criteria described herein, such as activity level of the meeting group, number of active members, the rate of uses joining, and the like.

Figure 39:
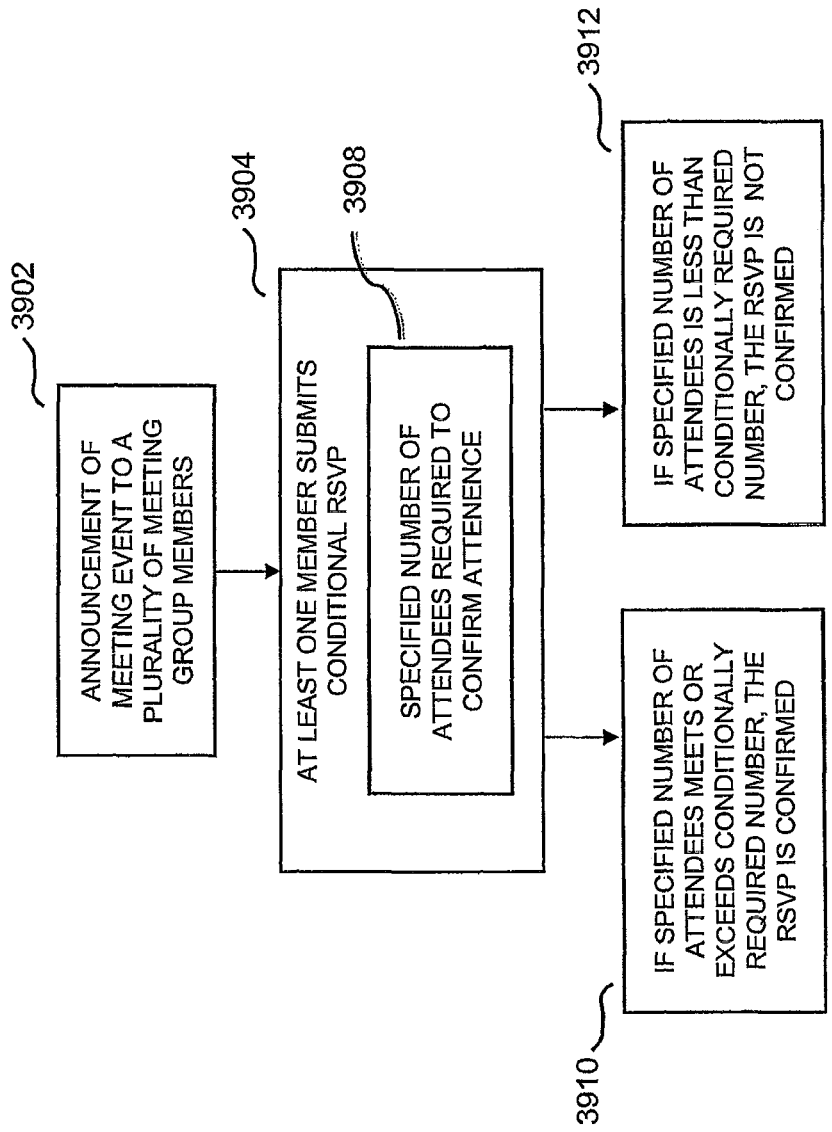
FIG. 39 depicts an embodiment flow diagram for a conditional RSVP facility.

In embodiments, members of meeting groups may be able to conditionally RSVP to attend a meeting of a meeting group based upon a threshold number of members providing an RSVP to the meeting. With this capability of the system, a member may be motivated to conditionally commit to attend the meeting knowing that if a threshold number of members committed to attend is not met, they will not be viewed by other meeting members as committed to go (e.g. their RSVP will not show a 'yes' for attending). The threshold may be set by the member, set by an organizer for a particular meeting, set by an organizer for all meetings for their meeting group, set by the meeting facility, set dynamically based on a meeting criteria (e.g. an anticipated number of attendees, a typical number of attendees, a historical number of attendees, and the like). In an example, a member may not want to commit to going to a dinner planned as a meeting for the meeting group if there are only a few members going. In this instance, the member may specify a required number of attendees for the dinner meeting to be five before they are willing to commit to go, and RSVP with this as a condition of their commitment to attend. If the final number of RSVPs is less then five, the member may not commit to go, and if the number is five or greater, then they may be viewed as committed to go. Referring to FIG. 39, a conditional RSVP 3904 may be submitted by a member as a result of receiving an announcement of a meeting event to a plurality of meeting group members 3902, where the conditional RSVP includes a specified number of attendees required to confirm attendance 3908. If the specified number of attendees meets or exceeds the conditionally required number, the RSVP is confirmed 3910. If the specified number of attendees is less than the conditionally required number, the RSVP is not confirmed 3912.

A conditional RSVP may be displayed to the meeting group in relation to the scheduled meeting, such as through a graphical user interface of the meeting facility, as a 'maybe', as 'conditional', as invisible to the group, as a yes, and the like, until the selected threshold is met where upon the display may be changed to or maintained as 'yes', and the like. If the selected threshold is not met, then the displayed RSVP from the member may change to a 'no'. The RSVPs for a meeting may include a mixture of conditional and unconditional RSVPs from members of the group.

In embodiments, a first member having attended a meeting with a plurality of members of a meeting group may be able to send a predetermined communication to at least a second member of the plurality of members attending the meeting, where the predetermined communication may be sent with only a single action of the first member. For instance, the first member may be able to drop a fellow attendee a quick 'Good to see you' note with the click of a button, such as through a graphics user interface of the meeting facility. In an example, suppose after the meeting ends, and the first member is invited to give the organizer of the meeting group feedback, such as on a 'Rate this Meetup' page. The first member may be provided a listing of the meeting attendees, such as faces, names, and the like of fellow attendees. The first member may click on the 'Good to see you' button next to one of the attendees, and that person will receive the communication, such as in an email, text, and the like. This communication may contain the predetermined communication 'Good to see you' message, along with a photo, reference to the Meetup event name, and the like. The content of the predetermined message may be determined ahead of time by the meeting facility, the organizer, a member, and the like. The single action may be a click or touch on a graphical user interface 'button' as presented to the attendee of the meeting through the graphical user interface of the meeting facility.

Figure 40:
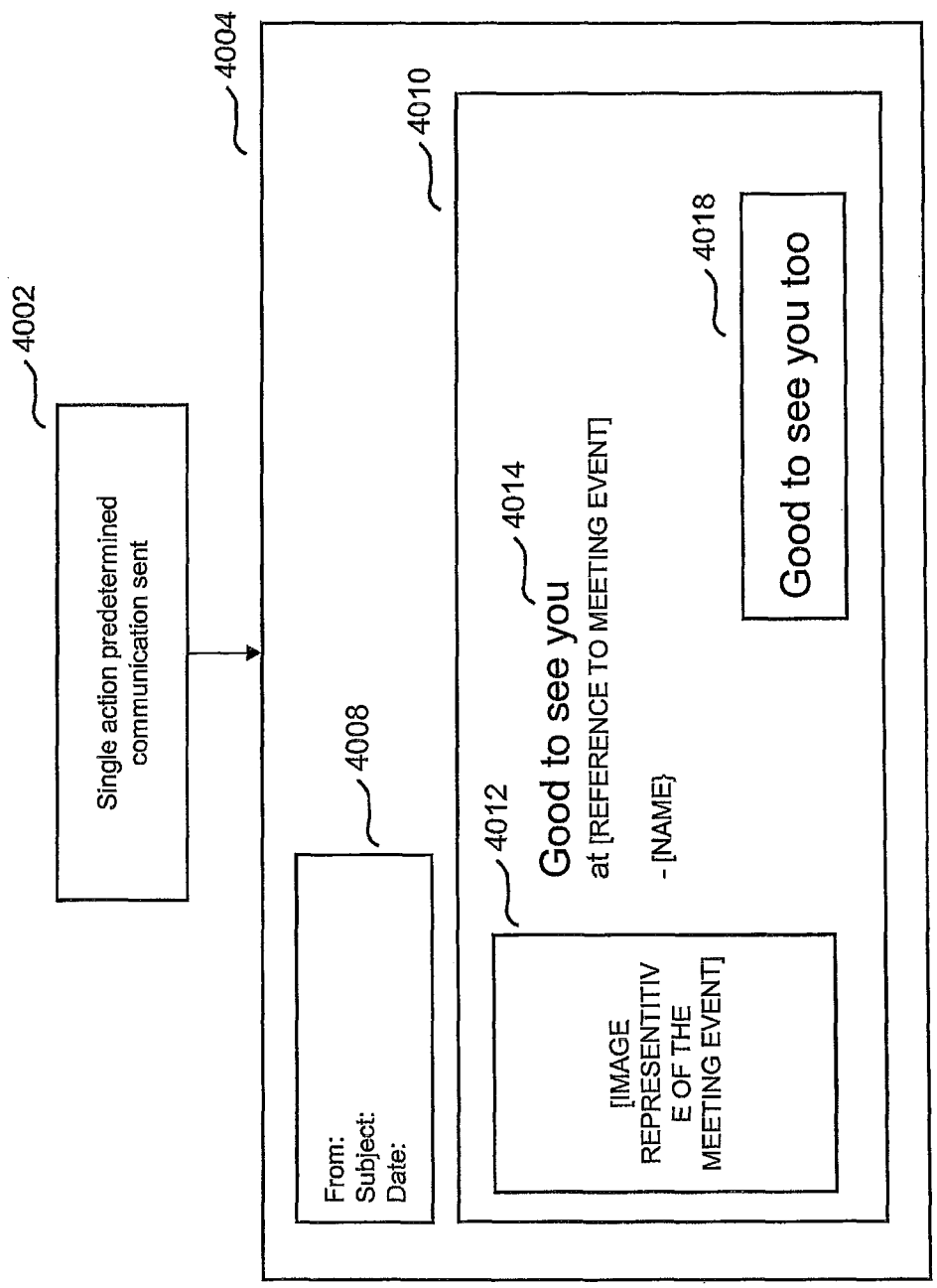
FIG. 40 depicts an embodiment flow diagram and example graphical user interface for a single action communications facility.

The execution of the single action sending of the predetermined communication may include a first step of determining the content of the message, such as determined automatically, by default, and the like through the meeting facility; by the organizer; by a member, such as in a profile, in preferences, and the like. A second step may be for the meeting facility to present the single-action predetermined communication to the member, such as through a graphical user interface and to the member after they have attended a meeting. A third step may be for the member to provide the single action, such as pressing the button presented in association with a second attendee member and as presented through the graphical user interface. A fourth step may be for the predetermined communication to be sent to the second member through the meeting facility, such as through email, text message, and the like. For instance, the meeting facility may monitor the graphical user interface for the single action, fetch the predetermined communication from a message database, and insert the predetermined communication into an email, text message, and the like, to the second member. Referring to FIG. 40, an example graphical user interface is depicted 4004 that may result from a single action predetermined communication being sent to the second user 4002, where the interface 4004 may present communications information 4008 (e.g. from, to, subject, date, and the like), an image representative of the meeting event 4012, a communication message 4014, and the like, to the second member. In addition, the recipient of the single action communication may be presented with at least one single action response communication choice 4018 to send back to the sender, such as 'good to see you too', and the like.

In embodiments, the meeting facility may provide for a meeting venue marketplace facility, where individuals responsible for a venue (e.g. the owner of a venue or someone who is responsible for managing the venue) are able to offer their space to host a meeting, where the venues are offered in association with a bidding facility. The venue offers may be stored in a searchable venue database. The venue offer, as stored in the searchable venue database, may include venue data, such as a venue name, a venue location, a venue image, a venue availability, a venue hours of operation, a venue cost, and the like. The meeting facility may then provide a graphical user interface to organizers providing a means for searching the venue database for venues for future meetings. The bidding facility may provide an offer-accept structure, where the individuals offering the venue offer a cost bid for using the venue space, and where the organizer searches and reviews the venue listings and bid offers, and when the organizer finds a suitable offer, enters an acceptance of the offer. The bidding facility may provide an interactive bidding structure, where the bidding process between the organizer and at least one individual responsible for a venue is iterative, such as the venue owner offering a bid, and the organizer offering a counteroffer bid, until either a price is agreed upon or the bidding fails to reach an agreed upon price. The bidding facility may provide a means for the organizer to enter criteria for a meeting venue into the meeting venue marketplace (e.g. location, number of members participating, cost, and the like) and where a plurality of venues bid to win the job for hosting the meeting. The bidding process may include an automated feature, such as including an acceptance parameter, where an automatic acceptance of a bid is based at least partially on the at least one acceptance parameter and at least one bid offer.

In embodiments, the meeting facility may allow different groups to jointly organize events. For example, if two different hiking groups want to go on the same hike, they could create one event. Alternatively, if those two groups each independently create meeting events, but then noticed that they are similar events, they would have the option to 'merge' the events. This may be useful when two groups are competing for the same venue, want to merge the organizational effort, want to create one meeting out of two separate meetings that had only light RSVP acceptance, and the like. The ability to create a joint meeting from two separate but similar meetings (or desire for a meeting), may allow for a single improved experience for the collective members and/or organizers. Joint meetings may share or merge their RSVP lists, or provide a link between the two separate RSVP lists. The groups may share their RSVP list and membership information, or the two groups may decide to keep the information for the two groups and members separate.

In embodiments, in addition to an organizer providing an approval for a user to become a new member, members of the meeting group may be able to approve new members into the group. In this way, the meeting facility may allow for a building of community and trust directly between members, and create more of a peer-to-peer system rather than a top-down hierarchy for creation and growth of the meeting group. In addition, members may be able to 'recommend' other members for approval and acceptance into the group. The meeting facility may provide a graphical user interface made available to at least one non-organizer member of a meeting group, where the graphical user interface may present information about a potential new member (e.g. biographical information, related groups the proposed member belongs to, a statement of the user as to why they want to join the group, a photo of the proposed member, and the like), an input facility for providing a recommendation indication related to approval of the proposed member, a voting indication related to approval of the proposed member, and the like. In embodiments, a plurality of members of a meeting group may provide a new member approval input, such as a recommendation, approval, vote on their preference for approval, and the like, wherein the new member approval input is sent to the organizer, to an automated approval voting facility for determination of a collective approval recommendation for the acceptance of the potential new member, and the like.

In embodiments, the meeting facility may provide for a connections facility to enable an organizer to manage the social connections within their meeting group for members that are new to the group, thus making it more comfortable for new members to join a meeting group or going to a meeting where they don't yet know other members. For instance, the connections facility may assign a 'meeting buddy' to new member based on whether or not they know anyone in the group or at a meeting they plan on attending, create seating arrangements that optimize for new connections based on information the meeting facility has stored about the existing connections among the members at the meeting, creating 'ice-breaking' opportunities for members at meetings (e.g. pairing members who have to find each other at a meeting event and ask each other random questions), and the like. The connections facility may provide a graphical user interface to the organizer to manage the connections for a new member, a meeting, a meeting group, and the like.

In embodiments, the meeting facility may provide for a longitudinal connections impact facility, where members are provided with information, statistics, graphical representations, and the like to help reinforce social and professional connections made through attending meeting events. The longitudinal connections impact facility may allow the meeting facility to associate connections made between members at meeting events to determine and track the evolution of social relationships through participation in meeting group activities, such as providing insight to the extent to which those connections led to work relationships, friendships, and the like. The longitudinal connections impact facility may utilize a statistical algorithm for analyzing meeting connections, such as through information input to the system from organizers and/or members, and a graphical user interface available to members for viewing the longitudinal study results of the system.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law. All documents referenced herein are hereby incorporated by reference.

The invention claimed is:

1. A computer-implemented method for facilitating fee-based group membership, comprising:
   receiving, from at least one designated organizer for at least one group of a plurality of groups, data representing a monetary value of a membership fee for the at least one group;
   transmitting, to a first plurality of user terminals associated with a first plurality of users, data configured to display a first graphical user interface configured to receive a first plurality of requests, wherein the first graphical user interface is without any indication that the membership fee is associated with the at least one group;
   receiving, from the first plurality of user terminals associated with the first plurality of users, the first plurality of requests to join the at least one group;
   registering the first plurality of users with the at least one group without requiring payment of the membership fee;
   at least one of reducing and waiving the membership fee for the first plurality of users, wherein the first plurality of users comprises a predetermined number of users;
   transmitting, to a second plurality of user terminals associated with a second plurality of users, data configured to display a second graphical user interface configured to receive a second plurality of requests, wherein the second graphical user interface indicates that the membership fee is associated with the at least one group;
   receiving, from the second plurality of user terminals associated with the second plurality of users, the second plurality of requests to join the at least one group;
   transmitting, to the second plurality of user terminals, data configured to display payment options, the payment options configured to facilitate a transaction for the membership fee; and
   registering at least a portion of the second plurality of users with the at least one group upon payment of the membership fee.

2. The computer-implemented method of claim 1, wherein the plurality of groups comprise a plurality of web-based meeting groups associated with a plurality of in-person gatherings or events.

3. The computer-implemented method of claim 1, further comprising receiving, from the at least one designated organizer for the at least one group, the predetermined number of users.

4. A system for facilitating fee-based group memberships, comprising at least one server computer including at least one processor, the at least one server computer configured to:
   transmit, to a plurality of user terminals, data configured to display a meeting facility configured to facilitate users to organize and join a plurality of meeting groups associated with a plurality of in-person gatherings or events;
   designate at least one user of the plurality of users as at least one organizer for at least one meeting group of the plurality of meeting groups;
   receive, from the at least one organizer, data representing a numerical amount for a membership fee for the at least one meeting group;
   transmit, to a first subset of user terminals, data configured to display a first graphical user interface configured to receive a first plurality of requests, wherein the first graphical user interface is without any indication of the numerical amount or that the membership fee is associated with the at least one group;
   receive, through the first graphical user interface, a plurality of requests from at least a portion of the first subset of user terminals to join the at least one meeting group;
   register a first plurality of users that submitted requests through the at least a portion of the first subset of user terminals with the at least one meeting group without requiring payment of the membership fee, wherein the first plurality of users comprises a predetermined number of users;
   transmit, to a second subset of user terminals, data configured to display a second graphical user interface configured to receive a second plurality of requests, wherein the second graphical user interface comprises the membership fee associated with the at least one group;
   receive, through the second graphical user interface, a plurality of requests from at least a portion of the second subset of user terminals to join the at least one meeting group; and
   register a second plurality of users that submitted requests through the at least a portion of the second subset of user terminals with the at least one meeting group upon payment of the membership fee.

5. The system of claim 4, further comprising receiving, from the at least one organizer, the predetermined number of users.

6. The system of claim 4, wherein each of the plurality of meeting groups are associated with at least one topical interest and a geographic locale.

7. The system of claim 4, wherein the at least one server computer is further configured to receive, from at least a portion of the plurality of users, a search request including at least one of a topical interest and a geographic locale.

8. A computer-implemented method for facilitating fee-based group membership, comprising:
   receiving, from at least one designated organizer for at least one group of a plurality of groups, data representing a monetary value of a membership fee for the at least one group and a value representing a specified number of users;
   receiving, from a plurality of user terminals associated with a plurality of users, a plurality of requests to join the at least one group, the plurality of requests exceeding the specified number of users;
   registering, with the at least one group, a first portion of users of the plurality of users corresponding to the specified number of users received from the at least one designated organizer without requiring payment of the membership fee;
   in response to registering the first portion of users with the at least one group, registering a plurality of remaining users of the plurality of users with the at least one group only after the plurality of remaining users pay the membership fee.

9. The computer-implemented method of claim 8, wherein the plurality of groups comprise a plurality of web-based meeting groups associated with a plurality of in-person gatherings or events.

10. The computer-implemented method of claim 8, wherein a first portion of the plurality of requests to join the at least one group are received from the pre-determined number of users, and wherein a second portion of the plurality of requests to join the at least one group are received from the plurality of remaining users.

11. The computer-implemented method of claim 8, further comprising receiving, from the at least one designated organizer for the at least one group, a numerical value representing the predetermined number of users.

12. The computer-implemented method of claim 8, wherein each group of the plurality of groups is associated with at least one topic-related interest and a geographic locale.

* * * * *